(12) United States Patent
Allen et al.

(10) Patent No.: US 10,609,099 B2
(45) Date of Patent: Mar. 31, 2020

(54) SYSTEM AND METHOD FOR IMPLEMENTING MEDIA AND MEDIA CONTROL TRANSFER BETWEEN DEVICES

(71) Applicant: BLACKBERRY LIMITED, Waterloo (CA)

(72) Inventors: Andrew Allen, Hallandale, FL (US); Jan Hendrik Lucas Bakker, Fort Worth, TX (US); Adrian Buckley, Tracy, CA (US); Jean-Philippe Cormier, Ottawa (CA); Young Ae Kim, Hallandale Beach, FL (US)

(73) Assignee: BlackBerry Limited, Waterloo, Ontario (CA)

( * ) Notice: Subject to any disclaimer, the term of this patent is extended or adjusted under 35 U.S.C. 154(b) by 552 days.

(21) Appl. No.: 14/704,241

(22) Filed: May 5, 2015

(65) Prior Publication Data
US 2015/0312295 A1 Oct. 29, 2015

Related U.S. Application Data

(63) Continuation of application No. 12/771,867, filed on Apr. 30, 2010, now abandoned.
(Continued)

(51) Int. Cl.
*H04L 29/06* (2006.01)
*H04L 12/18* (2006.01)
(Continued)

(52) U.S. Cl.
CPC ...... *H04L 65/4046* (2013.01); *H04L 12/1818* (2013.01); *H04L 12/1822* (2013.01);
(Continued)

(58) Field of Classification Search
CPC . H04L 65/4046; H04L 12/1822; H04W 4/005
See application file for complete search history.

(56) References Cited

U.S. PATENT DOCUMENTS

| 6,029,191 A * | 2/2000 | Kurashima | ............ G06F 9/544 |
| | | | 709/204 |
| 8,099,089 B2 * | 1/2012 | Sedlacek | ................ H04M 3/58 |
| | | | 455/260 |

(Continued)

FOREIGN PATENT DOCUMENTS

| CN | 1791267 | 6/2006 |
| CN | 101232413 | 7/2008 |

(Continued)

OTHER PUBLICATIONS

PCT International Search Report and Written Opinion, PCT/US2010/033228, dated Jul. 15, 2010, 13 pages.
(Continued)

*Primary Examiner* — Philip J Chea
*Assistant Examiner* — Robert B McAdams
(74) *Attorney, Agent, or Firm* — Trop, Pruner & Hu, P.C.

(57) ABSTRACT

A method to transfer control is presented. The method includes receiving a request to transfer control of a collaborative session from a first user equipment (UE). The method includes sending a request for the transfer of control of the collaborative session in response to the received request to a second UE, and receiving, in response to the sent request to the second UE, an indication of acceptance of the transfer of control of the collaborative session. The method includes sending a notification of status to the first UE of the control of the collaborative session in response to receiving, from the second UE, the indication of acceptance.

18 Claims, 24 Drawing Sheets

Related U.S. Application Data

(60) Provisional application No. 61/175,403, filed on May 4, 2009.

(51) Int. Cl.
*H04L 29/08* (2006.01)
*H04W 4/70* (2018.01)

(52) U.S. Cl.
CPC ............ *H04L 65/40* (2013.01); *H04L 65/403* (2013.01); *H04L 65/80* (2013.01); *H04L 67/14* (2013.01); *H04W 4/70* (2018.02); *H04L 12/189* (2013.01)

(56) References Cited

U.S. PATENT DOCUMENTS

| | | | |
|---|---|---|---|
| 2005/0060411 A1 | 3/2005 | Coulombe et al. | |
| 2006/0072526 A1* | 4/2006 | Rasanen | H04L 12/5695 370/338 |
| 2006/0153102 A1* | 7/2006 | Kuure | H04Q 3/0016 370/263 |
| 2007/0005696 A1 | 1/2007 | Beers et al. | |
| 2007/0043872 A1* | 2/2007 | Pattan | H04L 29/06027 709/227 |
| 2007/0271338 A1 | 11/2007 | Anschutz | |
| 2008/0089307 A1* | 4/2008 | Tuijn | H04L 29/06027 370/342 |
| 2009/0017856 A1* | 1/2009 | Albertsson | H04M 3/54 455/518 |
| 2009/0043872 A1 | 2/2009 | Holzer | |
| 2009/0089363 A1 | 4/2009 | Keohane et al. | |
| 2009/0257418 A1* | 10/2009 | Allen | H04M 7/123 370/338 |
| 2010/0279670 A1* | 11/2010 | Ghai | H04L 65/1083 455/414.3 |
| 2011/0047280 A1* | 2/2011 | Eom | H04L 65/1083 709/228 |

FOREIGN PATENT DOCUMENTS

| | | |
|---|---|---|
| CN | 101297532 | 10/2008 |
| CN | 101316204 | 12/2008 |
| CN | 101370176 | 2/2009 |

OTHER PUBLICATIONS

The International Bureau; "PCT preliminary report on patentability", dated Nov. 17, 2011, 7 pages.
Canadian Intellectual Property Office, Office Action for CA Appl. No. 2,760,901 dated Jul. 7, 2015 (4 pages).
3GPP TS 22.173 V9.1.0 Technical Specification, 3rd Generation Partnership Project; Technical Specification Group Services and System Aspects; IP Multimedia Core Network Subsystem (IMS) Multimedia Telephony Service and supplementary services; Stage 1 (Release 9) (Mar. 2009) (53 pages).
3GPP TS 23.218 V7.9.0, Technical Specification 3rd Generation Partnership Project; Technical Specification Group Core Network; IP Multimedia (IM) session handling; IM call model; Stage 2 (Release 7) (Jun. 2008) (59 pages).
3GPP TS 23.237 V9.0.0, Technical Specification 3rd Generation Partnership Project; Technical Specification Group Services and Architecture; IP Multimedia Subsystem (IMS) Service Continuity; Stage 2 (Release 9) (Mar. 2009) (41 pages).
3GPP TS 23.292 V9.1.0, Technical Specification 3rd Generation Partnership Project; Technical Specification Group Services and System Aspects; IP Multimedia Subsystem (IMS) centralized services; Stage 2 (Release 9) (Mar. 2009) (104 pages).
3GPP TS 24.229 V8.7.0, Technical Specification 3rd Generation Partnership Project; Technical Specification Group Core Network and Terminals; IP multimedia call control protocol based on Session Initiation Protocol (SIP) and Session Description Protocol (SDP); Stage 3 (Release 8) (Mar. 2009) (618 pages).
3GPP TS 24.292 V8.1.0, Technical Specification 3rd Generation Partnership Project; Technical Specification Group core Network and Terminals; IP Multimedia (IM) Core Network (CN) subsystem Centralized Services (ICS);Stage 3 (Release 8) (Mar. 2009) (139 pages).
3GPP TS 29.329 V8.3.0, Technical Specification 3rd Generation Partnership Project; Technical Specification Group Core Network and Terminals; Sh Interface based on the Diameter protocol; Protocol details (Release 8) (Mar. 2009) (19 pages).
3GPP TS 31.101 V8.0.0, Technical Specification 3rd Generation Partnership Project; Technical Specification Group Core Network and Terminals; UICC-terminal interface; Physical and logical characteristics (Release 8) (Jan. 2009) (10 pages).
J. Rosenberg et al., Network Working Group, Request for Comments: 3841, Category: Standards Track, Caller Preferences for the Session Initiation Protocol (SIP) Aug. 2004 (26 pages).
J. Peterson, NeuStar, Network Working Group, Request for Comments: 3860, Category: Standards Track, Common Profile for Instant Messaging (CPIM), Aug. 2004 (13 pages).
European Patent Office, Communication pursuant to Article 94(3) EPC for EP 10719169.4 dated Oct. 31, 2016 (5 pages).
Canadian Intellectual Property Office, Examination Report for Appl. No. 2,760,901 dated May 10, 2017 (3 pages).
Canadian Intellectual Property Office, Examination Report for Appl. No. 2,760,901 dated Mar. 6, 2019 (4 pages).
SIP, Session Initiation Protocol, https://web.archive.org/web/20090206174306/http://www.networksorcery.com/enp/protocol/sip.htm, Feb. 6, 2009 (32 pages).
Canadian Intellectual Property Office, Examination Report for Appl. No. 2,760,901 dated Apr. 9, 2018 (4 pages).
3GPP TSG SA WG2 Meeting #3, S2-090935, Transfer for Media modification, Feb. 16-20, 2009 (22 pages).
European Patent Office, Communication pursuant to Article 94(3) EPC for Appl. No. 10719169.4 dated Jan. 30, 2018 (8 pages).

\* cited by examiner

1. <X>

This interior node acts as a placeholder for zero or one accounts for a fixed node.

- Occurrence: ZeroOrOne
- Format: node
- Access Types: Get
- Values: N/A

2. <X>/AllowedIUTEntries/

The AllowedIUTEntries interior node is used to allow a reference to a list of subscription set IDs.

- Occurrence: One
- Format: node
- Access Types: Get
- Values: N/A

3. /<X>/AllowedIUTEntries/<X>

This run time node acts as a placeholder for one or more subscription set IDs.

- Occurrence: One
- Format: node
- Access Types: Get
- Values: N/A

4. /<X>/AllowedIUTEntries/<X>/Subscriptionset_ID

This Subscriptionset_ID interior node is used to allow a reference to a list of URI for IUT UE, Device_Nickname and Media_Token. It may be possible to replace this node value.

- Occurrence: One
- Format: chr
- Access Types: Get, Replace
- Values: <Subscriptionset_ID>

5. /<X>/AllowedIUTEntries/<X>/<X>

This run-time node acts as a placeholder for one or more IUT_URI, Device_Nickname and Media_Token.

- Occurrence: OneOrMore
- Format: node
- Access Types: Get
- Values: N/A

6. /<X>/AllowedIUTEntries/<X>/<X>/IUT_URI

The IUT_URI leaf represents one or more IUT_URIs. It may be possible to replace this value.

- Occurrence: One
- Format: bin
- Access Types: Get, Replace
- Values: <IUT_URI>

7. /<X>/AllowedIUTEntries/<X>/<X>/Device_Nickname

The Device_Nickname leaf represents one or more Device_Nickname. It may be possible to replace this value.

- Occurrence: One
- Format: bin
- Access Types: Get, Replace
- Values: <Device_Nickname>

8. /<X>/AllowedIUTEntries/<X>/<X>/Media_Token

The Device_Nickname leaf represents one or more Media_Token.

- Occurrence: One
- Format: bin
- Access Types: Get
- Values: <Media_Token>

FIG. 5a

```
<!DOCTYPE MgmtTree PUBLIC "-//OMA//DTD-DM-DDF 1.2//EN"
  "http://www.openmobilealliance.org/tech/DTD/DM_DDF-V1_2.dtd"
  [<?oma-dm-ddf-ver supported-versions="1.2"?>]>

<MgmtTree>
    <VerDTD>1.2</VerDTD>
    <Node>
        <NodeName/>
        <DFProperties>
            <AccessType> <Get/> </AccessType>
            <DFFormat> <node/> </DFFormat>
            <Occurrence> <ZeroOrOne/> </Occurrence>
            <DFTitle>Root Node of the Allowed IUT List</DFTitle>
            <DFType>
                <DDFName>urn:oma:ext-3gpp-iut:1.0</DDFName>
            </DFType>
        </DFProperties>
        <Node>
            <NodeName>AllowedIUTEntries</NodeName>
            <DFProperties>
                <AccessType> <Get /> </AccessType>
                <DFFormat> <node/> </DFFormat>
                <Occurrence> <One /> </Occurrence>
                <DFTitle>This node specifies the parent node for allowed IUT entries</DFTitle>
                <DFType> <node/> </DFType>
            </DFProperties>
            <Node>
                <NodeName/>
                <DFProperties>
                    <AccessType> <Get/> </AccessType>
                    <DFFormat> <node/> </DFFormat>
                    <Occurrence> <OneOrMore/> </Occurrence>
                    <DFTitle>This node specifies the parent node for Subscription set entries</DFTitle>
                    <DFType/>
                </DFProperties>
                <Node>
                    <NodeName>Subscription set_ID</NodeName>
                    <DFProperties>
                        <AccessType> <Get /> </AccessType>
                        <DFFormat> <chr/> </DFFormat>
                        <Occurrence> <One /> </Occurrence>
                        <DFTitle>This node specifies the Subscription set ID</DFTitle>
                        <DFType> <MIME>text/plain</MIME> </DFType>
                    </DFProperties>
                </Node>
                <Node>
                    <NodeName/>
                    <DFProperties>
                        <AccessType> <Get/> </AccessType>
                        <DFFormat> <node/> </DFFormat>
                        <Occurrence> <OneOrMore/> </Occurrence>
                        <DFTitle>This node specifies URI entries of IUT UE for specific subscription set ID</DFTitle>
                        <DFType/>
                    </DFProperties>
```

FIG. 5b

```xml
<Node>
    <NodeName>IUT_URI</NodeName>
    <DFProperties>
        <AccessType> <Get /> </AccessType>
        <DFFormat> <bin /> </DFFormat>
        <DFFormat> <chr/> </DFFormat>
        <Occurrence> <One /> </Occurrence>
        <DFTitle>This leaf node specifies the identifier of IUT UE</DFTitle>
        <DFType> <MIME>text/plain</MIME> </DFType>
    </DFProperties>
</Node>
<Node>
    <NodeName> Device_Nickname </NodeName>
    <DFProperties>
        <AccessType> <Get /> </AccessType>
        <DFFormat> <chr/> </DFFormat>
        <Occurrence> <One /> </Occurrence>
        <DFTitle>This leaf node specifies the Device Nickname</DFTitle>
        <DFType> <MIME>text/plain</MIME> </DFType>
    </DFProperties>
</Node>
<Node>
    <NodeName> Media_Token </NodeName>
    <DFProperties>
        <AccessType> <Get /> </AccessType>
        <DFFormat> <chr/> </DFFormat>
        <Occurrence> <One /> </Occurrence>
        <DFTitle>This leaf node specifies the Media Token</DFTitle>
        <DFType> <MIME>text/plain</MIME> </DFType>
    </DFProperties>
</Node>
            </Node>
        </Node>
    </Node>
</MgmtTree>
```

FIG. 5b
(cont.)

| User | Public User ID A | Private user ID | Subscription set | Device ID (e.g. Instance ID) | Device Nickname | IUT | ICSI or IUT set | session leg mapping | Media token | PS preferred |
|---|---|---|---|---|---|---|---|---|---|---|
| User A | | Private user ID I | Subscription set A | Device ID I (e.g. Instance ID) | Device Nickname I | IUT controller | | | Media token I | PS preferred |
| | | Private user ID II | | Device ID II (e.g. Instance ID) | Device Nickname II | IUT controlee | | | Media token II | |
| | | Private user ID III | | Device ID III (e.g. Instance ID) | Device Nickname III | IUT controlee | | session leg mapping | Media token III | CS preferred |

FIG. 21

| | Public User ID | Private user ID | Subscription member set | Device ID (e.g. Instance ID, GRUU) | Device Nickname | IUT controller | ICSI or IUT set of the user | session leg mapping | Media token | Authorization rules | PS preferred |
|---|---|---|---|---|---|---|---|---|---|---|---|
| User A | Public User ID A | Private user ID I | Subscription member set A | Device ID I (e.g. Instance ID, GRUU) | Device Nickname I | IUT controller | ICSI or IUT set of the userA | session leg mapping | Media token I | Authorization rules | PS preferred |
| | | Private user ID II | | Device ID II (e.g. Instance ID, GRUU) | Device Nickname II | IUT controlee | | | Media token II | | CS preferred |
| | | Private user ID III | | Device ID III (e.g. Instance ID, GRUU) | Device Nickname III | IUT controlee | | session leg mapping | Media token III | | |
| User B | Public User ID B | Private user ID I' | Subscription member set A | Device ID I' (e.g. Instance ID, GRUU) | Device Nickname I | IUT controller | ICSI or IUT set of userB | session leg mapping | Media token I' | Authorization rules | PS preferred |
| | | Private user ID II' | | Device ID II' (e.g. Instance ID, GRUU) | Device Nickname II | IUT controlee | | | Media token II' | | CS preferred |
| User C | Public User ID C | Private user ID I'' | Subscription member set A | Device ID I'' (e.g. Instance ID, GRUU) | Device Nickname I | IUT controlee | ICSI or IUT set of userC | session leg mapping | Media token I'' | | |

FIG. 22

SYSTEM AND METHOD FOR IMPLEMENTING MEDIA AND MEDIA CONTROL TRANSFER BETWEEN DEVICES

CROSS-REFERENCE TO RELATED APPLICATIONS

This is a continuation of U.S. application Ser. No. 12/771,867, filed Apr. 30, 2010, which claims priority to U.S. Provisional Patent Application No. 61/175,403, filed on May 4, 2009, both hereby incorporated by reference.

BACKGROUND

The present disclosure relates generally to media and/or control function management for sessions in mobile communication systems and more specifically to a system and method for implementing media and/or control function transfer between devices.

As used herein, the term "device" can refer to the terms "mobile station" (MS), "user agent," or "user equipment" (UE) which can include electronic devices such as fixed and mobile telephones, personal digital assistants, handheld or laptop computers, smartphones, printers, fax machines, televisions, set top boxes, and other video display devices, home audio equipment and other home entertainment systems, home monitoring and control systems (e.g., home monitoring, alarm systems and climate control systems), enhanced home appliances such as computerized refrigerators and similar devices that have network communications capabilities. In some configurations, UE may refer to a mobile, wireless device. Such UEs that are mobile, wireless devices may or may not include a memory module that is internal to the device or can be removed, examples being but not limited to: a subscriber identity module (SIM) or a UICC card possibly including an ISIM application, Compact Flash, MicroSD, R-UIM etc. SIM/UICC functionality may also be provided for by software downloadable SIM/UICC security software. The terms may also refer to devices that have similar capabilities but that are not readily transportable, such as desktop computers, set-top boxes, TV, IPTV or network nodes. The term device also covers the term SIP User Agent (UA) that can be fixed or mobile. When a UA is a network node, the network node could act on behalf of another function such as a UA or a fixed line device and simulate or emulate the UA or fixed line device. For example, for some UAs, the IMS SIP client that would typically reside on the device actually resides in the network and relays SIP message information to the device using optimized protocols. In other words, some functions that were traditionally carried out by a UA can be distributed in the form of a remote UA, where the remote UA represents the UA in the network. The term "UA" can also refer to any hardware or software component that can terminate a communication session that could include, but is not limited to, a SIP session. Also, the terms "user agent," "UA," "user equipment, "UE," and "node" might be used synonymously herein. Those skilled in the art will appreciate that these terms can be used interchangeably within the application.

A UE may operate in a wireless communication network that provides for high-speed data communications. For example, the UE may operate in accordance with Global System for Mobile Communications (GSM) and General Packet Radio Service (GPRS) technologies. Today, such a UE may further operate in accordance with Enhanced Data rates for GSM Evolution (EDGE), or Enhanced GPRS (EGPRS) or Enhanced GPRS Phase 2 (EGPRS2). Other wireless networks that UEs may operate include but are not limited to CDMA, UMTS, E-UTRAN, WiMax, and WLAN (e.g 802.11). UEs may also operate in fixed network environments such as xDSL, DOCSIS cable networks, ethernet or optical networks. Some UEs may be capable of multimode operation where they can operate on more than one access network technology either on a single access network at a time or in some devices using multiple access technologies simultaneously.

EDGE/EGPRS/EGPRS2 are examples of digital mobile communications technology that allows for increased data transmission rate and improved data transmission reliability. The network is often classified as a 2.75G network technology. EDGE has been introduced into GSM networks around the world since approximately 2003, initially in North America. EDGE/EGPRS/EGPRS2 may be used in any packet-switched application, such as those involving an internet connection. High-speed data applications, such as video and other multimedia services, benefit from EGPRS' increased data capacity. A UE may also operate in other wireless technologies such as but not limited to Wimax, Wifi, etc.

As communications network grow increasingly complex, network infrastructure is moving away from the telephony-based concept of a single identity, such as a telephone number, that uniquely maps to a single telephone line, cell phone or other UE. For example, Session Initiation Protocol (SIP) and other related internet based communication technologies support registering of multiple devices with a network, each device sharing the same user identity (for example, a SIP or Tel Uniform Resource Identifier (URI)), or a group of overlapping or identical identities. This group of identities is called an Implicit Registration Set (IRS). In keeping with the evolution of communication networks, SIP is also capable of support of various media types including but not limited to text, data for applications, audio and video, etc within the same session established between a network and a UE. Those skilled in the art will appreciate that the devices/SIP UA's can have different capabilities, such as small screen that supports video or an IPTV that supports HDTV. It would therefore be advantageous if a session between 2 or more devices/SIP UA's started on a small screen that had a video and voice component could have its video component moved to the HDTV when the user was near it. This capability is called Inter UE Transfer (IUT) and is defined in 3GPP TS 23.237 and 3GPP TS 24.292.

To provide for effective operation of the network and associated devices in IUT, PNM or other services like BlackBerry Unite, some networks include administrator or controller UEs having the capability to manage the devices or sessions that can be delivered within a group of target UEs that are each correlated with a network server. In that case, the administrator or controller UE may be configured to manage the operation of various features/parameters made available via one or more other UEs. In some cases, the controller function may be transferred from a controller UE to another UE which has the capability of providing controller functionality. In some cases multiple UEs may act as controller. In some cases, a controller UE may implement Personal Network Management (PNM) controller functionality. In some cases, a UE has multiple User Agents, one per access network. Similarly, a administrator or controller UA may be configured to manage the operation of various features or parameters made available via one or more other UAs. An administrator or controller UA can also be an administrator or controller UE. In the following, the terms UE and UA are often used interchangeably, unless it is clear from the context.

SIP enables a UE to be configured such that it can be notified depending on senders' identities for communication filtering and the diversion of services based upon which UE a communication is addressed to. For example a user may configure a call/communication forwarding service to allow a particular public user identity (such as a home phone number or email address) to be provided to family members to reach a user directly at the user's mobile phone and friends or family members may be forwarded to personal voicemail while co-workers are forwarded to an office phone which forwards ultimately to corporate voicemail.

As such, SIP allows a user to have consistent identities across multiple UEs wherein the UEs may include home phones, personal mobile phones, work phones, corporate mobile phones, vacation home phones, laptop computer voice-over-IP (VoIP) clients, fax machines, etc. The consistent public user identities also allow a user to be reachable at whichever UE the user happens to be currently using. This flexibility minimizes the necessity of maintaining a large list of device oriented contacts to identify each user in an address book and having to decide which device is best when attempting to establish a communication—each user (and all their associated cell phone, home phones, computers, etc.) may be identified by a single identification. As such, it is possible to communicate with someone using only a single identification with the network and/or the terminating user determining the most appropriate UE for use in contacting the individual.

In networks implementing SIP and having administrator or controller UEs, it is desirable to ensure that new sessions are to be established to UEs having the best capability to handle the content, which may include various media types. It would not be most appropriate, for example, to accept media including video content on a conventional office phone either having no means for displaying the video content or having a very small video screen when a television or computer screen/monitor is available for use by the user. Furthermore, when a UE is already involved in a session that uses one or more media types and the UE receives an invitation to add or modify one or more media types to the session, a controller UE should be identified so that the user can request to transfer the new media type to a different UE that can support and process or render the new media type. For example, if a user is engaged in an audio session on the user's mobile phone and the user wishes to accept added video steaming media on another device, the controller UE provides the user with the ability to select another device, such as a Laptop PC, for receiving and displaying the added video streaming media based on such as device capability and user preference.

Additionally the user may use different devices for controllers of the session during the time of the session. For example, a user may accept the session or one or more media components of the session on his mobile phone outside in the garden but then move inside the house and transfer both the audio and video components to his desktop computer and since the user wishes now to control the session from his desktop computer he also transfers control of the session from his mobile phone to his desktop computer. Finally, controller status functionality should only be transferred between certain member UEs capable of being the controller devices (e.g., basic televisions are unlikely to have the capability to interact with the user to perform the controller functionality) and authorized to receive the controller function by the network. Accordingly, it is important to provide a secure mechanism to distribute and process transfer requests for the session, media, and controller functionality among a set of UEs that can potentially be used by different subscribers (e.g., shared devices such as home phones and televisions).

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 3 illustrates an example flow for registering a UE with an IMS network causing registration with an SCC AS;

FIGS. 5a and 5b illustrate the parameters and DDF of the exemplary allowed IUT List MO shown in FIG. 4;

FIG. 21 is an illustration of an exemplary structure for storing information within a network describing associated controller and controllee UEs;

FIG. 22 is an illustration of exemplary information stored in the network such as within an HSS.

DETAILED DESCRIPTION

Figure 1:
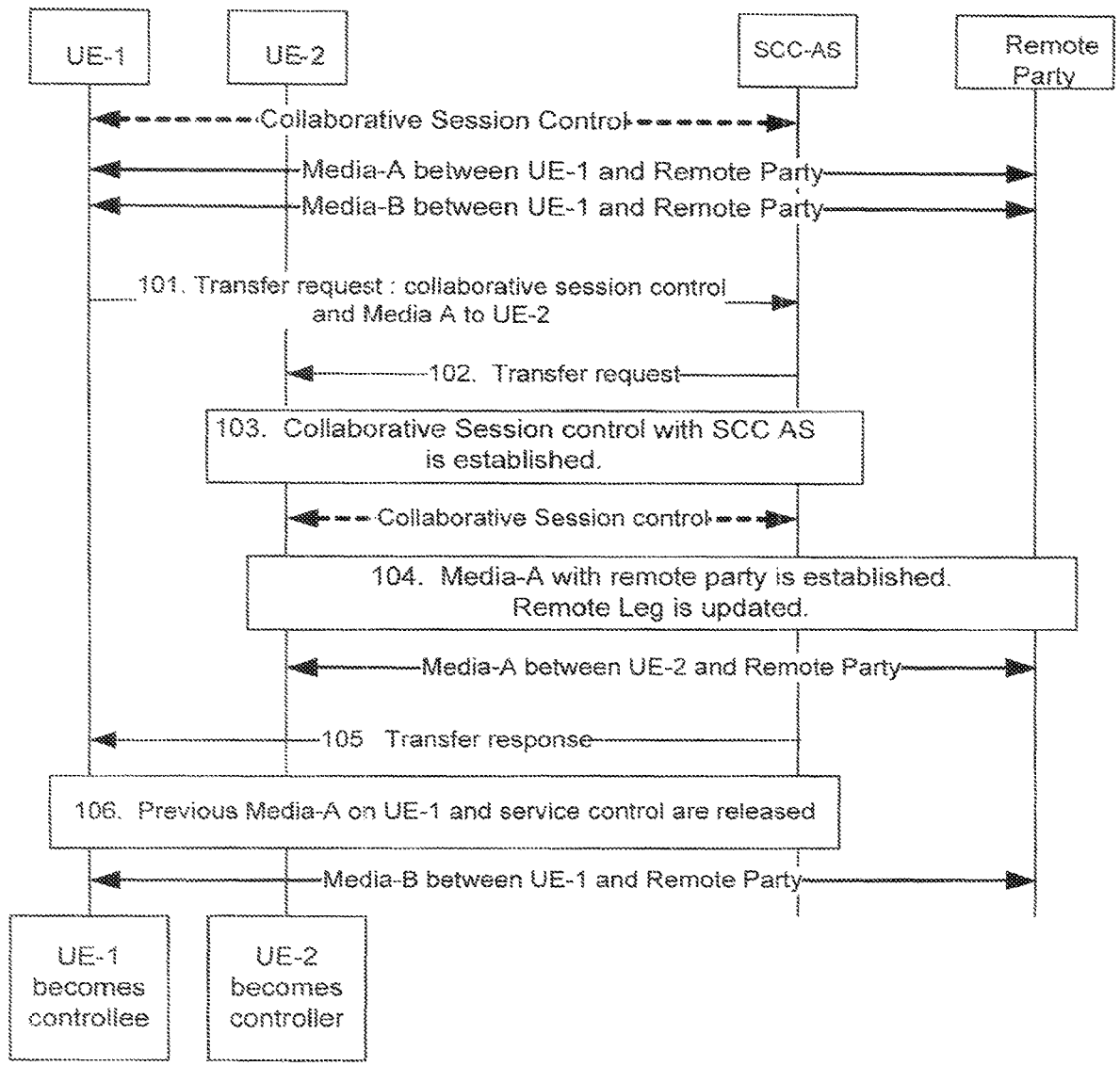
FIG. 1 illustrates an example flow to transfer media and IUT controller function between UEs associated with a network.

The present disclosure overcomes the aforementioned drawbacks by providing a system and method for media and/or control function management in mobile communication systems and more specifically a system and method for implementing media transfer and/or control function transfer between devices.

In one example, the method for transferring controller function from a first user equipment (UE) to a second UE possibly belonging to the same party includes establishing a session for communicating media content between the first UE and a third UE. The first UE is initially assigned controller function for the session. The method includes receiving a request from the first UE to transfer at least a subset of controller function for the session to the second UE, and determining a capability of the second UE to implement a controller function. When the second UE has the capability to operate as a controller, the method includes assigning the at least a subset of controller function for the session to the second UE, and responding to the request to transfer at least a subset of controller function for the session to notify the first UE to release the session.

In another example, the method for transferring controller function from a first user equipment (UE) to a second UE includes establishing a session for communicating media content between the first UE and a third UE. The first UE is initially assigned controller function for the session and the first UE includes an interface. The method includes receiving a request via the first UE interface to transfer controller function for the session to the second UE, transmitting a session controller function transfer request to an application server, and receiving a transfer response from the application server. When the transfer response indicates that the first UE should release session controller function, the method includes releasing session controller function.

In another example, a method for transferring a session for communicating media content between a first user equipment (UE) and a third UE includes assigning the first UE controller function for the session, receiving a request from the first UE to transfer the session for communicating media content to a second UE, and determining a capability of the second UE to receive the session for communicating media content. When the second UE has the capability to receive the session for communicating media content, the method includes transferring the session for communicating media content to the second UE, and responding to the request to transfer the session for communicating media content to the second UE to notify the first UE to release the session.

The various aspects of the disclosure are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

As used herein, the terms "component," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") as used herein is intended to encompass a computer program accessible from any computer-readable device, carrier, or media. For example, computer readable media can include but are not limited to magnetic storage devices (for example, hard disk, floppy disk, magnetic strips, and the like), optical disks (for example, compact disk (CD), digital versatile disk (DVD), and the like), smart cards, and flash memory devices (for example, card, stick, and the like). Additionally, it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

The present system provides media and/or control function management for implementing media transfer or control function transfer between devices associated with a communications network. In one implementation, the system performs inter UE transfer (IUT) per 3GPP TS 23.237 for transferring one or more media components of a session or some or all media flows and/or controller function (IUT controller) from one or more controller SIP UA's or UEs to one or more controllee SIP UA's or UEs. The system may be implemented in various communication networks wherein UEs are configured to be assigned a single shared identification (e.g. Tel URI, SIP URI, MSISDN, C-MSISDN, GRUU (Globally Routable User Agent URI), etc.), or have identification information that overlaps with other UEs associated with the network. Within the network, each UE may initiate various communication sessions, each session involving the communication of data that may include multiple media types such as but not limited to data for applications (media type application), voice, text, video (including various encoding schemes) and audio.

In one configuration, the system is implemented via a network that supports SIP and has various administrator or controller SIP UAs or UEs in addition to non-controller or controllee SIP UA's or UEs. The controller function may be moved from a first controller UE to another UE depending upon but not limited to network rules, operator policies, user preferences, or other system requirements. In some cases, the UEs that have controller or controllee function may be provided via a network wherein the controllee UEs are configured in a similar manner as the controller UEs having similar functional capabilities and system designs. When a UE among UEs is first registered with a network, the first UE supporting controller functionality registered with the wireless server may be automatically designated as the administrator or controller UE. In some cases, when a network receives an initial transfer request for collaborative sessions sent by a UE supporting the controller functionality, the UE may be automatically designated as the administrator or controller UE. However, other algorithms may be employed to determine the preliminary controller UE amongst a collection of UEs. After connecting to the network, a user may optionally change the controller designation from the first registered UE to one of the other registered UEs under control by the user or by other associated users.

Using the present system a network serving a user with multiple UEs, each sharing a common identification, may receive an invitation to participate in a session that includes various media types. After receiving the invitation, the network transfers, forwards, or sends the session invitation (e.g. SIP INVITE, or SIP Re-INVITE) to the UE of the user in accordance with the Media types described in the invitation, preferred UE specified by the user, or other information available to the controller UE or network. If the user is already involved in a session using various media types and an offer (e.g. session description protocol (SDP OFFER) is received for the same session that adds, deletes, or modifies one or more media types, a controller UE for transferring the new media type and session control function to a different UE may be identified.

In one implementation, when the UE (e.g., an ICS UE) receives a SIP INVITE request containing SDP for establishing a session using an IP bearer, the ICS UE establishes the session in accordance with 3GPP TS 24.229, but with the following clarifications. First, if the SIP INVITE request contains a Target-Dialog header containing dialog parameters that correspond to an existing dialog (or a dialog in the process of being established) between the ICS UE and Service Consistency and Continuity application server (SCC AS) the ICS UE treats the SIP INVITE request as another dialog that is part of the same session as the dialog identified by the dialog parameters contained in the Target-Dialog header. Second, if the SIP INVITE request does not contain a Target-Dialog header but there is an existing dialog (or a dialog in the process of being established) between the ICS UE and SCC AS, the SCC AS can check whether the dialog parameters for this request correspond to the dialog parameters received in a Target-Dialog header received on an existing dialog (or a dialog in the process of being established) between the ICS UE and SCC AS and if so then the ICS UE can treat the SIP INVITE request as another dialog that is part of the same session as the dialog upon which the Target-Dialog header was received. This second clarification may cover the possibility that requests arrive out of the order in which they were sent.

A controller UE configured to implement IUT in accordance with the present system may be configured to do one or more than one of the followings: to add one or more media flows to a session by creating a new access leg on a different UE, to add one or more media flows to a session on an existing access leg on a different UE, to remove one or more media flows from a session on an access leg on a different UE, to provide MMTel Service control with media on a different UE (see, for example, 3GPP TS 22.173), and to provide an update of media characteristics on different UEs. Accordingly, each controller UE may be configured to establish and/or release collaborative sessions that provide one or more sessions anchored with a particular network entity or node such as a SCC AS. While maintaining an on-going collaborative session, each controller UE may transfer media flows of the collaborative session to a target UE. Furthermore, each controller UE may be configured to transfer all or some of the available one or more media flows to a target UE with or without establishing a collaborative session. If transferring all media flows to a target UE, the existing session on the controller UE may be released.

In one example system implementation, to implement inter-UE transfer (IUT), the SCC AS uses the ISC reference point towards the S-CSCF for execution of the Inter-UE Transfer. For example, for enablement and execution of IUT, the SCC AS may first analyze the information required for Inter-UE Transfer as described below and decide which access networks should be executed based on operator policy and user preferences. The SCC AS may then reject the Inter-UE Transfer request if it is not aligned with the operator policy. The SCC AS may retrieve from the home subscriber server (HSS) after registration the C MSISDN bound to the IMS Private User Identity stored in the user profile in the HSS, and retrieve from the HSS after a third party registration the controller functionality for Inter-UE Transfer bound to the IMS Private User Identity stored in the user profile in the HSS. The SCC AS may also determine whether a UE is allowed and capable of controller functionality for Inter-UE Transfer, correlate the Inter-UE Transfer request with the anchored session, using information provided in the incoming SIP INVITE or incoming Inter-UE Transfer request, and execute the IMS Inter-UE Transfer between different UEs belonging to the same IMS subscription connected via the same or different access networks. The SCC AS may also provide IUT Transfer specific charging data, provides a controller UE with information of transferable UEs, and decide, based on analysis of the various service continuity related input factors, whether to update provisioned operator policy for Inter-UE Transfer. The SCC AS may also generate and update operator policy for Inter-UE Transfer by sending operator policy to the UE via OMA DM including the priority between the operator policy and user preferences that could be used also to initiate Inter-UE Transfer procedure for ongoing sessions, and determine whether to send a controller UE a received incoming session invitation from remote party so that the terminating controller UE can initiate Inter-UE Transfer.

Generally, the SCC AS provides functionality to combine and/or split media flows over one or more Access Networks as needed for Session Transfers, session termination, or upon request by the UE to add media flows over an additional Access Network during the setup of a session, or upon request by the UE to add and/or delete media flows over one or more Access Networks to existing sessions.

When handling media flows of an IMS session, the SCC AS may take into account the services associated with the session.

In order to route SIP METHODs (such as SIP INVITE) over a particular access leg it is necessary to identify the particular registration flow that corresponds to that access leg.

Draft-ietf-sip-outbound describes how a SIP UA or UE can register over multiple registration flows by which requests can reach the UA or UE. As is supported in 3GPP IMS the UE uses the mechanism defined in Draft-ietf-sip-outbound in order to register using different flows over different access networks. Each flow over the different access networks may, as defined in Draft-ietf-sip-outbound, contain a different "reg-id" contact header parameter in the Contact header of the SIP REGISTER request. When registering the UE includes a P-Access-Network-Info header in the SIP REGISTER request as described in 3GPP TS 24.229: Example syntax of extended P-Access-Network-Info header field per 3GPP TS 24.229 is shown in Table 1.

TABLE 1

| P-Access-Network-Info | = "P-Access-Network-Info" HCOLON access-net-spec *(COMMA access-net-spec) |
|---|---|
| access-net-spec | = (access-type / access-class) *(SEMI access-info) |
| access-type | = "IEEE-802.11" / "IEEE-802.11a" / "IEEE-802.11b" / "IEEE-802.11g" / "IEEE-802.11n" / "3GPP-GERAN" / "3GPP-UTRAN-FDD" / "3GPP-UTRAN-TDD" / "3GPP-E-UTRAN-FDD" / "3GPP-E-UTRAN-TDD" / "ADSL" / "ADSL2" / "ADSL2+" / "RADSL" / "SDSL" / "HDSL" / "HDSL2" / "G.SHDSL" / "VDSL" / "IDSL" / "3GPP2-1X" / "3GPP2-1X-HRPD" / "3GPP2-UMB" / "DOCSIS" / "IEEE-802.3"/ "IEEE-802.3a" / "IEEE-802.3e" / "IEEE-802.3i"/ "IEEE-802.3j" / "IEEE-802.3u" / "IEEE-802.3ab"/ "IEEE-802.3ae"/"IEEE-802.3ak"/IEEE-802.3aq"/ "IEEE-802.3an" / "IEEE-802.3y"/ "IEEE-802.3z"/ "IEEE-802.3y"/ token |
| ...access-class | = "3GPP-GERAN" / "3GPP-UTRAN" / "3GPP-E-UTRAN" / "3GPP-WLAN" / "3GPP-GAN" / "3GPP-HSPA" / token |
| np | = "network-provided" |
| access-info | = cgi-3gpp / utran-cell-id-3gpp / dsl-location / i-wlan-node-id / ci-3gpp2 / eth-location / np/ extension-access-info |
| extension-access-info | = gen-value |
| cgi-3gpp | = "cgi-3gpp" EQUAL (token / quoted-string) |
| utran-cell-id-3gpp | = "utran-cell-id-3gpp" EQUAL (token / quoted-string) |
| i-wlan-node-id | = "i-wlan-node-id" EQUAL (token / quoted-string) |
| dsl-location | = "dsl-location" EQUAL (token / quoted-string) |
| eth-location | = "eth-location" EQUAL (token / quoted-string) |
| ci-3gpp2 | = "ci-3gpp2" EQUAL (token / quoted-string) |

As can be seen from the syntax of the P-Access-Network-Info, the access-type indicates the access network technology used by the network over which the SIP REGISTER request is routed. However, whilst the "reg-id" parameter uniquely identifies the registration flow, there is no current mechanism that enables the network to direct that a SIP METHOD such as SIP INVITE be directed over a particular registration flow. To enable this, it is possible to define and include in the Contact header of the SIP REGISTER request a media feature tag that identifies the registration flow (the "reg-id" parameter is not a media feature tag). Below are examples of two possible embodiments for such a media feature tag. Those skilled in the art will appreciate that any construct of appropriate alphanumeric characters can be used to convey the same meaning from the SIP UA/UE.

In the first example shown in Table 2, the feature tag g.3gpp.icsflow is defined which allows a string to be included in the media feature tag identifying the flow. This string could contain the same identifier value as in the "reg-id" parameter (e.g., g.3gpp.icsflow=[regid]) or it could contain some other string, however, in one implementation the string must be different for each registration flow. The UE could allow the user to define human understandable labels for the string used in the media feature tag since the user may need to use these labels to indicate to which access leg they wish to transfer a media type to when performing a media transfer (e.g "internet", "cableTv", "cellular", "WLAN").

TABLE 2

Media feature-tag name: g.3gpp.icsflow
ASN.1 Identifier: 1.3.6.1.8.2.a
Summary of the media feature indicated by this tag: This feature-tag when used in a SIP REGISTER request indicates a particular registration flow that the device is using register over.

TABLE 2-continued

Values appropriate for use with this feature-tag: string with an equality relationship.
Examples "Internet", "cableTv", "cellular", "WLAN"
The feature-tag is intended primarily for use in the following applications, protocols, services, or negotiation mechanisms: This feature-tag is most useful in a communications application, for describing the capabilities of a device, such as a phone or PDA.
Examples of typical use: Indicating the registration flow that the device is using.

In another example shown in Table 3, the existing g.3gpp.ics media feature tag is enhanced to also indicate whether the registration is directly from the mobile phone or from a network node also indicate which registration flow is being used.

TABLE 3

Media feature-tag name: g.3gpp.ics
ASN.1 Identifier: 1.3.6.1.8.2.x
Summary of the media feature indicated by this tag: This feature-tag when used in a SIP REGISTER
request indicates that the function is ICS capability and may operate in ICS mode and indicates a
particular registration flow that the device is using register over. This feature-tag when used is a none
SIP REGISTER method indicates that the function wants to invoke ICS functionality.
Values appropriate for use with this feature-tag: string with an equality relationship
Some examples
   "Principal[#]" When used in a SIP REGISTER request indicates that the function that is ICS capable is a
      mobile phone. When used in another SIP method indicates that the function wants to invoke ICS
      functionality. [#] is a numerical digit indicating the particular registration flow that the device is using
      register over and equates to the SIP Outbound RegID.
   "server"               Indicates that the function that is ICS capable is a network node.
The feature-tag is intended primarily for use in the following applications, protocols, services, or
negotiation mechanisms: This feature-tag is most useful in a communications application, for
describing the capabilities of a device, such as a phone or PDA.
Examples of typical use: Indicating that a mobile phone (principal) can support or wants to use ICS or
that a network node (server) wants to invoke ICS functionality and Indicating the registration flow that
the device is using The UE, when registering, includes the P-Access-Network-Info header containing the identification of the Access Technology used on that access leg in the the SIP REGISTER request along with a media feature tag containing a unique identifier for the flow as described above in the Contact header of the SIP REGISTER request.

The SCC AS or another network node can obtain the media feature tag by subscribing to the registration event package as per RFC 3860 or the enhanced third party registration procedures (e.g., Incoming SIP REGISTER request included in the body of the third party SIP REGISTER Request). The P-Access-Network-Info header can also be obtained by the SCC AS from the third party SIP REGISTER Request.

The SCC AS may also obtain registration state information that it needs to implement IMS Centralized Services (ICS) specific requirements from any received third-party REGISTER request (e.g. including information contained in the body of the third-party REGISTER request) as specified in 3GPP TS 24.229, any received reg event package as specified in 3GPP TS 24.229, or the Sh interface as specified in 3GPP TS 29.328 and 3GPP TS 29.329, for example. Using these mechanisms the SCC AS can obtain the access-type and, if present, access-class values from the P-Access-Network-Info header and the value of the g.3gpp.icsflow media feature tag and associate the access-type and, if present, access-class values with the value of the g.3gpp.icsflow media feature tag in order that a request can be routed over a specific flow that corresponds to a specific IP-CAN.

The SCC AS, or another network node, stores the access-type and/or access class information (possibly including the associated location information) obtained from the P-Access-Network-Info header in association with the access leg/flow identifier obtained from the media feature tag. Note that the P-CSCF can also include additional access types or access class values in the P-Access-Network-Info header containing the access class and access type as verified by the network and indicated as such by the inclusion of the "np" (network provided) parameter. Based upon availability and the policy of the operator, the access type and/or the access class from either the UE provided P-Access-Network-Info header or the network provided P-Access-Network-Info header or both may be stored in association with the access leg/flow identifier obtained from the media feature tag.

When the SCC AS (or another network node) based upon an operator policy or user preference or user configuration determines that a request containing certain offered media types is to be routed over a certain access leg, the SCC AS (or another network node) obtains the access leg/flow identifier previously obtained from the media feature tag that is stored in association with access type and/or the access class from the P-Access-Network-Info header. Then the SCC AS (or another network node) includes in the request an Accept-Contact header containing the media feature tag (e.g g.3gpp.icsflow) with the value set to the access leg/flow identifier that was associated with the access type and/or the access class for the access leg that the request is to be routed over. The parameters "require" and "explicit" may optionally also be included in the Accept-Contact header associated with the media feature tag containing the access leg/flow identifier. As a result, the request is routed to the UE using the desired access leg using the mechanism described in RFC 3841 and correspondingly if the request is accepted the media to also be established using that access leg.

In some implementations, the network operator's policy is provisioned in the network by the operator, and can be communicated to the UE during initial provisioning or via OMA Device Management, for example. The operator policy may be communicated to the UE, via OMA Device Management, whenever the policy is updated by the operator.

The operator policy may indicate, for each supported type of media or group of media, a list of access networks that are restricted for originating sessions and session transfer, a list of preferred access networks (in order of priority) to be used by the UE with SC capabilities for originating sessions and session transfer, when those access networks become available and session transfer is possible, and whether the UE with SC capabilities "shall"/"should"/"may" start transferring media flow(s) to target access networks with higher priorities than the current access network, when the target access networks become available and session transfer is possible. By indicating "shall", the operator mandates the UE to start session transfer according to the home operator's list of preferred access networks as soon as possible. By indicating "should", the operator recommends the UE to start session transfer according to the home operator's list of preferred access networks, if session transfer is possible and desirable after having taken into account the Local Operating Environment Information. By indicating "may", the operator leaves the UE free to decide whether or not to start session transfer in accordance with user preferences (when configured), if session transfer is possible and desirable after having taken into account the Local Operating Environment Information. Whenever user preferences are not configured, the UE may take into account the home operator's list of preferred access networks. The operator policy may also indicate whether to keep or drop non transferable media flow(s) in the case of partial session transfer. Generally, the operator policy for ession transfer is consistent with operator policy for T-ADS.

User preferences may indicate, for example, preferred access. The Local Operating Environment Information can be implementation specific and may comprise of such items as radio environment information, quality of IP connection (jitter, delay and packet loss), application specific requirements, memory considerations, power considerations, etc. The UE may take in account operator policy, user preferences and the Local Operating Environment Information when deciding which access to use for outgoing sessions or before considering initiating Session Transfer. Generally, user preferences for Access Transfer are not transferred to the network.

For IUT, the UE may indicate the following user preferences to the SCC AS via Ut interface and the SCC AS may take in account operator policy and user preferences when deciding whether the UE is allowed and able to act as a controller and for determining which access network to use for incoming sessions, which media type to transmit on certain UE and whether to send a controller UE incoming session invitation from remote party: preferred UE to act as a controller UE; preferred access network type for incoming sessions; preferred media type to be received on particular UE of the user; and preference to receive incoming session invitation from remote party on a controller UE.

Furthermore, for IUT, the UE is generally configured to support an IUT controller or controlee functionality. In the case of a terminating UE, the UE may be configured to become a Controller UE in order to apply IUT for the ongoing session when a remote end sends a session invitation.

If the user wishes to direct that a media session be established for one or more media types over a particular access leg when performing a media transfer the user can indicate this by selecting on their controller UE the access leg they wish to use for the particular media type. The UE could have previously allowed the user to define human understandable labels for the string used in the media feature tag so that the user can use these labels to indicate which access leg they which to transfer a media type when performing a media transfer (e.g "Internet", "cableTv", "cellular", or "WLAN"). Alternatively, the device, when registering over an access type, provides a mapping between human readable access types that the user can read and the access types that the device supports. Example embodiments are below but those skilled in the art will appreciate that the mapping could be more or less constrained where the idea is that a human readable alphanumeric string is mapped against a number of possible P-Access-Network-Info header access type values.

E.g    WLAN="IEEE-802.11"/"IEEE-802.11a"/"IEEE-802.11b"/"IEEE-802.11g"/"IEEE-802.11n"

DSL="ADSL"/"ADSL2"/"ADSL2+"/"RADSL"/"SDSL"/"HDSL"/"HDSL2"/"G.SHDSL"/"VDSL"/"IDSL"

Cellular="3GPP-GERAN"/"3GPP-UTRAN-FDD"/"3GPP-UTRAN-TDD"/"3GPP-E-UTRAN-FDD"/"3GPP-E-UTRAN-TDD"

CableTV="DOCSIS"

For example, if the user has a multimode capable mobile phone that supports both WLAN and Cellular (e.g EDGE/UMTS/LTE) access simultaneously, the user may wish the video media type to be received over the WLAN access for reasons of bandwidth efficiency, cost efficiency or better picture quality while using the Cellular connection for voice and audio media types. To do this the UE includes in the request used to request the media transfer (e.g a SIP REFER request) an Accept-Contact header containing the media feature tag (e.g g.3gpp.icsflow) with the value set to the access leg/flow identifier for the access leg that the user selected the transferred media type is to be routed over. The parameters "require" and "explicit" may optionally also be included in the Accept-Contact header associated with the media feature tag containing the access leg/flow identifier. The Accept-Contact header along with its values could in the case of a SIP REFER request be embedded within the Refer-To header. When the SCC AS (or another network node) receives the media transfer request it then includes the Accept-Contact header along with its values from the media transfer request in the request sent to the UE the media is to be transferred to. This causes the request to be routed to the UE using the desired access leg using the mechanism described in RFC 3841 and, correspondingly, if the request is accepted, the media to also be established using that access leg. Note that the UE the media is to be transferred to could, in some cases (such as the example above), be the same UE acting as the controller UE sending the media transfer request.

FIG. 1 illustrates an example communication flow that may be implemented by the present system to transfer media and/or IUT controller function between SIP UA's or UEs associated with a network. The flow allows for transferring service control of a session containing two media components from a first controller UE (UE-1) to a second controllee UE (UE-2). Both the first and second UEs may share the same public user identity for example by sharing the same SIP URI or Tel URI, or having overlapping or identical public user identities defined by an Implicit Registration Set (IRS). They will however have unique Private Identities such as but not limited to IMS Private Identity, IMSI, MIN etc. In this example, UE-1 has an established multimedia session with a remote UE, whose session is anchored at an SCC AS. UE-1 initially facilitates collaborative session control.

As shown in FIG. 1, the multimedia session includes two media components (Media-A and Media-B) and UE-1 wants to transfer the collaborative session control and one of the media components (media-A) to UE-2 via an IUT. As illustrated, in step 101, UE-1 initiates the process of transferring the collaborative session control and media type (media-A) to UE-2 by communicating or sending a transfer request to the SCC AS. The transfer request indicates that the collaborative session control and media type (Media-A) are to be transferred to UE-2. The transfer request may contain SDP (possibly embedded in the Refer-To header of a SIP REFER request) containing the media type to be transferred. Alternatively, the media type may be indicated by signalling the appropriate feature tags etc. in the Transfer Request. The UE-2 may be identified by, but not limited to, GRUU, SIP URI, Tel URI, etc. In step 102 the SCC AS identifies the request, and performs a verification process. The verification process may include verification that UE-1 is allowed to perform IUT, and UE-2 identification, in this embodiment UE-2's GRUU is stored in the SCC AS (valid REGISTRATION exists) and stored against that GRUU are media feature tags that match those that have been received in the request from UE-1. If UE-2's GRUU does not exist or feature tags do not match then the request may be rejected. Alternatively, the verification process may include the SCC AS retrieving a Tel URI, SIP URI of an authorized UE. If the retrieved Tel URI, SIP URI matches one UE-1 could use, then the SCC AS may identify another target UE that matches the retrieved Tel URI, SIP URI. The SCC AS would then ensure that the feature tags in the accept contact header and the explicit and required parameters are set to choose an alternative contact to that of the one performing the request.

If UE-1 is allowed to request transfer of the collaborative session control and the media-A to UE-2, the SCC AS may communicate or send a request to UE-2 indicating that the collaborative session control and Media-A will be transferred to UE-2. For example, the SIP METHOD (e.g., SIP INVITE) may include as the target the GRUU of UE-2 along with a media feature tag that indicates the collaborative session control (IUT Controller function). The SIP METHOD may include in the Accept-Contact header the required media feature tags with "Explicit" and "Required". Alternatively, SDP is included that contains the media type to be transferred. In step 103 the system establishes collaborative session control between UE-2 and the SCC AS. As this point UE-2 becomes the controller UE (based upon receiving the media feature tag that indicates the IUT controller function) for the collaborative sessions. In other implementations, however, UE-1 may send a transfer request including the Media to be transferred, while keeping the collaborative session control on the UE-1 In this case the transfer request doesn't include the indication, identifier, token, flag, or media feature tag of the collaborative session control (IUT Controller function).

In one implementation, the collaborative session includes a logical set of one or more IP Multimedia Subsystem (IMS) sessions, possibly on two or more UEs sharing the same IMS subscription, anchored in the SCC AS that are presented on the remote leg as a single IMS session. The remote leg may be the call control leg between the SCC AS and the remote party as seen from the subscriber's perspective (for an additional example, see 3GPP TS 23.292 for the definition of Remote Leg for IMS sessions which use circuit switched media).

In step 104, a session carrying media-A between UE-2 and the SCC AS is established. At this point, the system may optionally update the remote leg between the SCC AS and the remote party in accordance with the establishment of the new session with UE-2. For example, the remote leg may be updated to implement a video codec adjustment or change (e.g., because a change is required by an IPTV device, or to otherwise renegotiate the media). After successful establishment of the collaborative session control and transfer of media-A to UE-2, the SCC AS sends a transfer response back to UE-1 in step 105 (e.g., a SIP NOTIFY request for a final response as per RFC 3515). After receiving the transfer response, the prior session carrying media-A on UE-1 may be released and the collaborative session control is released in step 106. After successful transfer of collaborative session control, UE-1 becomes a controllee UE (a UE that receives and/or transmits media flow (media-B) as part of the collaborative session, while being subordinate to the controller UE for session control) and UE-2 assumes the role of controller UE. Media type (Media-A) is communicated between UE-2 and the remote party and media type (Media-B) continues to be communicated between UE-1 and the remote party. If the transfer was not successful the SCC AS shall send a message back to UE-1 indicating failure of the transfer. The message can include but not limited to a SIP 488 (Not Acceptable Here) response. A Warning may be included in the response indicating the reason for the failure. The message to UE-1 indicating failure of the transfer may be contained in a SIP NOTIFY request containing in the body a SIPfrag of the response from UE-2 (e.g., a SIP 488 (Not Acceptable Here) response)).

The communication flow illustrated in FIG. 1 allows for the transfer of media and collaborative session control between UEs. In addition to media and collaborative session control transfer, the above flow may also transfer the controller function between UEs after one or more controller UEs authorize to give the controller function to the target UE.

In one implementation, to facilitate session transfer (e.g., for IMS service continuity), the UE may be configured to store and apply an operator policy (e.g., as described above) for session transfer. The UE may also initiate session transfer procedures based on trigger criteria including the current operator policy, user preferences and the local operating environment information, providing the necessary details for conducting a Session Transfer operation to the SCC AS. The UE may also provide its capability to support controller or controlee functionality for IUT, and initiate IUT procedure based on the current operator policy and user preferences, providing the necessary details for conducting an IUT operation to the SCC AS.

A UE can have multiple registration contexts possibly using different access networks. A UE, depending upon the IUT policy and implementation in the network or Application Server (AS), may be configured to use different access networks for some or all media transmission. For example, a UE may use a Wireless Local Area Network (WLAN) radio or some other access network for video type media transmission that has appropriate properties according to some predefined user preferences or network/operator policy.

An indicator indicating properties or a target UE or a specific target UE can also be capable of identifying an access technology (e.g., supported by the same device). Requests can be routed over a particular access leg that uses a particular access technology using the procedure described above.

In other system implementations the controller UE functionality may also be hosted in a physical box such as a set-top box or executable software hosted on a Personal Computer, Media Server, Home NodeB, or other device that is not physically operated by a user. In one example, a user is surrounded by media sinks or controllee UEs. The media sinks may enable interaction with or supplement the controller UE or other media controller device. For example, a TV remote may offer stop and rewind or other functions that are intercepted by the media sink or TV and forwarded to a device or UE configured to handle various functions. In some implementations a single box may support multiple SIP UAs for different external physical devices. For example a home server or set top box may implement multiple SIP UAs for other connected non SIP capable devices such as basic TVs, legacy fixed line phones, and non SIP enabled home entertainment systems.

Figure 2:
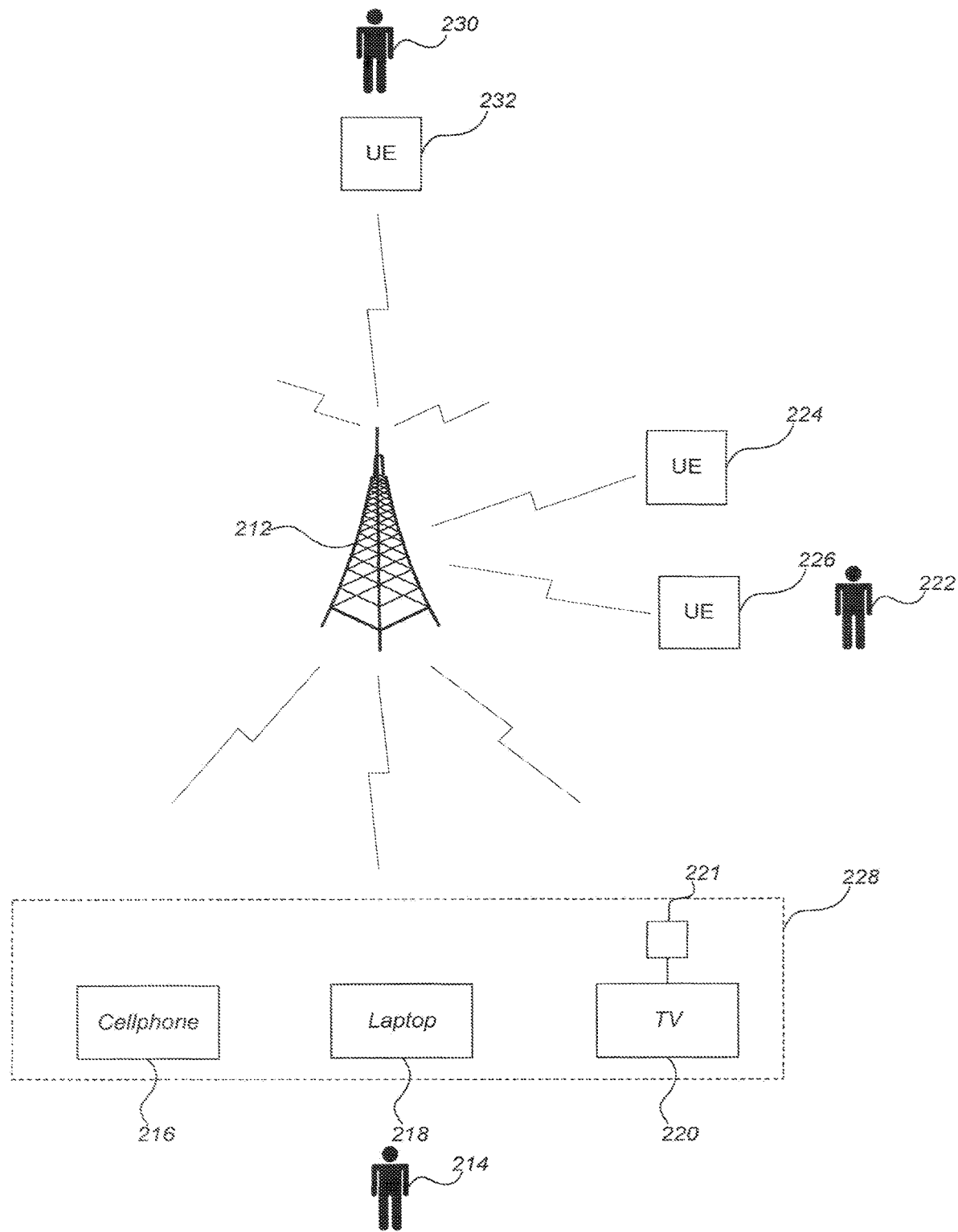
FIG. 2 illustrates an exemplary communications network for implementing the present system for performing IUT media and/or controller function transfer between UEs connected to the network.

Referring now to FIG. 2, an exemplary communications network for implementing the present system for performing IUT is illustrated. Network 212 is a communications network and includes various components such as a base station, SCC AS, Call Session Control Function (CSCF) such as P (Proxy)-CSCF, S (Serving)-CSCF, and I (Interrogating)-CSCF, mobile switching center (MSC) server, MSC enhanced for IMS Centralized Service (ICS) and/or various data storage systems for storing device capability, user preferences, lists of controller UEs and controllee UEs for IUT, session leg mapping information per device, and other rules or restrictions used in implementing the present system. By communicating with network 212, UEs can become associated (e.g., REGISTERED) with the network and communicate through network 212 with other associated UEs, or other devices configured to communicate via network 212. User 214 has several UEs 216, 218, and 220. UEs 216, 218 and 220 share a single identity 230 that may be defined by a Tel URI or SIP URI, for example in IRS set A. User 222 has UEs 224 and 226 which are also connected to network 212. UEs 224 and 226 also share an identity, by an IRS B, for example.

In FIG. 2, the UEs of user 214 include several different devices. UE 216 is a cell-phone having no video capacity, UE 218 is a laptop having voice-over-IP (VoIP) and video-conferencing capabilities, and UE 220 is a television configured to communicate with network 212, but having minimal user-input capability. In the present example, television 220 is connected by a hard-wired connection to proxy 221 for communicating with network 212. Proxy 221 may include a home gateway, cable box, set-top box, or other system for communicating with network 212. Proxy 221 may communicate with network 212 wirelessly, or via a hard-wired connection. However, those skilled in the art will appreciate that some or all of proxy 221 may be incorporated into television 220. As each of UEs 216, 218, and 220 establishes a connection with network 212, IUT-Controller function may be assigned to one or more of the UEs associated with user 214. The IUT-Controller function may be assigned based upon rules that evaluate any combination of the UE's functional capabilities, user preferences, network requirements, or other data made available via user 214, network 212, or any other entity in communication network 212. In the present example, UE 216 (a cell phone) is initially allocated IUT controller function. As such, UE 216 may send a transfer request of certain media on ongoing sessions to any one of UEs 218 and 220. As part of the transfer process, UE 216 may also issue a request to network 212 to transfer IUT controller function to any of UEs 218 and 220. In some cases, depending upon network-defined and user-defined rules, some or all of media and IUT controller function may be transferred to UEs 224 and 226 belonging to user 222.

With reference to FIG. 2, user 214 may initiate a phone call using cell-phone 216 to UE 232 belonging to user 230. Because cell-phone 216 does not support video, the established session includes only voice with no video. If, however, UE 232 of user 230 supports video and user 230 wishes to add video to the session user 230 may issue a request or invitation to user 214 to add video to the session. Because cell phone 216 cannot handle video, video cannot be added to the session unless user 214 instructs the UE 216 to redirect to a UE that can handle video. In this example, when receiving a request to add video to the ongoing session, user 214 may instruct the UE 216 to redirect the request with video type to laptop 218 having video-conferencing capabilities. To redirect the request with video to laptop 218, cell phone 216 generates a message such as a SIP 3xx non-final response in order to redirect the request with video type to network 212 (if a final SIP response was used such as a SIP 3xx response, the whole session could be redirected). Depending upon the system implementation, when receiving the request to add a new media type from a remote party, a network (e.g., SCC AS) may automatically initiate an invitation to the target UE based upon device capability, user preferences, or network rules, for example. Alternatively, a user interface provided by cell phone 218 may allow user 214 to instruct cell phone 218 to redirect the message to laptop 218. After network 212 (e.g., SCC AS) receives the request to redirect the request network 212 (e.g., SCC AS) verifies that laptop 218 can support the video type media. This consists of the SCC AS 212 looking at the media feature tags that were passed to the SCC AS 212 as part of the laptop 218 SIP REGISTRATION and stored in the SCC AS 212 against REGISTRATION laptop 218 GRUU Media Feature tags.

SCC AS 212 verifies that cell phone 216 has the capability to request the redirection and is authorized to do such a request. If these requirements are met, SCC AS 212 may check whether the feature tag contained in the SIP METHOD (e.g., SIP INVITE) from the controller is stored against the SIP Contact that the media is being redirect to. If the media feature tag is present, the SCC AS redirects the request to laptop 218 by sending an invitation request (e.g., a SIP INVITE) with SDP containing the media type. The SCC AS also sets the "Explicit" and "Required" per RFC 3841 to ensure that the correct target is chosen in the S-CSCF. Upon successful redirection and collaborative session establishment, cell phone 216 may also request a transfer of IUT controller function to laptop 218.

In the present example, IUT controller functionality is transferred to the laptop 218. As such, laptop 218 has the option of again having the video-conference session to other UEs accessible to user 214. For example, to facilitate viewing of the ongoing video conference by a larger collection of people, user 214 may wish to duplicate some or all of media on the video conference to a television 220 while keeping the video conference on the laptop 218 that is configured to communicate via network 212. In this example television 220 does not include a microphone. As such, user 214, using laptop 218 (which has IUT controller status), instructs network 212 to duplicate only the video portion of the ongoing videoconference session to television 220. In one implementation, where the SCC AS releases the media type from the transferred leg after the transfer, it is necessary to signal that duplication is requested. The duplication may be signaled using a new media feature tag, SDP variable, parameter, and/or SIP header. In another implementation, where the transferring UE releases the media type from the transferred leg after the transfer, no signaling of duplication being requested is required. Upon authorizing the duplication, SCC AS 212 sends a message such as a session invitation (SIP INVITE) with video media type to television 220 to facilitate viewing. The voice portion of the session, however, stays with laptop 218 so that user 214 can continue communicating with user 230. In this example, television 220 also has no user interface for receiving a user-input for initiating additional media transfers. Accordingly, IUT controller status stays with laptop 218 so that user 214 may transfer the video portion of the videoconference from television 220 to another device. If the IUT controller status were to be transferred to legacy television 220, there may be no mechanism by which to transfer the session to another device because legacy television 220 cannot provide the appropriate user interface for initiating such a transfer—the video portion of the session would become stuck with the legacy television 220.

Depending upon the system implementation, various policies or restrictions may be applied to the number and combination of UEs that may be established for each user. For example, a network may implement restrictions that state only one IUT controller capable UE can become an IUT controller, or multiple IUT controller capable UEs can become IUT controllers for any collaborative sessions, multiple IUT controller capable UEs can become IUT controllers with multiple UEs for all collaborative sessions but with only one IUT controller UE per the same collaborative session. Furthermore, a preferred bearer (circuit switched or packet switched, for example) may be specified by network rules, user preferences, or a combination thereof. For example, the preferred bearer setting may depend on media type and device capability e.g. circuit switched for speech media type sessions, and packet switched for video type sessions.

The network (e.g., SCC AS) may also use the following indications for charging purposes: an indication of which UE is an IUT controller, UE identity performing an IUT controller function, subscription set indication for IUT which indicates a set of UEs belong to the same subscription, and a bearer indication (there may be different charges depending upon the bearer being used).

In the present system, each UE may be configured to communicate with the network (e.g., via the SCC AS or another component of the communications network) to instruct the network, in this instance the SCC AS, as to whether the UE has the capability to support IUT controller functionality. In one implementation, the UE transmits its capabilities to the SCC AS such as using a SIP message including either a SIP METHOD such as SIP REGISTER, SIP PUBLISH, SIP SUBSCRIBE, SIP NOTIFY, SIP INVITE, SIP Re-INVITE, SIP UPDATE, SIP OPTIONS and SIP REFER or a SIP Response or eXtensible Markup Language-Configuration Access Protocol (XCAP) or Web Services based, e.g. using SOAP, or HTTP. One way for a UE to transmit its capabilities to the SCC AS is to use a media feature tag e.g. g.3gpp.iut in a Contact header. For example, SIP METHODs such as SIP REGISTER, SIP SUBSCRIBE, SIP NOTIFY, SIP INVITE, SIP Re-INVITE, SIP UPDATE, SIP OPTIONS, SIP PUBLISH, and SIP REFER that include a Contact header may be configured to include an IUT controller media feature tag to indicate a particular UE's support for IUT controller functionality. Alternatively, SIP responses, such as SIP 200 OK, can also include a Contact header that may be configured to indicate a UE's controller capabilities.

When implemented using Contact headers, the IUT controller feature tag may include, for example, three possible values (only exemplary values are described as the system may use other values having various names and attributes). First, a value "Active" may indicate that the UE with the contact address associated with the IUT controller feature tag is currently acting as the IUT controller for the session. Second, a value "Inactive" may indicate that the UE with the contact address associated with the IUT controller feature tag is currently acting as an IUT controllee (i.e., not the Active IUT Controller) for the session but is capable of being assigned the IUT controller role. Third, a value "Passive" may indicate that the UE with the contact address associated with the IUT controller feature tag is currently acting as an IUT controllee for the session and is incapable or unwilling to accept the IUT controller role. Passive could also mean that device can act as a controllee but does not have controller functionality.

In some implementations, the IUT controller indication may include two possible values such as (Active, Inactive) or (Active, Passive) on any particular UE. Example value definitions may include: g.3gpp.iutcontroller="active" or g.3gpp.iutcontroller="passive". In some cases, the IUT controller value is prefixed with a version indicator. For example, the IUT controller value may be "activeX" where X can be a value from 0 or 1 to Y that indicates the version of IUT supported by the UE. Another example is g.3gpp.iut= [capability] whereby capability indicates the capability of the IUT device such as being a "controller" or a "controllee". Controller could be extended to be "activecontroller" or "passcontroller". Active controller means that the SIP UA/UE is performing controller activities for the session and passcontroller means that the SIP UA/UE has controller capabilities but is not acting as a controller. An example definition of the feature tag is provided below in Table 4, however those skilled in the art will appreciate that any construct of appropriate alphanumeric characters can be used to convey the same meaning from the SIP UA/UE.

TABLE 4

Media feature-tag name: g.3gpp.iut
ASN.1 Identifier: 1.3.6.1.8.2.y
Summary of the media feature indicated by this tag: This feature-tag indicates that the device has IUT capabilities.
Values appropriate for use with this feature-tag:active, controller, controllee.
The feature-tag is intended primarily for use in the following applications, protocols, services, or negotiation mechanisms: This feature-tag is most useful in a communications application, for describing the capabilities of a device, such as a phone or PDA.
Examples of typical use: Indicating that a mobile phone supports IUT functionality.

In other implementations, a UE supporting IUT controller function can be configured by a user to activate or deactivate the IUT controller setting based on a user preference using SIP, XCAP, etc. The activation or deactivation setting of an IUT controller UE or Controllee UE may be placed into the XML MIME body of a SIP or XCAP message, for example. If an IUT controller setting is activated on a UE then the UE acts as an IUT controller UE. If an IUT controller setting is deactivated on a UE then the UE acts as an IUT controllee UE. The following is an example of setting IUT controller functionality for a particular UE in XML:

```
<?xml version="1.0" encoding="UTF-8"?>
    <iutcont-settings xmlns="urn:3gpp:params:xml:ns:ims:iutcont-settings"
        xmlns:xsi=http://www.w3.org/2001/XMLSchema-instance
        xsi:schemaLocation="urn:3gpp:params:xml:ns:ims:iutcont-
        settings ">
<entity id="do39s8zksn2d98x">
    <iutcont-settings>
      <interuetransfer-controller active="true" />
    </iutcont-settings>
```

In addition to notifying the network of whether a particular UE has the capability and is preferred to act as a controller UE, the present system allows UEs that support multiple bearers to be configured to indicate a preferred bearer by a user to the network, which stores such information such as UE capabilities and user preferences. Depending upon the UE, the UE may have the capability to communicate with a network using circuit switched, packet switched communication protocols or both, for example. For UEs that support multiple bearers, the preferred bearer may be specified through user preferences via SIP, XCAP, or other encoding schemes. In one implementation, a preferred bearer is specified in accordance with a particular media type and/or device capability. For example, a particular bearer may be specified for particular media types on devices having particular capabilities. Alternatively, a general bearer preference may be specified for all UEs, regardless of media type and/or device capability. The bearer preferences may be specified in the XML MIME body of an SIP or XCAP message, for example. The following shows exemplary coding in XML:

```
<?xml version="1.0" encoding="UTF-8"?>
  <iutcont-settings xmlns="urn:3gpp:params:xml:ns:ims:iutcont-settings"
      xmlns:xsi=http://www.w3.org/2001/XMLSchema-instance
      xsi:schemaLocation="urn:3gpp:params:xml:ns:ims:bearer-
      settings ">
<entity id="do39s8zksn2d98x">
    <bearer-settings>
      <preferred-bearer>PS</preferred-bearer>
    </bear-settings>
```

Upon receiving a message indicating a UE's capability and, optionally, user preferences relating to a preferred bearer for the UE, one or more network components such as a Call Session Control Function like P-CSCF, S-CSCF, I-CSCF, mobile switching center (MSC) server, MSC enhanced for ICS or the SCC AS may verify that the UE is allowed and able to act as a controller if the message includes that IUT controller function is supported on the UE and a preference to use the UE as a controller. In one embodiment, the SCC AS may also verify that the UE supports and has registered for a particular bearer if the received message contains the supported bearer type and/or a preference to use a particular bearer type.

During verification, the SCC AS determines which UEs are to be a controller, for example by inspecting the IUT controller media feature tag in the Contact header of a SIP REGISTER request. In one implementation, the SCC AS obtains the media feature tags using the subscription registration event package or the enhanced third party registration procedures (Incoming SIP REGISTER request included in the body of the third party SIP REGISTER Request). The SCC AS may also determine a bearer that can be used for the registering UE. If a preferred/supported bearer value in the policy of the network is different from that of the received message, the preferred/supported bearer value defined by the network policy may take precedence. Requests can be routed over a particular access leg or preferred bearer that uses a particular access technology using the procedure described above.

In order to verify that the UE meets certain requirements for the assignment of controller function and/or a particular bearer assignment, the network maintains a database storing Public User Identities of a user e.g. Tel URI, SIP URI etc, Private User Identities of a user e.g. IMS Private User Identity, IMSI etc, which UEs (e.g., instance ID, IMEI, MIN, or GRUU) belong to the same subscription set, which UEs belong to the same IUT, which UEs are capable of IUT controller function, device identity such as (instance ID, IMEI, MIN, Globally Routable UA URI (GRUU), device nickname mapping to each device, session leg mapping information connected with each device, supported and preferred bearer or radio access technology (RAT) on each UE, addresses identifying each UA per RAT for UEs or intermediaries that support multiple PS access technologies or multiple subscriptions or peer-to-peer (P2P) services and have at least one UA per RAT or subscription or P2P service, authorization rules to permit another UE to obtain the controller function, and other information describing or associated with the UE. This database may be stored in the HSS and accessed by the SCC AS using Sh interface or the information maybe received from S-CSCF as a result of a registration. The database could be stored in other entities within the network. Maybe internal to the SCC AS or combination there of. In one implementation, to perform registration activities, the network may check the IRS for the UE in the database to see that the UE requesting registration has the same IRS set as that of an authorized UE. If the registering UE uses same IRS set as that of an authorized UE stored in the database, the IRS set may indicate particular capabilities described by the IMS private ID, and whether the UE may be a controller or controllee. Furthermore, the IRS set may indicate whether the UE can only be controlled, and whether the UE can subscribe in and out of the service.

During operation of the present system, a network node distributes a list of URIs or identities of IUT UEs (i.e. a set of URIs or identities of UEs which can request IUT transfer or be transferred, or a set of URIs of controller and controllee UEs belonging to the same IUT set) to the controller UEs or a set of IUT UEs allowing the identification of which UEs are controller or controllee, which UEs support IUT controller function and to which UE an IUT controller function can be transferred. The list of URIs or identities of IUT UEs may include information such as device nickname, supported media types per URI or identity of each IUT UEs.

When a UE registers with the network the UE will include the feature tag described above. The GRUU of the UE is stored as part of the registration process. This GRUU is then communicated as a URI to all potential controller UEs. The information sent can also include qualifications if the UE identified by the GRUU is an IUT controller, controller (passive role) and controllee, controllee capable or legacy capable. Media types supported, registered RATs, etc., may also be communicated to assist the UE if the UE acts as a controller. If the device performs a re-registration and the media tags (including, for example, registered RATs) have changed then this may cause a refresh of the information that is sent to the IUT controller capable UEs.

Figure 3:
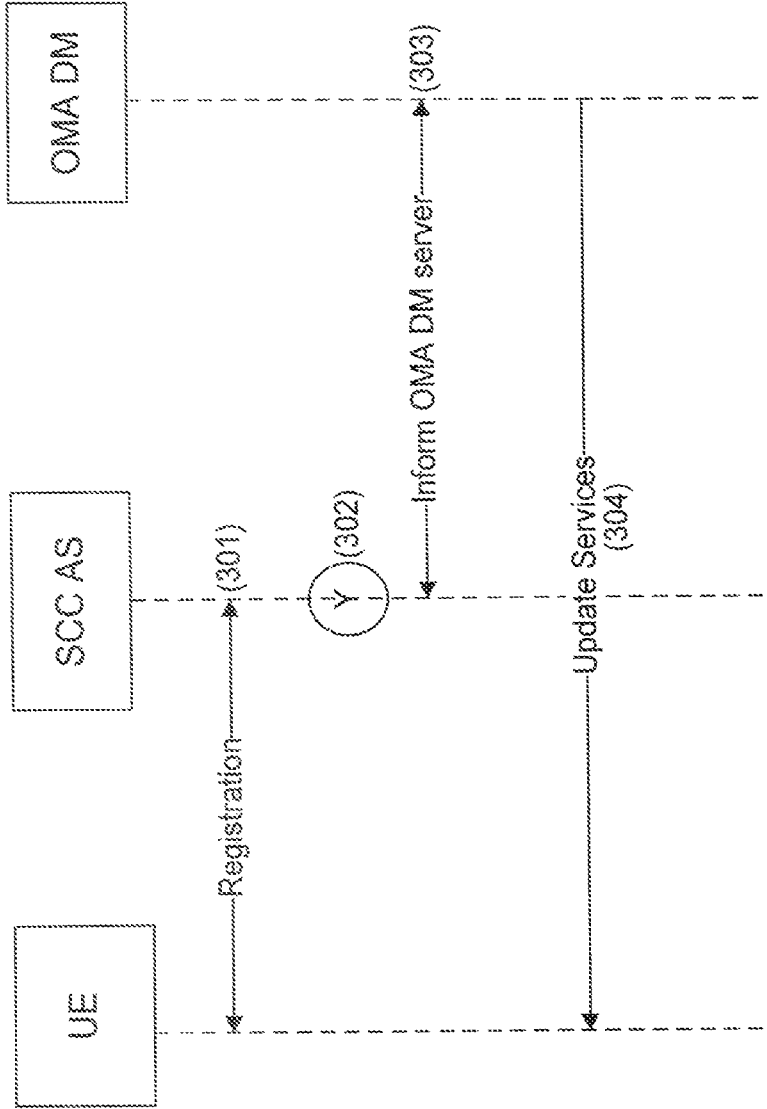

As illustrated in FIG. 3, UE Registers with the IMS network in step 301, which causes registration with SCC AS. The SCC AS needs to determine if the device that has registered is part of the IUT set. This maybe determined by the SCC AS being aware that there is already 1 to many UEs that are IUT capable in the same IRS, if the SCC AS can make this determination at Y in step 302 then the SCC AS will communicate with the OMA DM server in step 303. The SCC AS can include necessary identities to the OMA DM server so that it can communicate the information to the necessary devices, or other devices that need the information in step 304. The may include a list of Instance IDs, equipment identifies. These would have been obtained in the registration process. In some cases, if the ICS UE has an IMEI, prior to performing registration, the ICS UE generates an instance ID based on its IMEI as defined in 3GPP TS 23.003.

In another implementation there may be some form of IUT group identifier (see the example in Table 5) sent when a UE registers, this identifier identifies the IUT group allowing subscribers from different IRSs to be in the same IUT group. In that case, the SCC AS would then check when a UE registers if the UE is part of the IUT set. A possible embodiment on the IUT group identifier could be a new media feature tag or an extension of the one defined earlier. E.g. .3.gpp.iutgroup=[variable].

TABLE 5

Media feature-tag name: g.3gpp.iutgroup
ASN.1 Identifier: 1.3.6.1.8.2.y

TABLE 5-continued

Summary of the media feature indicated by this tag: This feature-tag indicates that what IUT group the device belongs to.
Values appropriate for use with this feature-tag: group identifier type numerate.
The feature-tag is intended primarily for use in the following applications, protocols, services, or negotiation mechanisms: This feature-tag is most useful in a communications application, for describing the capabilities of a device, such as a phone or PDA.
Examples of typical use: Indicating the group(s) that the IUT device belongs to.

In one implementation, when distributing the list of URIs or identities of IUT UEs the address of the serving SCC AS may also be included and provided via Open Mobile Alliance Device Management (OMA DM), Client Provisioning or other device management and provisioning protocols. To distribute the list of URIs or identities of IUT UEs, the network may use over the air transport mechanisms such as, but not limited to Unstructured Supplementary Service Data (USSD), Short Message Service (SMS), Multimedia Broadcast Multicast Service (MBMS), CellBroadcast, IP pipes running over GPRS in GERAN, UTRAN, LTE, WLAN, WiMax, or CDMA2000. The identifying URIs may be TEL URIs (E.164 numbers), SIP URIs containing a Public User Identity or a Globally Routable User Agent URI (GRUU). The list may also be provisioned in a removal memory module that could be but not limited to: USIM, SIM, R-UIM, UICC, or Compact flash. Alternatively, other configuration management mechanisms could be used such as the SIP CONFIG FRAMEWORK as described in draft-ietf-sipping-config-framework.

The list of URIs or identities of IUT UEs may be updated periodically or not periodically by re-broadcasting, sending, or communicating the list, broadcasting updates only as the list is changed and updated, or by each controller UE requesting an updated list. Alternatively, the list may be updated by communicating updated information directly to each UE, for example via a user interface, or by providing the UEs with physical media containing the updated list. The list of URIs on the UE is updated when the other UEs belonging to the same IUT group which may use the IRS set, register or deregister. Updating the list of URIs or identities of IUT UEs may be important as UEs may be constantly added (or registered) or removed (or de-registered) to/from the serving network entities such as HSS, S-CSCF, SCC AS in the serving network such as S-CSCF, HSS, or SCC AS. Updates may include the deletion, addition, or modification of entries as described above. The network node such as the SCC AS, DM Server provides the list of URIs or identities of IUT UEs.

Figure 4:
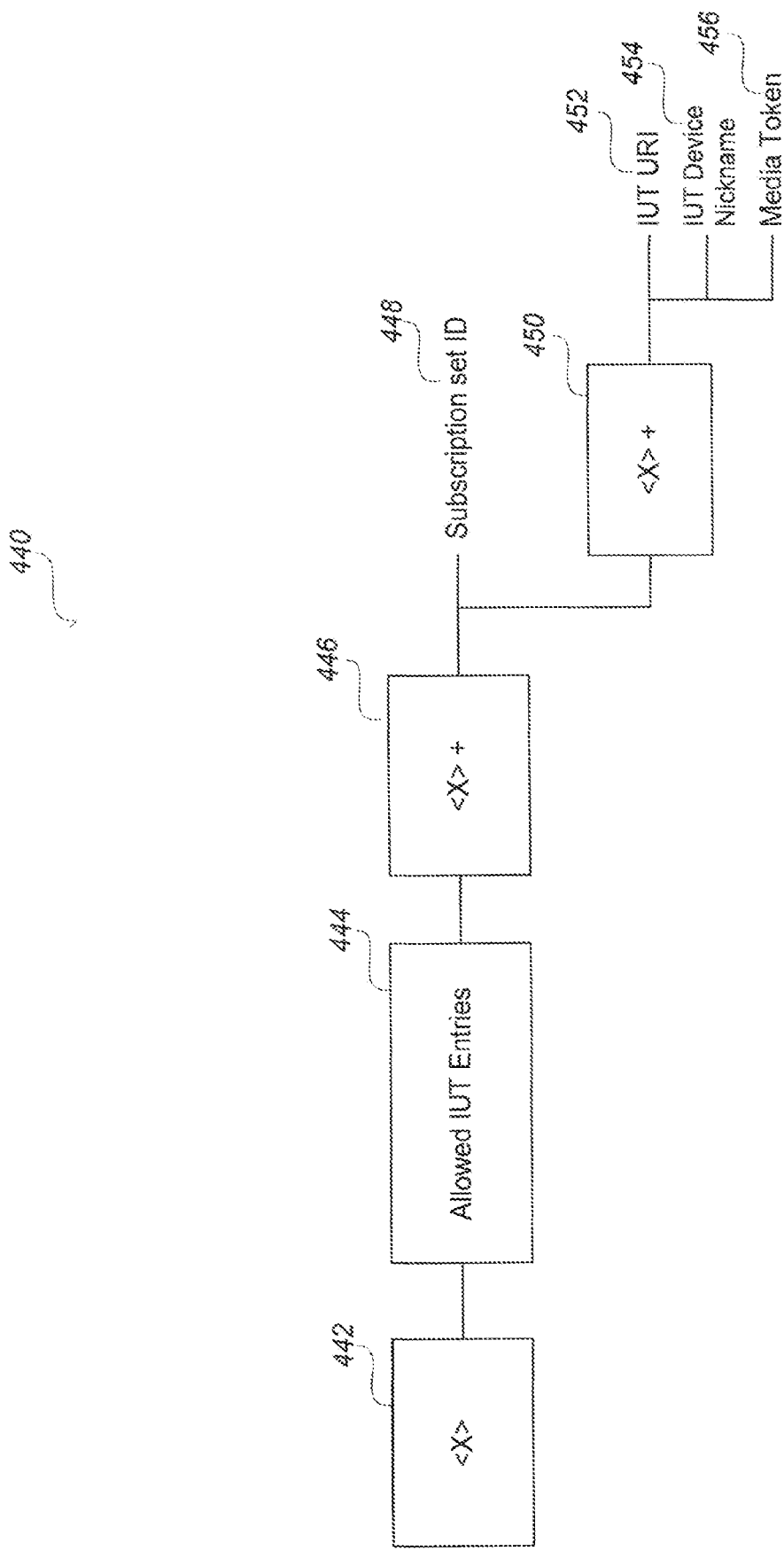
FIG. 4 illustrates an exemplary allowed IUT List Management Object for identifying one or more IUT-capable UEs which include controllee UE or both controller UE and controllee UE.

FIG. 4 illustrates an exemplary allowed IUT List Management Object for identifying one or more IUT UEs. MO 440 includes a root node 442 that may act as a placeholder for zero or one accounts for a fixed node. AllowedIUTEntries interior node 444 may be used to provide a reference to a list of subscription set IDs and may include a run time node 446 as a placeholder for one or more subscription set IDs. Run time node 446 may include a reference to a list of URIs or identities for one or more IUT UEs, device nicknames and/or media tokens. Additional run time node 450 may be used as a placeholder for IUT_URI (i.e., URI or identity of each IUT UE), device nickname and media token datasets. Run time node 450 may include leafs 452, 454, and 456 for storing IUT_URIs, device nicknames, media tokens, or other data.

If there is only one subscription set for the UE, then the illustrated node may not exist in the MO. The illustrated node may be added for scalability purposes, for example, in case a user has multiple subscription sets for IUT UEs. There may be various nodes included within the MO (they are not all mandatory) such as, but not limited to, either IUT URI (i.e. URIs or identities of IUT UEs) nodes or Device Nickname nodes corresponding to the IUT URI or both in the MO. A Media Token node for the Device may also be included in the MO. FIGS. 5a and 5b illustrates details of the parameters and DDF of the allowed IUT List MO shown in FIG. 4. Elementary Files may also be used to distribute a list of URIs or identities of IUT UEs. Exemplary Elementary Files (EF) are provided below and can be used to provide for allowed IUT Lists (EFAIUTL), IUT Device Nickname (EFIUTDN), IUT Media Token (EFIUMT), and IUT controller Indication (EFIUTCONTI) definitions. When using an EF in this manner, the EF may be included on any of a USIM, SIM, R-UIM, UICC, or Compact flash, for example.

A first exemplary EF includes the $EF_{AIUTL}$ (Allowed IUT Lists) and is illustrated in Table 6. The EF may contain the coding for IUT URIs of UE, i.e., URIs or identities of IUT UEs, (or Device Nickname) belonging to the allowed IUT lists. Furthermore, for each IUT URI (or Device Nickname) in the list, a link to the corresponding Device Nickname (or IUT URI), Media Token and IUT Controller indication may be provided. The Allowed IUT Lists TLV object may include one or several IUT List TLV, where each IUT List TLV is associated with one or more than one among TEL URI, SIP URI, GRUU, Instance ID, IMEI, etc. Exemplary Allowed IUT Lists information is illustrated below in Table 7.

TABLE 6

| Identifier: 'xxxx' | Structure: transparent | Optional |
|---|---|---|
| SFI: 'xx' | | |
| File size: X | Update activity: low | |
| Access Conditions: | | |
| READ | ALWAYS | |
| UPDATE | ADM | |
| DEACTIVATE | ADM | |
| ACTIVATE | ADM | |

| Bytes | Description | M/O | Length |
|---|---|---|---|
| 1 | Number if IUT Lists | M | 1 byte |
| 2 to X | Allowed IUT Lists TLV object | M | X − 1 bytes |

TABLE 7

| Description | Value | M/O | Length (bytes) |
|---|---|---|---|
| 1$^{st}$ IUT List Tag | '80' | M | 1 |
| Length | K | M | Note |
| 1$^{st}$ IUT List | — | M | K |
| . | . | . | . |
| . | . | . | . |
| . | . | . | . |
| n$^{th}$ IUT List Tag | '80' | M | 1 |
| Length | L | M | Note |
| n$^{th}$ IUT List | — | M | L |

Note:
The length is coded according to ISO/IEC 8825

In Table 7, the contents of the IUT List Tag '80' may include the allowed IUT list per IUT Subscription set that is applicable to the one or more than one among TEL URI, SIP URI, GRUU, Instance ID, IMEI, etc which is provided in the value field of this TLV.

Example coding for the IUT List Tag '80' is shown in Table 8. In this example, unused bytes can be set to a value of 'FF'.

TABLE 8

| | | | |
|---|---|---|---|
| 1 to 3 | IUT Subscription set ID | M | 3 bytes |
| 4 to 6 | 1$^{st}$ IUT URI | M | 3 bytes |
| 7 to Y | 1$^{st}$ IUT Device Nickname | M | (Y − 6) byte |
| Y + 1 to Y + 3 | 1$^{st}$ IUT Media Token | M | 3 bytes |
| Y + 4 | 1$^{st}$ IUT Controller indication | M | 1 byte |
| (6n − 2) to (6n) | n$^{th}$ IUT URI | O | 3 bytes |
| (6n + 1) to (Y)n | n$^{th}$ IUT Device Nickname | O | (Y − 6)byte |
| (Y + 1)n to (Y + 3)n | n$^{th}$ IUT Media Token | | 3 bytes |
| (Y + 4)n | n$^{th}$ IUT Controller indication | O | 1 byte |

Another exemplary EF includes the $EF_{IUTDN}$ (IUT Device Nickname) shown in Table 9. The EF may be configured to contain the IUT Device Nickname. In this example, the association between an IUT URI and the corresponding Device Nickname is provided in $EF_{AIUTL}$. Generally, in this example, coding may be performed using one of the UCS2 code options as defined in TS 31.101.

TABLE 9

| | | |
|---|---|---|
| Identifier: 'xxxx' | Structure: linear fixed | Optional |
| SFI: 'xx' | | |
| Record length: X bytes; X ≥ 3 | Update activity: low | |
| Access Conditions: | | |
| READ | ALWAYS | |
| UPDATE | ADM | |
| ACTIVATE | ADM | |
| DEACTIVATE | ADM | |

| Bytes | Description | M/O | Length |
|---|---|---|---|
| 1 to X | Alpha Identifier | M | X bytes |

Another exemplary EF includes the $EF_{IUTMT}$ (IUT Media Token) shown in Table 10. The EF contains the IUT Media Token. In this example, the association between a IUT Device URI and the corresponding Media Token is provided in $EF_{AIUTL}$.

TABLE 10

| | | |
|---|---|---|
| Identifier: 'xxxx' | Structure: linear fixed | Optional |
| SFI: 'xx' | | |
| Record length: X bytes; X ≥ 3 | Update activity: low | |
| Access Conditions: | | |
| READ | ALWAYS | |
| UPDATE | ADM | |
| ACTIVATE | ADM | |
| DEACTIVATE | ADM | |

| Bytes | Description | M/O | Length |
|---|---|---|---|
| 1 to X | IUT Media Token TLV object | M | X bytes |

For this EF, an example IUT Media Token tag is shown in Table 11.

TABLE 11

| Description | Tag Value |
|---|---|
| IUT Media Token Tag | '80' |

For this EF, example IUT Media Token information is shown in Table 12.

TABLE 12

| Description | Value | M/O | Length (bytes) |
|---|---|---|---|
| IUT Media Token Tag | '80' | M | 1 |
| Length | K | M | Note |
| IUT Media Token | — | M | K |

Note 1:
The length is coded according to ISO/IEC 8825.

In this example shown in Table 12, the IUT Media Token Tag '80' may have contents of IUT Media Token e.g. text, video, audio etc., with coding being performed using one of the UCS2 code options as defined in TS 31.101, for example.

Another example EF includes the $EF_{IUTCONTI}$ (IUT Controller Indication) shown in Table 13. The EF may contain the IUT Controller indications. The association between an IUT URI and the corresponding IUT Controller indication is provided in $EF_{AIUTL}$. The IUT Controller indication may be provided in text format or in icon.

TABLE 13

| | | |
|---|---|---|
| Identifier: '' | Structure: linear fixed | Optional |
| SFI: '' | | |
| Record length: X bytes | Update activity: low | |
| Access Conditions: | | |
| READ | ALWAYS | |
| UPDATE | ADM | |
| DEACTIVATE | ADM | |
| ACTIVATE | ADM | |

| Bytes | Description | M/O | Length |
|---|---|---|---|
| 1 | IUT Controller Indication | M | 1 byte |

Figure 23:
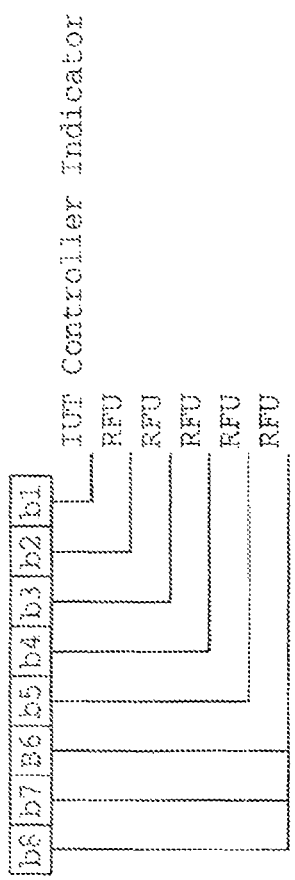
FIG. 23 is an illustration of example indicators with reference bit value position.

In this EF, the indicator status for each indicator type can be 1 bit long and may be encoded or set as follows. If the bit value is equal to 1, set the indication active. If, however, the bit value is equal to 0, set the indication inactive. For example, FIG. 23 is an illustration of example indicators with reference bit value position.

Having defined and made available a list of URIs or identities of IUT UEs without additional useful information other than URIs or identities of IUT UEs, an IUT UE can gather information about the other identified UEs or act unilaterally to modify the list by communicating with the SCC AS, or other components of the network. In one example, an IUT controller UE sends SIP OPTIONS to the UEs identified in the list to determine the capabilities of the other IUT UEs (for example, by using the received IUT controller feature tag in the 200 OK response) and to discover which are currently available, IUT capable and which can have the IUT controller function transferred to them. The IUT Controllee UEs can obtain the capabilities of the other UEs including the media feature tag that indicates support for IUT controller/controllee functionality via a message such as the 200 (OK) response returned in response to a message such as a SIP OPTIONS request.

Having determined a list of URIs or identities of IUT UEs and optionally having updates to that list, a database in the network e.g. stored in the SCC AS, HSS etc may store information identifying controller UEs and controllee UEs. The information may be stored in any suitable medium such as a computer database or other electronic storage media. The database may include any appropriate table structure in accordance with system requirements. FIG. 21 is an illustration of an exemplary structure for storing information within the network describing associated controller and controllee UEs (for example, within a Home Subscriber Server (HSS)). In FIG. 21, a user A has three devices which belong to the IUT set and the device I is an IUT controller. The remaining devices operate as IUT controllees.

FIG. 22 is an illustration of exemplary information stored in the network such as within an HSS. FIG. 22 shows data for three users, each under the same subscription member set. User A and User B have an IUT controller function and may setup IUT authorization rules while User C acts as IUT controllee in the table below.

Within the tables, the subscription set is a set of UEs of the same user for IUT purposes based on either the same subscription or a different subscription that is subject to a roaming agreement. Subscription member set is a set of UEs between members who are allowed to do Inter-UE Transfer and may belong to the same operator's subscription or a different operator's subscription subject to a roaming agreement. Within the tables, for the IUT UE set, each UE is distinguished as either an IUT controller UE or an IUT controllee UE. Each UE has a device ID, such as GRUU, Instance ID, or IMEI, that may be mapped with a nickname (e.g., "Bedroom TV", "My Mobile", etc.). Furthermore, for each UE, the tables define a capability to support certain media types and formats for that UE.

Depending upon the system implementation, information describing the controller and controllee UEs may be stored in various network components e.g. authorization rules may be stored in XDMS and the document link to authorization rules stored in XDMS may be stored in the subscription database. In one example, the link of a media token for each device or various authorization rules for IUT control are stored in the database or another network entity.

The network may perform subscription set binding for implementing IUT. The subscription set may be of the same operator or between different operators depending on inter-operator agreement (exchanging subscriber information and subscriber's device information between the networks). The system may support IUT for the same subscription set. The same subscription set should be indicated as "Subscription set indication" for IUT on the network and the indication may be provisioned to UEs in memory (e.g. ME, USIM or ISIM) of the same subscription set.

The network should also have the capability of storing the "last preferred configuration". For example, on an initial call, if the user has split a video call session between two UE's (voice on the device having ID I and video on the device having ID II). the network can be set to persist this configuration for the subsequent video call resulting in a call termination on multiple UEs.

The network should also have the capability of storing the "last UE which acted as a controller". For example, on an initial communication, a UE-1 has acted as IUT controller function and a UE-2 has acted as IUT controllee UE for collaborative sessions. After termination of the initial communication and establishment of new collaborative sessions, the UE-1 which previously acted as a controller UE becomes a controller UE based on the information in the network set to persist this last controller UE configuration for the subsequent new communication after termination of the previous communication.

When a UE registers with the network the UE will transmit information to the network that identifies the UE. The registration information may include a request that the UE be assigned controller function within the network. In one example, the UE provides an IMS private identity, IMS public user identity and the UE's instance ID to the network for identification purposes and feature tags as identified earlier that the UE is IUT controller capable. The registration information may be provided to the SCC AS which can then examine the registration information. The SCC AS may then query the database storing the UE and its subscriber information to determine whether the subscriber and or UE combination is allowed to be a controller. The database can either be local or external. An example external database includes an HSS and an internal one in the SCC AS. The registration information may be transmitted using the Sh interface or ServiceInfo Field via Cx interface.

By checking the combination of identity information listed above, the SCC AS can determine whether the UE is authorized to be a controller or not. Accordingly, the SCC AS may check Private ID in this case all devices are allowed to be controller. the SCC AS may check Private ID and IMEI(s) in this case only devices being used with this private ID can be controller. Or the SCC AS may check Private ID, IMEI(s), and Public ID(s) in this case the private ID in combination of device (IMEI) and Public User ID being registered can be controller.

In some implementations, after the UE is registered, the SCC AS provides the UE with a token, flag, or an indication to be used in subsequent SIP methods to identify that the UE has been authorized as a controller. The token or indication may be included in a feature tag, new P-header, or XML body. Alternatively, the SCC AS may mark the registration record for the UE in the SCC AS as being able to be a controller UE. Thus when the UE sends an INVITE or another SIP METHOD the SCC AS may check its bindings to determine whether the UE is able to perform controller functionality.

The system may also perform an additional check to determine whether a device in the system is already acting as controller and, when another device requests controller functionality the system may either reject the request and provide an indication to the device (the indication may include an out of band signaling mechanism), or accept the request per the rules described above.

The controller function for a particular UE may be limited to controlling other UEs that are all operated by the same user associated with the controller UE. In some implementations of the present system, however, a particular controller UE of one user may have controller function over other UEs belonging to other users where the particular controller UE and the other UEs are under the same subscription membership. In that case, a particular UE may provide a mechanism to allow a user to set authorization rules to permit that a controller function can be performed by the target UE which has requested to perform the controller function and the network, such as the SCC AS, or XDMS may process the authorization rules and determine whether to allow the target UE to perform the controller function. In other to perform the controller function, it may be required for the UE to obtain consent from the existing controller UE, or consent of one or more target UEs that the controller UE has designated. In some cases, any target UEs in the wireless server may be authorized to perform the controller function. A UE may perform the controller function based upon a temporal limitation, functional limitation (e.g., only allowing for the transfer of particular media types), or may be permanent. Any controller UE may be assigned to set the temporal, functional, or other permission rules for transferring controller function to UEs operated by other users.

Figure 6:
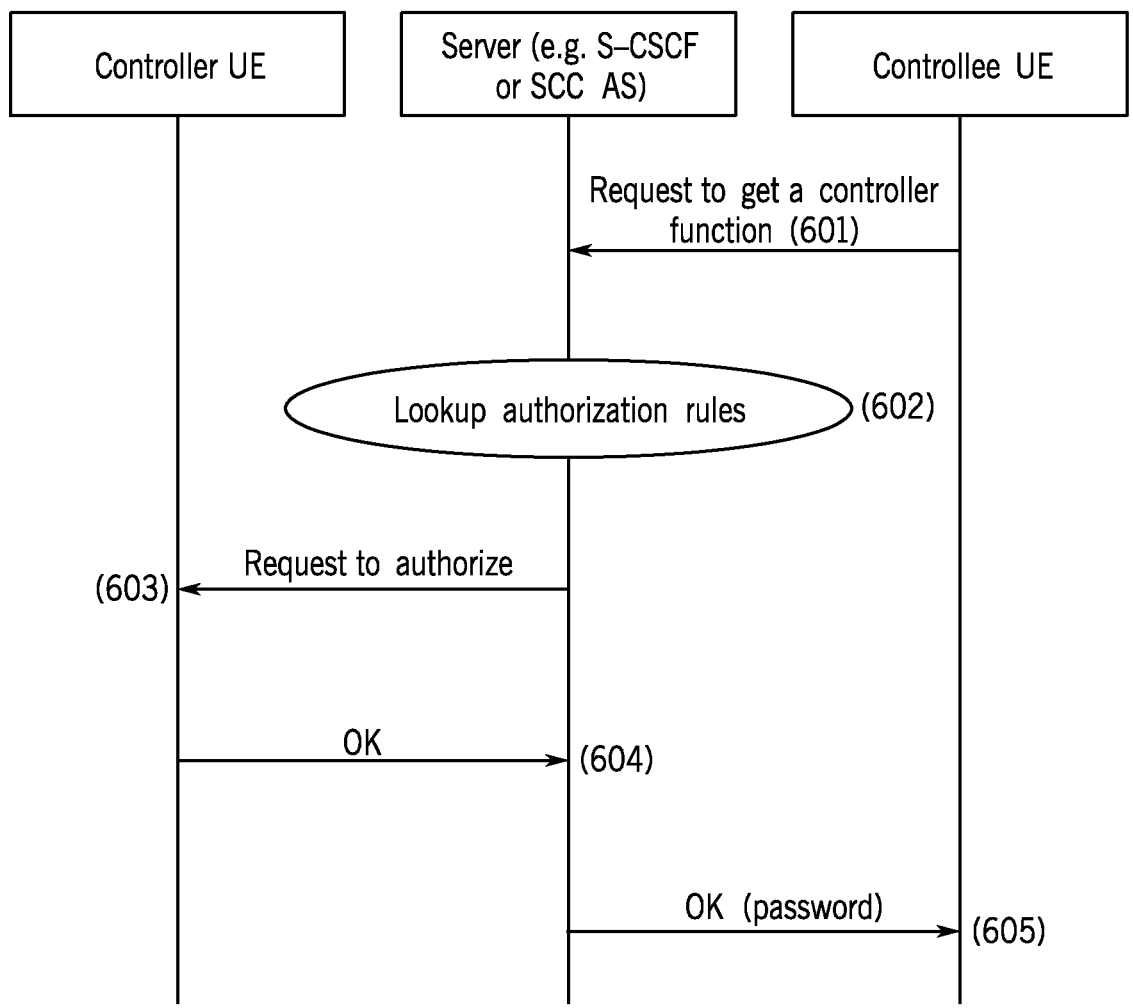
FIG. 6 illustrates an example flow for providing IUT controller function to a UE where authorization is only required from a single controller UE.

FIG. 6 illustrates an example flow for providing IUT controller function to a UE where authorization is only required from a single controller UE. In step 601 a controllee UE sends a request message to the network to receive IUT controller function. In step 602 the server (e.g. using an S-CSCF or SCC AS) looks up the authorization rules stored in the server itself or in another network entity like XDMS set by the controller UE and discovers that there are no temporal, functional, or other limitations that apply to the assignment of IUT controller function and that authorization for the IUT controller assignment only needs to be authorized by the controller UE. In step 603 the network sends a request message to the controller UE to authorize or consent to the target controllee UE receiving the controller function. In step 604 the controller UE sends an OK response if the user of the controller UE accepts the request. In this step, the user of the controller UE may set temporal/permanent permission. In some cases, these restrictions on temporal/permanent permission are pre-defined within the network. In step 605 the server sends an OK response in order to give the controller function to the controllee UE. The OK response in step 604 may be different from that of step 605. The server may include in this response a) a temporal or permanent password, and b) a token, identifier, or certificate allowing the target controllee UE to get the controller function. If the target UE receives only temporal permission to act as the IUT controller, upon releasing or leaving the current session, or exiting from the program which provides a user interface to change some settings or parameters on controllee UEs, the temporal password may become invalid and, thus, the target UE will not retain the IUT controller function.

Figure 7:
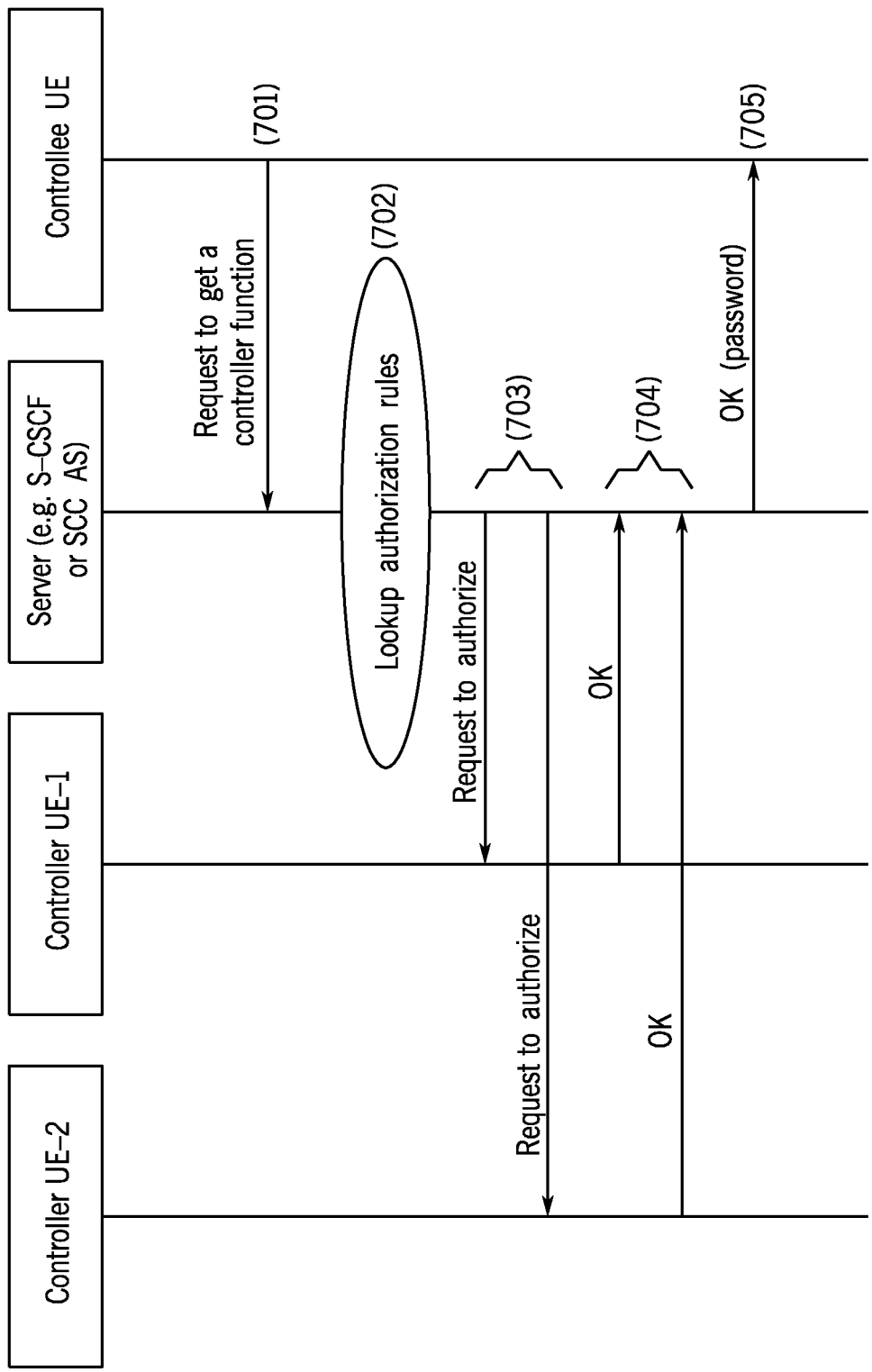
FIG. 7 illustrates an example flow for providing IUT controller function to a UE where authorization is only required from more than one controller UEs.

FIG. 7 illustrates an example flow for providing IUT controller function to a UE where authorization or consent is only required from more than one controller UE. In step 701 a controllee UE sends the server a request message to receive IUT controller function. In step 702 the server identifies the UEs having existing IUT controller function, looks up the authorization rules set by the identified controller(s) and discovers that the server needs authorization by or consent of one or more users (or the user's UE) having IUT controller function. The user may designate himself and/or other users having a controller function. In step 703 the network sends a request message to the controller UEs to authorize the target controllee UE to receive IUT controller function. In step 704 the designated user's UE sends an OK response if the designated user accepts the request. The designated controller UEs may set various permission or restrictions when authorizing the provision of IUT controller function. Alternatively, various temporal, functional, or permanent permission restrictions may be defined by a user with a controller UE and be transmitted within the network. In step 705 the server sends an OK response if all the designated users authorize to give the controller function. The OK response in step 704 may be different from that of step 705. If the controller UEs have set permission or other restrictions on the provision of IUT controller function, the network includes those restrictions when issuing the authorization to the target controller UE. If the target UE receives only temporal permission to act as the IUT controller, upon releasing or leaving the current session or exiting the program which provides a user interface to change some settings or parameters on controllee UEs, the temporal password may become invalid and, thus, the target UE does not retain IUT controller function.

Depending upon the system implementation, the IUT controller UE may be determined before session establishment, during a session establishment process, or after a particular session has been established. In some cases, the UE that has the capability to support IUT controller functionality and sends an initial transfer request is initially assigned as an IUT controller UE. If the IUT controller UE is determined before session establishment, a UE may request allocation of IUT controller function based on the UE's capability to operate as an IUT controller UE and associated user preferences. The UE may allow a user to only allocate one UE as an active IUT controller from the list of available URIs or identities for IUT UEs. Different IUT controller settings could be established for different UEs for the same user. If the IUT controller is assigned at session establishment, a UE may send a session setup request e.g. a SIP INVITE, a SIP re-INVITE or a SIP REFER request with an IUT controller feature tag set to "Active", as described above.

In some cases, the SCC AS may ensure that all terminating invitations to a session are routed to a UE that is an IUT controller by including a media feature tag indicating the IUT controller in an Accept-Contact header as per RFC 3841.

In some cases, it may be desirable to assign a single IUT-controller UE for any ongoing session. Accordingly, to ensure that the system only assigns a single IUT controller UE, after receiving a request that a particular UE be assigned the IUT controller function, the network may verify that the requesting UE is capable of IUT control e.g. a media feature tag indicating the IUT controller capability is present in the contact header, that the requesting UE is authorized to be an IUT controller (authorization may be achieved by checking the IMS Private User id associated with the registration of this UE to see if controller functionality is allowed as described above), that there is a policy from a network node e.g. SCC AS or Policy Database that only one UE should become an IUT controller for any ongoing sessions and that there exists no other allocated IUT controller UEs for the same user. If all these conditions are met, the network sends a positive response that the requesting UE is to be an IUT controller. The network may send an indication to the other IUT UEs specifying which UE (e.g. using GRUU) has been allocated IUT controller function. This may have been achieved by the UE subscribing to a notification and when a controller has been assigned a notification is sent to the UE containing the GRUU of the controller. If one or more of the conditions above aren't met the network may reject the request. In rejecting the request, the network may include a reason code that explains the reason for rejecting the request.

When registering a particular UE as a controller it may be important to provide an authentication or authorization mechanism to ensure that only authorized users and/or authorized UEs are allocated controller function. In one example, the IUT subscription is a household subscription in addition to a user subscription. The household subscription may include a subscription of father, mother and children. In this example, an authorization function in the network may be used to validate that a particular UE amongst the household subscription is allowed to be a controller UE. One example network implementation provides two separate levels of authorization.

First, the network determines whether the device being subscribed is allowed to belong to the same subscription member. This could be as a result of filter criteria, but then again the SCC AS is the one doing this, so other filter criteria may send the SIP method to the AS. There might be something in the Service Info field from the HSS that goes transparently to the SCC AS which indicates if this is IUT capable as a result of the UE performing a SIP REGISTRATION. For example, in some cases, there may be information in the SCC AS that determines whether the device being subscribed is capable of performing the controller function. Alternatively, the information may be provided via an IMSI or Private identity. For example, all family members belong to the same Person Network, but only dad has the ability to set a device as a controller over the other devices of mother and children.

Second, the SCC AS determines whether the registering UE is allowed to become an IUT controller. This may be done by checking the GRUU information for the UE being registered. This information again may be stored within the HSS or SCC AS, whereby the subscriber indicates which device can be a controller. Alternatively, it may be possible to link the whole information to the registration message, in that when a UE registers there will be a private ID. The private ID may be used to determine whether the UE has the ability to use IUT or not. There may be capabilities such as IMSI private ID can be: "assign controller" or, "be controlled". So any UE that comes from a private user ID with "assign controller" is allowed to set-up that UE as a controller IMS private IDs that are able to access an IRS can have certain profiles, for example, a household subscription may contains 4 IMS private IDs, dad, mom and 2 kids. Dad is only one that is allowed to assign a controller. These are all the same subscription member, which may be called a subscription member set.

Assuming that 2 IMS private IDs can assign controller for the group one must have override authority or if you are allowed to be controller, you are notified if another UE becomes the controller. If you are currently the controller you can deny the change or allow the change. This requires subscribing to a status notification within the network and, upon receiving notification that the network has a particular policy, to ask the other controller if controlling capabilities can be changed.

The IUT controller UE can be determined before session establishment, during session establishment or when requesting an IUT controller transfer function to another UE. When determining the IUT controller UE before session establishment, a UE sends a request to have IUT controller function based on the UE's capability and user preferences. The UE may allow a user to make more than one UE an active IUT controller from the list of URIs or identities for IUT UEs. When determining the IUT controller UE during session establishment and when requesting an IUT controller function transfer to another UE by any IUT controller capable UE, a UE sends a request such as a SIP INVITE, a SIP re-INVITE or a SIP REFER request with a media feature tag indicating the IUT controller function. The media feature tag could be an IMS Communication Service Identifier (ICSI) value or IMS Application Reference Identifier (IARI) value that identifies the IUT controller function to be transferred. When the network receives the request, the network checks that the requesting UE is capable to be an IUT controller, that the requesting UE is authorized to be an IUT controller (authorization is achieved, for example, by checking the IMS Private User id associated with the registration of this UE to see if controller functionality is allowed), and that there is a policy (e.g. from Policy Database) that multiple UEs are to become an IUT controller for any ongoing sessions or for the same collaborative session.

If all these conditions above are met the network sends a positive response that the requesting UE is to be an IUT controller. The network may send to the other IUT UEs an indication that which UE (e.g. using GRUU information) is an IUT controller. If one or more than one of the conditions above are not met the network may reject the request and optionally provide a reason code for explaining the reason the request was rejected.

Having been established as an IUT controller UE, the controller UE may issue requests to the network to transfer media types to certain controllee UEs, or to transfer IUT-controller function to other UEs. In order for the IUT controller UE to transfer media and/or controller function to a controllee UE, the IUT controller UE sends a message such as a SIP REFER request to the network e.g. SCC AS. The SIP REFER request may contain embedded within the URI in the REFER-TO header another message such as at least some of the SIP headers and/or SDP contents of the SIP INVITE request or SIP Re-INVITE request that the SCC AS is to send to the controllee UE identified by the URI in the Refer-To header. The SIP INVITE request or SIP RE-INVITE request that is sent to the controllee UE may contain data identifying the media types to be transferred to the controllee UE. To allow the controllee UE to determine that control is being transferred to it, the SIP INVITE request also includes an identifier that identifies the IUT controller function. This identifier may include a) a URI that identifies the IUT controller function in a SIP header field, b) a New SIP URI parameter (i.e. IUT controller URI parameter) in the Request-URI or in the URI in the TO header, c) a Media Feature tag that indicates IUT controller to be included in an Accept-Contact header (as per RFC 3841), d) an IMS Communication Service Identifier (ICSI) value or IMS Application Reference Identifier (IARI) value that identifies the IUT controller function should be transferred such as "g.3gpp.app_ref" feature tag to be included in an Accept-Contact header (NOTE that the UE will previously at registration have registered the Media Feature tag in the Contact header of the SIP REGISTER request as per RFC 3840), or e) a new SIP header field (e.g. a P-Header according to RFC 3427) that indicates the IUT controller function is transferred. In another implementation, the 3.gpp.iut feature tag can be extended with additional options to identify that controller function is being transferred. An example embodiment is included below in Table 14.

TABLE 14

Media feature-tag name: g.3gpp.iut
ASN.1 Identifier: 1.3.6.1.8.2.y
Summary of the media feature indicated by this tag: This feature-tag indicates that the device has IUT capabilities.
Values appropriate for use with this feature-tag:active, controller, controllee, controllertransfer.
The feature-tag is intended primarily for use in the following applications, protocols, services, or negotiation mechanisms: This feature-tag is most useful in a communications application, for describing the capabilities of a device, such as a phone or PDA.
Examples of typical use: Indicating that a mobile phone supports IUT functionality. Controllertransfer identifies that the UE wants to transfers its controlling capabilities Other embodiments could also include that when the UE performs the request to transfer controller functionality the UE sets the media feature tag to controllee. When the SCC AS receives the request the SCC AS will check the status of the UE the message has been received from. If the status of the UE is assigned as a controller the UE will know that the UE is wanted to pass on controller functionality to the target device identified in the message. When the SCC AS sends the message to the target device the message may include a token or identifer that identifies that controller functionality is being assigned to the UE.

Figure 8:
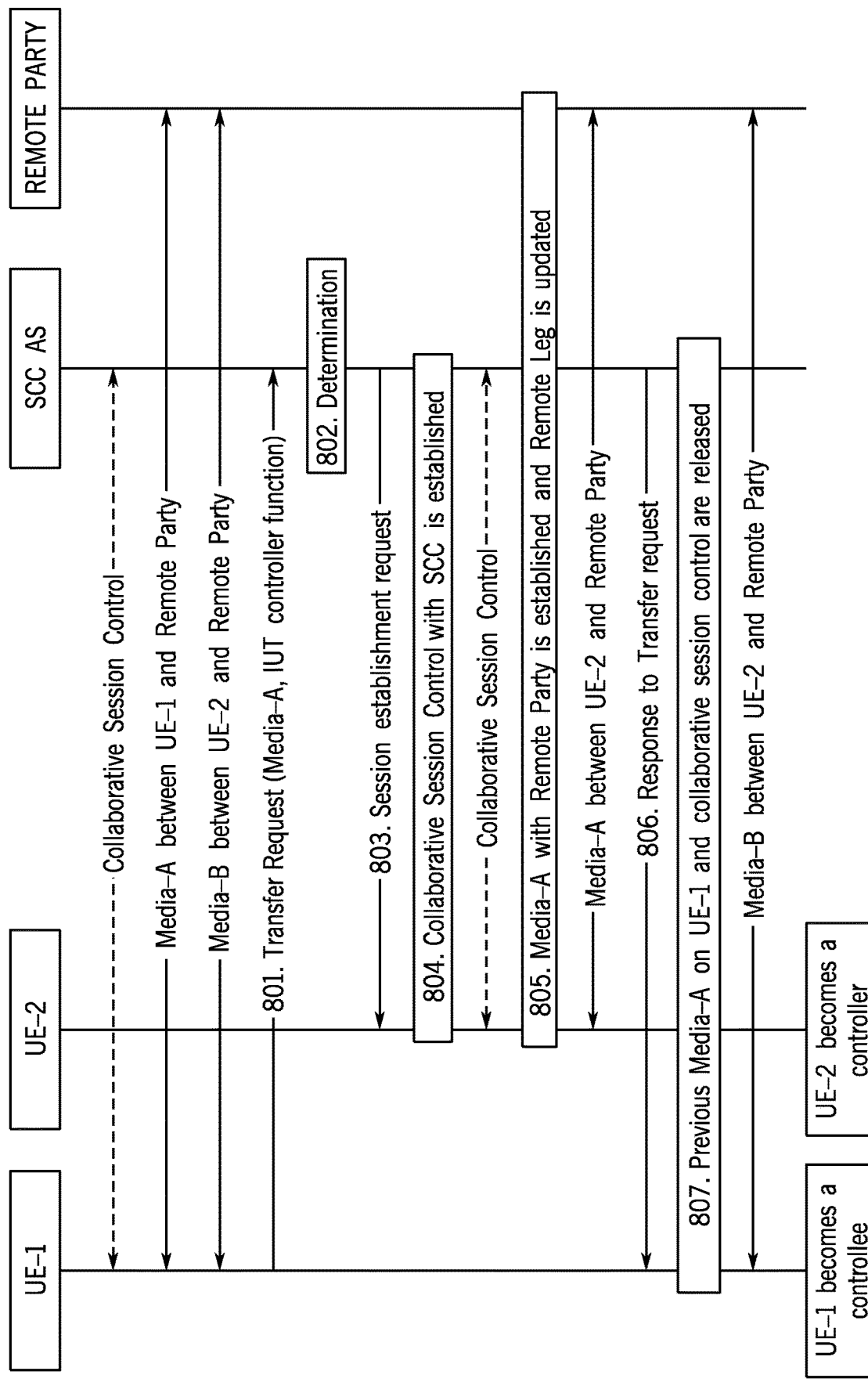
FIG. 8 illustrates an example flow for transferring media-A and controller function to a UE as requested by an IUT-controller UE.

The following examples in FIG. 8 illustrate flows for transferring IUT-controller function and/or media types from a first controller to another UE as requested by an IUT controller UE. In the examples, UE-1 has an established multimedia session with a Remote party, which is anchored at an SCC AS. The multimedia session contains two media components (Media-A and Media-B) and UE-1 wants to transfer the collaborative session control and one of the media types (media-A) to another UE-2. In the examples, UE-1 and UE-2 may have registered using the same access network bearer or a different network access bearer. UE-1 and UE-2 may use different Internet Protocol-Connection Across Networks (IP-CAN) e.g. 3GPP IP-CAN on UE-1 and non-3GPP IP-CAN on UE-2. The anchored SCC AS or another network entity may determine what bearer to use for each UE. It is assumed that UE-1 and UE-2 belong to the same subscriber.

Whenever the UE acquires IP connectivity via an IP CAN, the UE can register in the IMS as defined in TS 23.228. In that case, the user profile contains a C MSISDN which is bound to the IMS Private User Identity. The S-CSCF may follow the procedures defined in TS 23.218 for performing 3rd party registration towards the SCC AS. When using CS access for media, the UE may be registered in IMS as specified in TS 23.292. When registering in the IMS as defined in TS 23.228 the UE may indicate its capability to support controller or controlee functionality for IUT. An example SIP REGISTER request for the S-CSCF to perform 3rd party registration towards the SCC AS is shown below in Table 15.

TABLE 15

REGISTER sip: sccas.home1.net /2.0
Via: SIP/2.0/UDP scscf1.home1.net;branch=z9hG499ffhy
Max-Forwards: 70       P-Access-Network-Info: 3GPP-UTRAN-TDD; utran-cell-id-3gpp=234151D0FCE11
From: <sip:scscf1.home1.net>; tag=538ya
To: <sip:user1_public1@home1.net>
P-Access-Network-Info: IEEE-802.11b
Call-ID: 1asdaddlrfjflslj40a222
Contact: <sip:scscf1.home1.net>; expires=600000
CSeq: 87 REGISTER
Content-Type: multipart/mixed;boundary="boundary1"
Content-Length: (...)
--boundary1
Content-Type: message/sip
REGISTER sip:registrar.home1.net SIP/2.0
Via: SIP/2.0/UDP pcscf1.visited1.net;branch=z9hG4bK240f34.1, SIP/2.0/UDP [5555::aaa:bbb:ccc:eee]:1357;comp=sigcomp;branch=z9hG4bKnashds7
Max-Forwards: 69
P-Access-Network-Info: IEEE-802.11b
Path: <sip:VskztcQ/S8p4WPbOnHbuyh5iJvJIW3ib@pcscf1.visited1.net;lr;ob>
Require: path
P-Visited-Network-ID: "Visited Network Number 1"
P-Charging-Vector: icid-value="AyretyU0dm+6O2IrT5tAFrbHLso=023551024"
From: <sip:234150999999999@ics.mnc015.mcc234.3gppnetwork.org>;tag=2hiue
To: <sip:234150999999999@ics.mnc015.mcc234.3gppnetwork.org>
Contact: <sip:[5555::aaa:bbb:ccc:eee];comp=sigcomp>; reg-id=2;
          +sip.instance="< urn:gsma:imei:90420156-025763-0>;+9.3gpp.icsi-ref="urn%3Aurn-7%3gpp-service.ims.icsi.mmtel";+g.3gpp.ics="principal";+g.3gpp.icsflow="WLAN";expires=600000
Call-ID: apb03a0s09dkjdfglkj49111
Authorization: Digest username="user1_private@home1.net", realm="registrar.home1.net", nonce=base64(RAND + AUTN + server specific data), algorithm=AKAv1-MD5, uri="sip:registrar.home1.net", response="6629fae49393a05397450978507c4ef1"
CSeq: 3 REGISTER
Supported: path, outbound, gruu
Content-Length: 0
--boundary1
Content-Type: message/sip
SIP/2.0 200 OK
Via: SIP/2.0/UDP icscf1_p.home1.net;branch=z9hG4bK351g45.1, SIP/2.0/UDP pcscf1.visited1.net;branch=z9hG4bK240f34.1, SIP/2.0/UDP [5555::aaa:bbb:ccc:eee]:1357;comp=sigcomp;branch=z9hG4bKnashds7
Path: <sip:term@pcscf1.visited1.net;lr;ob>
Service-Route: <sip:orig@scscf1.home1.net;lr>
From: <sip:234150999999999@ics.mnc015.mcc234.3gppnetwork.org>;tag=2hiue
To: <sip:234150999999999@ics.mnc015.mcc234.3gppnetwork.org>
Call-ID: apb03a0s09dkjdfglkj49111
Contact: <sip:[5555::aaa:bbb:ccc:ddd]:1357;comp=sigcomp>;
pub-gruu="sip:user1_public1@home1.net;gr=urn:uuid:f81d4fae-7dec-11d0-a765-00a0c91e6bf6"
;temp-gruu="sip:tgruu.7hs==jd7vnzga5w7fajsc7-ajd6fabz0f8g5@example.com;gr"
;+sip.instance="<urn:gsma:imei:90420156-025763-0>";+9.3gpp.icsi-ref="urn%3Aurn-7%3gpp-service.ims.icsi.mmtel";+g.3gpp.ics="principal";+g.3gpp.icsflow="WLAN"
;expires=600000
Supported: path, outbound
Require: outbound
Date: Wed, 11 July 2001 08:49:37 GMT
P-Associated-URI: <sip:user1_public2@home1.net>, <sip:user1_public3@home1.net>, <sip:+1-212-555-1111@home1.net;user=phone>
CSeq: 3 REGISTER
Content-Length: 0
--boundary1--

FIG. 8 illustrates a flow for transferring IUT-controller function to a UE as requested by an IUT-controller UE. In step 801 UE-1 decides to transfer the collaborative session control and media type (media-A) to UE-2. UE-1 sends a request to the SCC AS, indicating that the current collaborative session control and media type (Media-A) will be transferred to UE-2. In step 802 the SCC AS (or any other network component) identifies the transfer request, verifies that UE-2 is allowed and capable to act as a controller, verifies that UE-2 has registered appropriate capabilities e.g. feature tags per RFC 3840, determines what bearer to use for UE-2 based on the device capability, user preference and/or policy in the network, and determines whether the selected bearer has been registered by UE-2. In step 803 the SCC AS generates and sends UE-2 a session establishment request message using Gm or I1 reference point, or other data transfer methods indicating that the collaborative session control and media type (Media-A) are to be transferred. In step 804 a collaborative session control is established between UE-2 and the SCC AS. UE-2 becomes the controller UE for the established collaborative session. In step 805 a session for communicating mediate type (Media-A) between UE-2 and the remote party is established. At this time, the remote leg is updated accordingly. After the successful establishment of the collaborative session control and media type (Media-A) on UE-2, the SCC AS sends UE-1 a response message to the transfer request message or another message notifying UE-1 of the result of the transfer request message in step 806 (for example, a SIP NOTIFY request that is sent for a final response received as a result of a SIP REFER request as per RFC 3515). Finally, in step 807 the previous media type (Media-A) session on UE-1 may be released and the collaborative session control is released. At this time UE-1 becomes a controllee UE.

Figure 9:
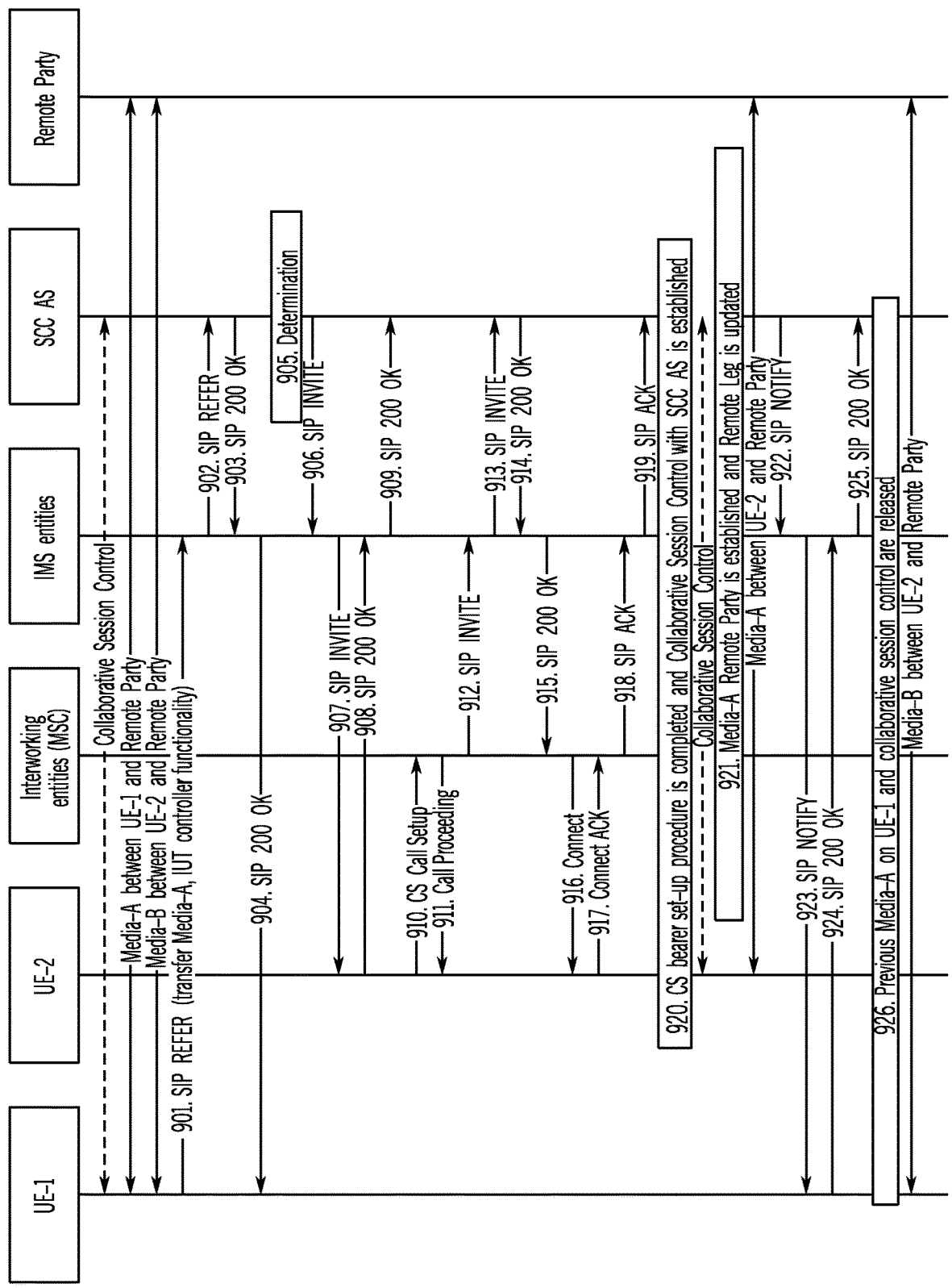
FIG. 9 illustrates an example flow for transferring media-A and controller function from UE-1 to UE-2, the incoming session request includes a controller function identifier and is delivered over the Gm reference point and the media-A is transmitted via a circuit-switched network.

FIG. 9 illustrates a flow for transferring IUT controller functionality from UE-1 to UE-2 where the incoming session request is delivered over the Gm reference point and the media is transmitted via a circuit-switched network. An MSC server enhanced ICS could be an exemplary entity of an Interworking entity for implementing the illustrated flow. Alternatively, the Interworking entities may consist of a legacy MSC server and MGCF. When the interworking entities correspond to MSC Server and MGCF, the CS bearer setup procedures follow the steps 11-17 in the FIG. 7.4.2.2.2-2 of TS 23.292.

With reference to FIG. 9, in steps 901 and 902 UE-1 decides to transfer the collaborative session control and media-A to UE-2. Accordingly, UE-1 sends a request to the SCC AS via IMS entities, indicating that the current collaborative session control and Media-A will be transferred to UE-2. In this example, an IUT controller UE can initiate a transfer request such as via SIP REFER by transmitting a request having the following information: 1) Source UE (may be included within the From header field, a P-Asserted-Identity header field or P-Served-User header field), 2) Target UE (may be included within the Refer-To header field), 3) IUT controller transfer indication (may be included within the Accept-Contact header field, e.g. embedded in the INVITE request or embedded in the Refer-To header field), 4) Target-Dialog-ID (may be included within the Target-Dialog header field containing an existing dialog identifier if the Target UE is already part of the collaborative session, and no Target-Dialog-ID when this is a new session for the Target UE), and 5) Media type (e.g. audio, video, file etc (e.g., included in Refer-To header field).

In step 905, the SCC AS identifies the request (e.g the SIP REFER request), verifies that the UE-2 is allowed and capable to act as a controller, verifies that UE-2 has registered appropriate capabilities e.g. feature tags per RFC 3840, what bearer to use for the UE-2 based on the device capability, user preference and/or policy in the network, and whether the selected bearer has been registered by the UE-2. If UE-2 is not allowed to act as a controller, the SCC AS may reject the request. If UE-2 refuses the collaborative session control transfer, a suitable response indicating the refusal is sent. The response may indicate the reason for refusing the transfer. Such a response may be a SIP 488 (Not Acceptable Here) response when the Media Types or Codecs offered are not acceptable. A warning may be included in the response indicating the reason for failure. The message to UE-1 indicating failure of the transfer may be contained in a SIP NOTIFY request containing in the body a SIPfrag of the response from UE-2 (e.g., a SIP 488 (Not Acceptable Here) response).

In steps 906 and 907, if the message received in step 905 contains a media transfer for audio or video then the SCC AS generates and sends UE-2 a session establishment request message. The session establishment request message such as SIP INVITE request or SIP re-INVITE sent subsequent to receiving a SIP REFER includes the following information: 1) Source UE (may be included within the Referred-By header field and P-Asserted-Identity header field, P-Preferred-Identity header field or P-Served-User header field), 2) Target UE (may be included in the To header field and Request-URI field), 3) IUT controller transfer indication (may be included in the Accept-Contact header field), 4) Target-Dialog (may be included in the Target-Dialog header field containing an existing dialog if the Target UE already is part of the collaborative session and no Target-Dialog when this is a new session for the Target UE), and 5) Media type (e.g Audio, Video, file) (may be included in the SDP embedded in the INVITE request). The request may also include a PSI DN to be used for the CS Call set that identifies this session. If the SDP contains M line that allows the bearer to be setup over CS, then, in step 910, UE-2 sends a CS call setup message to the Interworking entities using the PSI DN as the B number. In step 911 the Interworking entities such as an MSC server enhanced for ICS responds with a call proceeding message and begins to setup the CS Bearer Control Signaling Path. In steps 912 and 913 the Interworking entities send a SIP INVITE towards the SCC AS via IMS entities. When SCC AS receives the INVITE at step 913 the SCC AS may use the PSI DN to retrieve the session information and in step 916, when the Interworking entities receive a SIP 200 OK from the SCC AS via IMS entities, the Interworking entities map the received SIP 200 OK response to a CONNECT message and send it to UE-2. In step 917, when receiving the CONNECT message, the UE-2 sends a CONNECT ACK message to the Interworking entities. In step 920 the UE-2, Interworking entities and SCC AS complete the setup of the CS Bearer Control Signaling Path. Collaborative session control between UE-2 and the SCC AS is established. UE-2 becomes the controller UE for the established collaborative session. In step 921 exchange of media type (Media-A) communication between UE-2 and the remote party is established. At this time the remote leg is updated accordingly if SDP information needs to be changed. In steps 922 and 923, after the successful establishment of the collaborative session control and media type (Media-A) on UE-2, the SCC AS sends UE-1 a response message to the transfer request message or a message notifying the result of the transfer request message using such as SIP NOTIFY. Finally, in step 926 the previous media type (Media-A) session on UE-1 may be released and the collaborative session control is released. UE-1 becomes a controllee UE. Note that in the above example steps involving the communication of conventional acknowledgement messages are not described. If transferring all media flows on the UE-1 to UE-2, the existing session on the UE-1 may be released.

Figure 10:
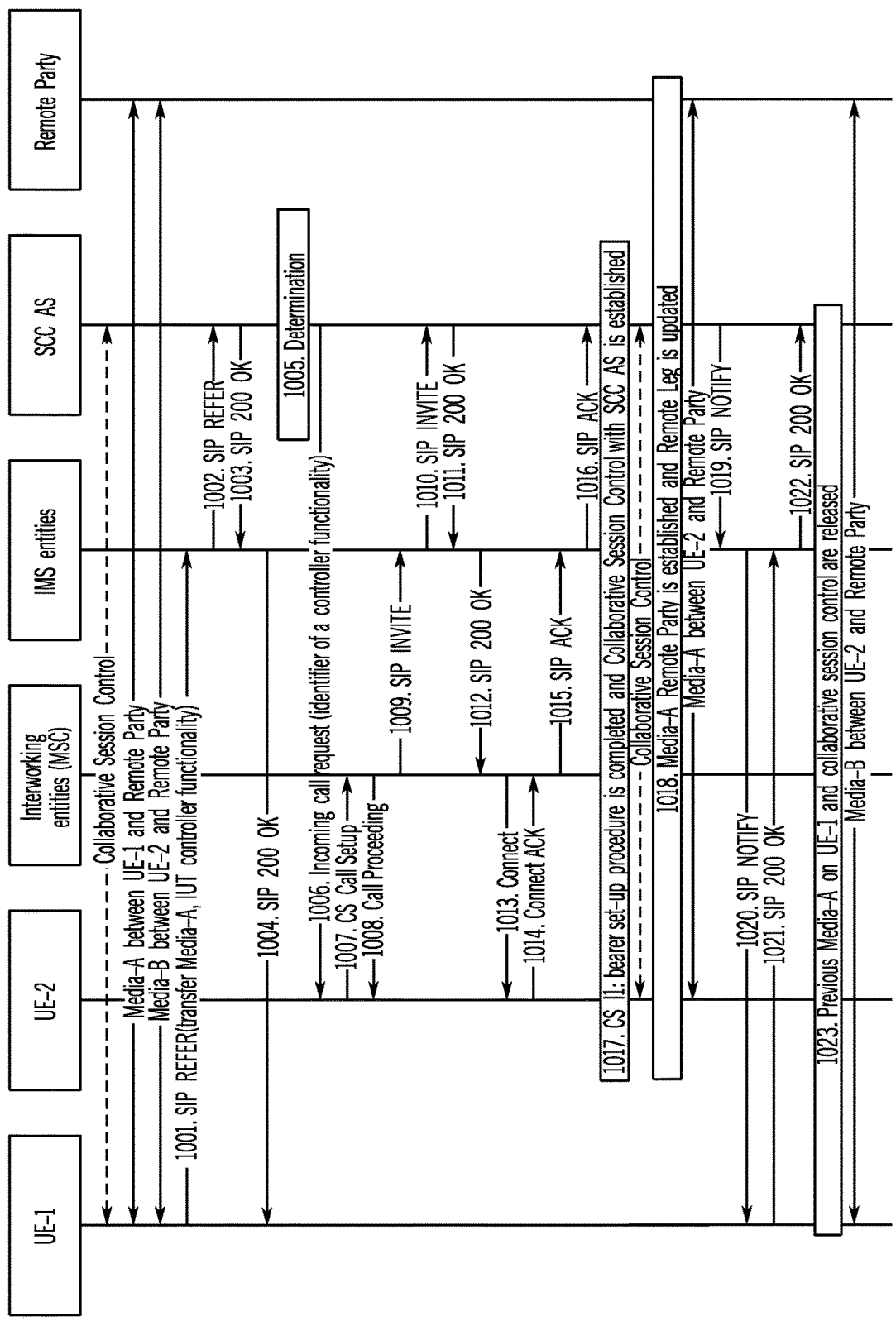
FIG. 10 illustrates an example flow for transferring media-A and controller function from UE-1 to UE-2, where the incoming session request includes a controller function identifier and is delivered over the I1 reference point and the media-A is transmitted via a CS network.

FIG. 10 illustrates a flow for transferring IUT controller functionality and media from UE-1 to UE-2, where the incoming session is delivered over the I1 reference point and the media is transmitted via a CS network. In one implementation, an MSC server enhanced ICS could be an exemplary entity of the Interworking entity. Alternatively, the Interworking entities may consist of a legacy MSC server and MGCF. When the interworking entities correspond to MSC Server and MGCF, the CS bearer setup procedures follow the steps 1011-1017 in the FIG. 7.4.2.2.2-2 of the TS 23.292.

In steps 1001 and 1002 UE-1 decides to transfer the collaborative session control and media-A to UE-2. Accordingly, UE-1 sends a request to the SCC AS via IMS entities, indicating that the current collaborative session control and Media-A will be transferred to UE-2. In one implementation UE-1 sends a transfer request such as via SIP REFER method with following information: 1) Source UE (may be included within the From header field, a P-Asserted-Identity header field, or P-Served-User header field), 2) Target UE (may be included within the Refer-To header field), 3) IUT controller transfer indication (may be included within the Accept-Contact header field, e.g. embedded in the INVITE request or embedded in the Refer-To header field), 4) Target-Dialog (may be included within the Target-Dialog header field containing an existing dialog identifier if the Target UE is already part of the collaborative session and no Target-Dialog when this is a new session for the Target UE), and 5) Media type (e.g. audio, video, file etc.) (may be included in the Refer-To header field).

In step 1005, the SCC AS identifies the request (e.g the SIP REFER request). If UE-2 is SIP Registered in SCC AS, the SCC AS verifies that the UE-2 is allowed and capable to act as a controller, verifies that UE-2 has registered appropriate capabilities e.g. feature tags per RFC 3840, determines what bearer to use for the UE-2 based on the device capability, user preference and/or policy in the network, and determines whether the selected bearer has been registered by the UE-2. If UE-2 is not allowed to act as a controller, the SCC AS may reject the request. If UE-2 refuses the collaborative session control transfer, a suitable response indicating the refusal and optionally the reason for refusal is sent.

In step 1006, the SCC AS has determined that UE-2 is not reachable by Gm reference point. This may be, for example, because the UE has no active SIP registration, in another example, UE-2 may be SIP Registered but the SCC AS has been informed via the I1 protocol that Gm reference point is not available. Providing the message received in step 1002 contains SDP line for audio or video then the SCC AS then generates and sends UE-2 an incoming call request message via the I1 reference point including an indication of IUT controller functionality and an indication to trigger the UE-2 to establish the bearer setup, if the UE-2 hasn't established the selected bearer yet, using transport mechanisms such as but not limited to: USSD, SMS, MBMS, CellBroadcast, IP pipe running over GPRS in GERAN, UTRAN, LTE, WLAN, WiMax, or CDMA2000.

In step 1007, the UE-2 sends a CS call setup message to the Interworking entities and in step 1008 the Interworking entities respond with a call proceeding message and begin to set up the CS Bearer Control Signaling Path. In steps 1009 and 1010 the Interworking entities send a SIP INVITE towards the SCC AS via IMS entities. In step 1013, when the Interworking entities receive a SIP 200 OK from the SCC AS via IMS entities, the Interworking entities map the received SIP 200 OK response to a CONNECT message and send it to UE-2.

In step 1014, when receiving the CONNECT message, the UE-2 sends a CONNECT ACK message to the Interworking entities and in step 1017 the UE-2, Interworking entities and SCC AS complete the setup of the CS Bearer Control Signaling Path. At this point, the collaborative session control between UE-2 and the SCC AS is established. UE-2 becomes the controller UE for the established collaborative session.

In step 1018 media type (Media-A) between UE-2 and the remote party is established. At this time the remote leg is updated accordingly. In steps 1019 and 1020, after the successful establishment of the collaborative session control and media type (Media-A) on UE-2, the SCC AS sends UE-1 a response message to the transfer request message or a message indicating the result of the transfer request message using such as a SIP NOTIFY message. In step 1023 the previous Media-A on UE-1 may be released and the collaborative session control is released. At this time UE-1 becomes a controllee UE. Note that in the above example steps involving the communication of conventional acknowledgement messages are not described. If transferring all media flows on the UE-1 to UE-2, the existing session on the UE-1 may be released.

The above examples describe flows that result in a successful transfer of IUT-controller function or media to an eligible controller capable UE. If the transfer is not successful, however, the system may send various message response reason codes or indications to the requesting UE that provide an explanation of why the transfer failed. Example response reason codes or indications include: no IUT controller capability (so a legitimate request for controller status cannot be made by that UE), there is already an IUT controller UE for the session (in cases where only a single UE can be an IUT controller, for example), UE is not under the same subscription, max limit of IUT controllers, unavailable (not registered, no battery, etc.), unauthorized to be an IUT controller, unsupported media type, unsupported media format, not allowed to establish a new session because of max number of simultaneous sessions is already reached, busy, etc. The response reason codes or indications may be contained within a SIP Warning header included in the response. In some cases, the rejection response and associated reason codes or indications may be included in the body of a SIP NOTIFY request such as within a SIPfrag containing part of the response message received at the SCC AS or other network node.

During operation of the present system, an IUT controller UE may subscribe to receive notifications that describe the ongoing sessions on a particular UE or all the UEs associated with the user. The notifications may identify various ongoing sessions and their associated controllee and/or controller UEs. In one example, a user A has initiated two sessions; one with user C and user D, and another with user B. With reference to the session with users C and D, user A has three sessions for his IUT controller UE set (i.e. devices 1, 2 and 3). For the conversation with user B, user A has two sessions on his IUT UE set (i.e. devices 2 and 3). In this example, user A may wish to know information describing currently ongoing sessions associated with the user's IUT UEs. In that case, user A may send a request (e.g. SIP SUBSCRIBE) and gets a response (e.g. SIP NOTIFY) with the following information set per Target-Dialog using the dialog event package as described in RFC 4235:

Target-Dialog
Participating user's ID (SIP URI, TEL URI, or nickname)
IUT device ID/Nickname
IUT controller device ID/Nickname
Media type or file per session (i.e. a notification that there are three different sessions on the user A's devices for a particular collaborative session)

Figure 11:
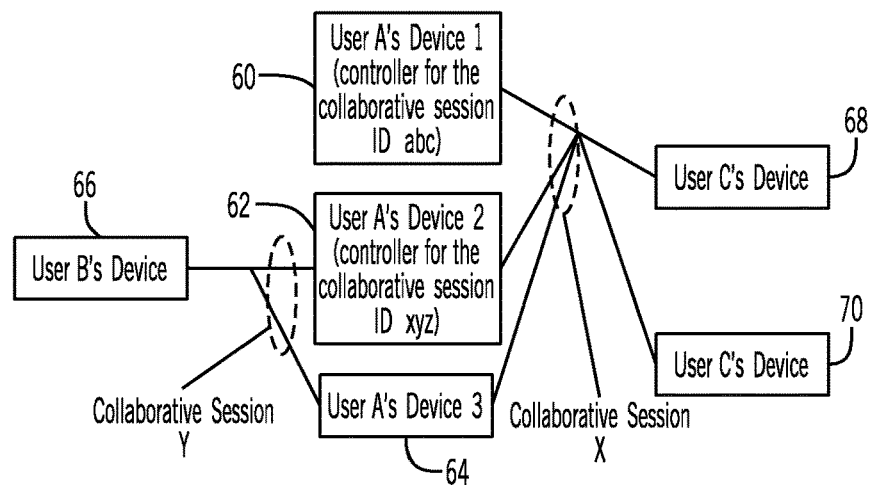
FIG. 11 illustrates multiple UEs associated with a user, collaborative sessions are established between a subset of the UEs.

As illustrated in the example shown in FIG. 11, multiple UEs may exist for user A for all ongoing sessions. User A's device 60 has issued a transfer request to user A's device 64 for the collaborative session X involving communication with user C's devices 68 or 70 and user A's device 62 has sent a transfer request to user A's device 64 for the collaborative session Y involving communication with user B's device 66. When a new invitation for a new media type is received on user A's device 62, it is possible to send a media transfer request or redirect request using user A's device 60 in order to transfer the new invitation to user A's device 64. If the media transfer request or redirect request has been successfully accepted, the success notification is transferred to the controller UEs for the session or all IUT controller UEs which are user A's device 60 and 62. Depending on user preference and device capability, a user may configure to receive notifications on all controller UEs or assign which controller UE to receive notifications among multiple controller UEs rather than receiving notifications to all controller UEs. As shown in FIG. 11, although multiple UEs exist for user A, only one IUT controller UE exists for each collaborative session. As such, only the controller UE for the particular collaborative session receives a notification when the session status has changed on that particular collaborative session.

In some implementations there may be a substantial amount of notification traffic eligible to be transmitted to any controller UE(s). Filtering mechanisms may be implemented within the notification mechanism on the network and/or each individual UE to optimize the volume of notification traffic being transmitted to the controlling UEs.

For terminating sessions, in one implementation of the present system, whichever UE first receives the request for the session establishment and is able to accept the session establishment request may be allocated the controller function (otherwise the UE which has accepted the session will be stuck on the session and will not have the ability to send a transfer request to another UE of the user). On receiving an initial session establishment request (e.g. a SIP INVITE, SIP re-INVITE, or SIP UPDATE) from the remote party, the network may need to ensure that the request is routed to a UE that is a controller and or supports the controller function. Once a session has been established, the terminating user may want to transfer collaborative session control to another UE of the same user. If the target UE does not have IUT controller capability and is not an IUT controller UE then the target UE is unable to make a transfer request to another UE. In some cases, however, the transfer may still take place. For example, a UE may allow a user to provide a redirect setting on the network i.e. for redirecting the request to a particular UE, such as a controller UE assigned by a user, when an invitation request arrives in the terminating side. In addition, a UE may allow a user to setup a user preference to indicate which bearer to use for session establishment, possibly as a combination of media type, and device capability. For example a user having two UEs may setup a user preference to use a packet switched bearer for speech type sessions on UE-1 and to use a circuit switched bearer for video type sessions on UE-2.

Alternatively, if there is no redirect setting, when the terminating network receives an invitation request, the network sends a request to ask the user whether to accept the invitation on the UE or redirect to another UE (i.e. a controller UE). If the user decides to redirect to another UE (which is a controller UE) then the network sends a response containing the transferred UE identity to the terminating network and the terminating network sends the invitation request to the UE assigned by the user.

Alternatively, if there is no redirect setting, when the terminating UE receives an invitation request, the UE asks the user whether to accept the invitation or redirect to another UE. If the user decides to redirect to another UE (i.e. a controller UE) then the network sends a redirect request to the terminating network. In that case, the terminating network sends the invitation request to the UE assigned by the user. When the terminating network receives (e.g. via the SCC AS) an invitation message (e.g. a SIP INVITE, SIP re-INVITE, or SIP UPDATE) the terminating network determines which terminating UE to become an IUT controller based on device capability, user preference and/or policy, and which bearer to use for the terminating UE. The network checks that the terminating UE has registered for the identified bearer. If not, the network may send an indication to the terminating UE to initiate bearer registration. After successful bearer registration, the network (e.g., via the SCC AS) sends an invitation request message (e.g. SIP INVITE) indicating that the session control and certain media types are presented to the target terminating UE. On receiving an Ack or OK response message, the SCC AS may send an indication to the Remote party that the media stream has been redirected to a different UE.

Figure 12A:
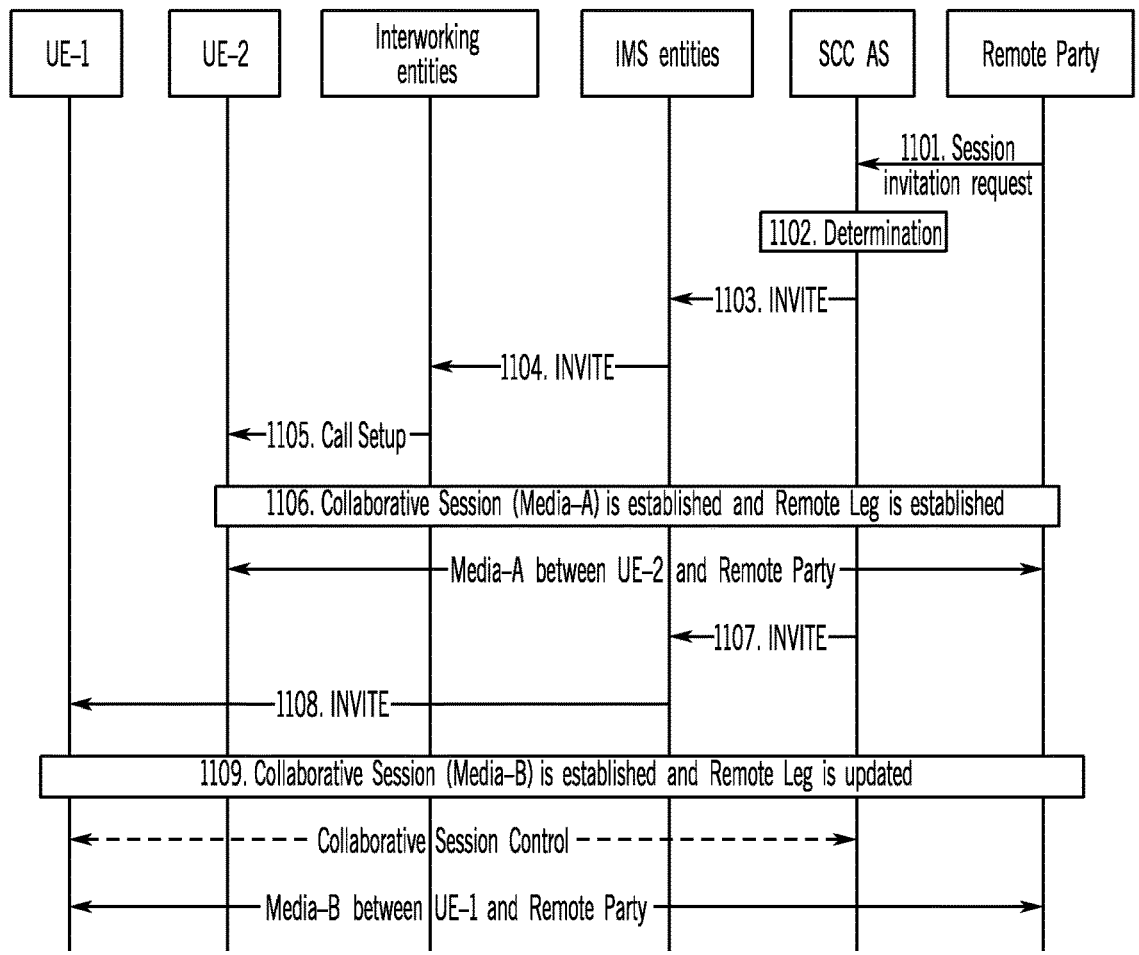
FIGS. 12a and 12b illustrate example flows for terminating collaborative session establishment when receiving a session invitation request.
Figure 12B:
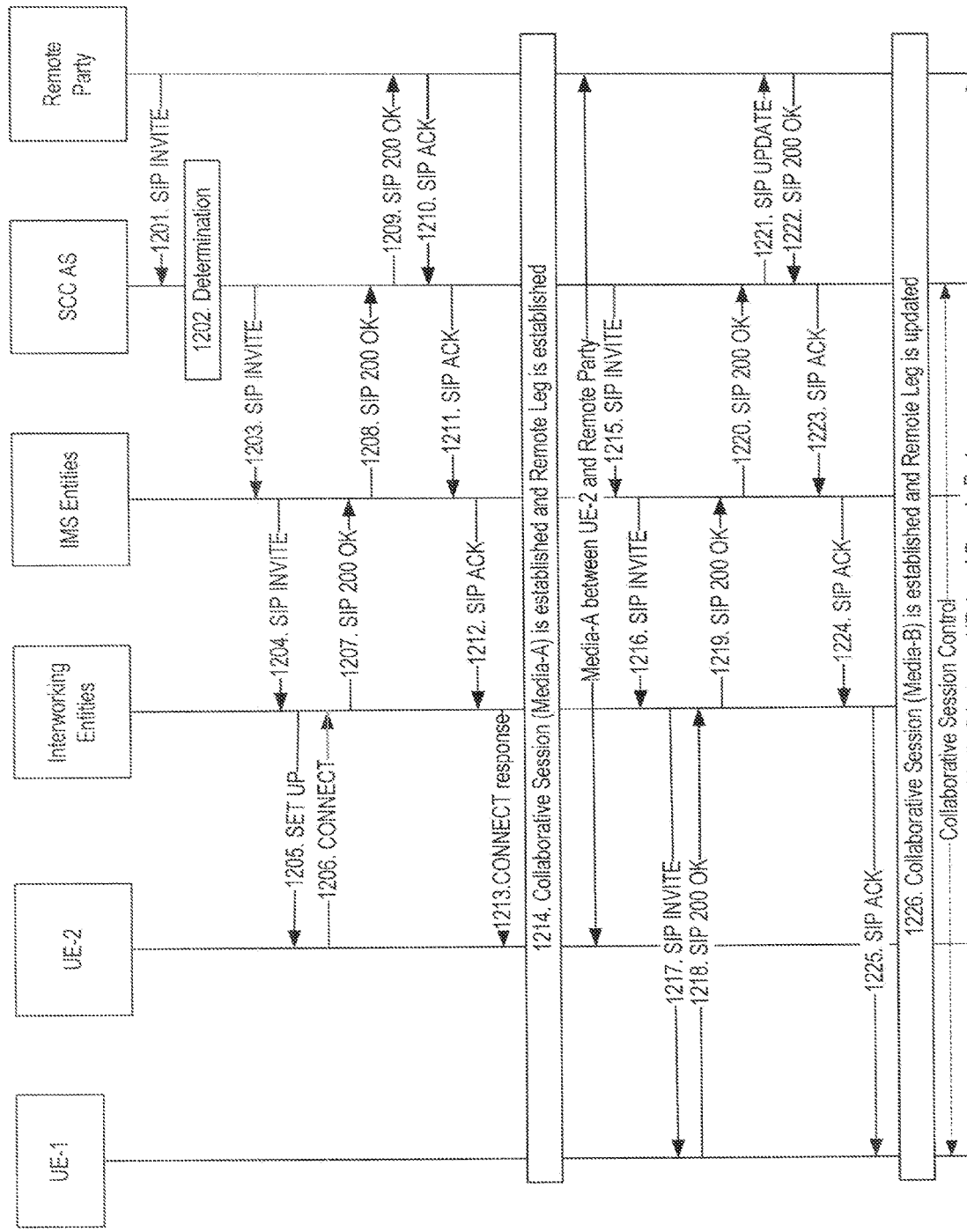

FIGS. 12a and 12b illustrate a flow for terminating collaborative session establishment when a remote party sent a session invitation request. In one implementation, an MSC server enhanced ICS could be an exemplary entity of the Interworking entity. Alternatively, the Interworking entities may consist of a legacy MSC server and MGCF. The example flow assumes that UE-1 has setup a device capability/user preference to be an IUT controller and to use PS bearer for the session establishment with video type. UE-2 has setup a device capability/user preference to use CS bearer for session establishment with a speech media type. FIG. 12a shows a high level flow, as follows. In step 1101, the terminating network (e.g. SCC AS) receives an invitation message (e.g. a SIP INVITE or SIP re-INVITE). In step 1102, the SCC AS determines which terminating UE to become an IUT controller based on device capability, user preference and/or policy, and which bearer to use for the terminating UE based on device capability, user preference and/or policy. In the example, the SCC AS determines UE-1 acts as an IUT controller and uses PS bearer with a video media type while UE-2 uses CS bearer with a speech media type. In steps 1103 and 1104 the SCC AS sends the invitation request message (e.g. SIP INVITE) to the Interworking entities via IMS entities in order to establish a collaborative session toward UE-2. In step 1105, the Interworking entities send a CS call setup message to the UE-2. In step 1106, the UE-2, Interworking entities and the SCC AS complete the setup of the CS Bearer Control Signaling Path and the SCC AS and remote party complete the remote leg establishment. The Collaborative Session with speech media type between UE-2 and the SCC AS is established the remote leg between the SCC AS and remote party is established.

In steps 1107 and 1108, the SCC AS sends an invitation request message (e.g. SIP INVITE) to UE-1 via IMS entities. In step 1109, the collaborative session with video media type between UE-1 and the SCC AS is established and the remote leg between the SCC AS and remote party is updated. The UE-1 gets a Collaborative Session control which allows applying IUT transfer request.

In the steps illustrated in FIG. 12*a*, in one implementation it is assumed that UE-1 and UE-2 belong to the same subscriber (i.e. the same subscription set) and the SCC AS determines to establish Collaborative Sessions over CS network on the UE-2 and over PS network on the UE-1 which keeps Collaborative Session Control. In some cases, when the interworking entities correspond to MSC Server and MGCF the CS bearer setup procedures follow the steps 11-17 in the FIG. 7.4.2.2.2-2 of the TS 23.292.

FIG. 12*b* illustrates more detail flow than in FIG. 12*a* as follows: In step 1201, the terminating network (e.g. SCC AS) receives an invitation message (e.g. a SIP INVITE or SIP re-INVITE). In step 1202, the SCC AS determines which terminating UE to become an IUT controller based on device capability, user preference and/or policy, and which bearer to use for the terminating UE based on device capability, user preference and/or policy. In the example, the SCC AS determines UE-1 acts as an IUT controller and uses PS bearer with a video media type while UE-2 uses CS bearer with a speech media type. In steps 1203 and 1204 the SCC AS sends the invitation request message (e.g. SIP INVITE) to the Interworking entities via IMS entities in order to establish a collaborative session toward UE-2. In steps 1205 and 1206, the Interworking entities send a CS call setup message to the UE-2 and receive a CS call connection message. In steps 1207 through 1209, a SIP 200 OK response message is sent to Remote Party via IMS entities and SCC AS. The remote party sends SIP ACK toward the Interworking entities in steps 1210 through 1212 and the Interworking entities send a CONNECT response message to UE-2. In step 1214 a session with a speech media type between UE-2 and the Remote party is established.

In steps 1215 through 1217 the SCC AS sends the invitation request message (e.g. SIP INVITE) to the terminating UE-1 to establish a session with a video media type. At this point, the collaborative session control with SCC AS is established and the terminating UE-1 becomes an IUT controller. On receiving a SIP 200 OK response from UE-2 via the Interworking entities and IMS entities as shown in steps 1218 through 1220, the SCC AS sends a SIP UPDATE to the remote party to update the remote leg in step 1221. After successful SIP responses in steps 1222 through 1225, in step 1226 a collaborative session with the video media type between UE-1 and the SCC AS is established and the remote leg between the SCC AS and the Remote party is updated. Note that in the above example steps involving the communication of conventional acknowledgement messages are not fully described.

Figure 13:
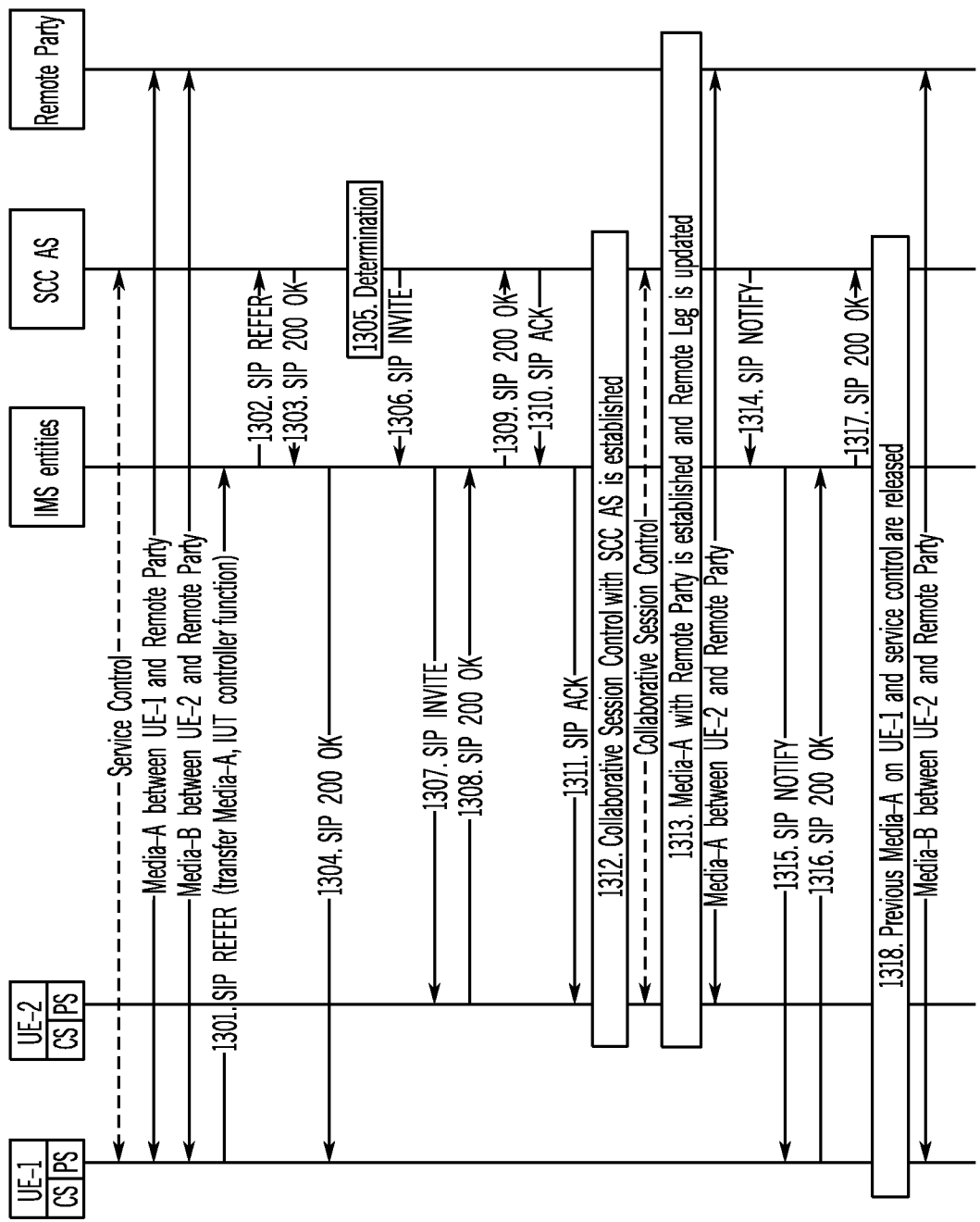
FIG. 13 illustrates an example flow for transferring IUT Controller functionality from a first PS UE to a second PS UE, wherein the first and second UEs may use the same bearer or different bearers.

FIG. 13 illustrates a flow for transferring IUT Controller functionality from PS UE-1 to PS UE-2. UE-1 and UE-2 may use the same bearer or different bearers. Even if using a Packet Switched bearer on UE-1 and UE-2 it may be possible to use 3GPP IP-CAN on UE-1 and non-3GPP IP-CAN on UE-2. In steps 1301 and 1302, UE 1 decides to transfer the collaborative session control and media-A to UE 2. Accordingly, UE-1 sends a request to the SCC AS via IMS entities, indicating that the current service control and media type (Media-A) will be transferred to UE 2. In step 1305, the SCC AS identifies the request e.g the SIP REFER request, verifies that the UE-2 is allowed and capable to act as a controller and determines PS bearer used for the UE-2 based on the device capability, user preference and/or policy in the network.

In steps 1306 and 1307, the SCC AS generates and sends a session establishment request message such as a SIP INVITE request (or SIP re-INVITE) indicating the collaborative session control and media type (Media-A). The session establishment request can be routed over the desired access leg (bearer) using the flow identifier media feature tag in the Accept-Contact header described above. In step 1312, the collaborative session control between UE 2 and the SCC AS is established. UE 2 becomes the controller UE for the established collaborative session. In step 1313, media type (Media-A) communication between UE 2 and remote party is established. The remote leg is updated accordingly. In steps 1314 and 1315, after the successful establishment of the collaborative session control and media type (Media-A) on UE 2, the SCC AS sends UE 1 a response message to the transfer request message or a message notifying the result of the transfer request message such as SIP NOTIFY message. In step 1318, the previous media type (Media-A) on UE 1 and the Collaborative Session control may be released. UE 1 becomes a controllee UE. Note that in the above example steps involving the communication of conventional acknowledgement messages are not described.

The present system and method may be used to provide an IUT controller transfer application. An example method implemented by the present system indicates at least one of the ability to perform the IUT Controller function and inability to perform the IUT Controller function. The method includes providing in a Session Initiation Protocol (SIP) message an indication of the ability to support the IUT:Controller function, and providing in a Session Initiation Protocol (SIP) message an indication of the inability to support the IUT:Controller function. The indication of at least one of the ability to perform the IUT Controller function and inability to support the IUT:Controller function may be indicated using a Media Feature Tag. The Media Feature Tag may indicate at least one of the values "Active" indicating the ability to act as an IUT controller and is currently acting as the IUT controller for a collaborative session, "Inactive" indicating the ability to act as an IUT controller but is not currently acting as the IUT controller for a collaborative session, and "Passive" indicating the inability to act as an IUT controller for a collaborative session.

Depending upon implementation, the Media Feature Tag may be contained within a Contact Header. The Session Initiation Protocol (SIP) message may include one of a SIP REGISTER request, a SIP INVITE request, a SIP Re-INVITE request, a SIP UPDATE request, a SIP PRACK request, a SIP REFER request, a SIP PUBLISH request, a SIP MESSAGE request, a SIP SUBSCRIBE request, a SIP NOTIFY request, a SIP OPTIONS request, and a SIP response.

An example method of transferring IUT controller function from one device to another may include providing in a Session Initiation Protocol (SIP) message an indication of the transfer of the IUT:Controller function. The indication of the transfer of the IUT:Controller function may be indicated using a Media Feature Tag. The Media Feature Tag may be contained in an Accept-Contact Header. The Session Initiation Protocol (SIP) message may be one of a SIP INVITE request, a SIP Re-INVITE request, a SIP UPDATE request, a SIP PRACK request, a SIP REFER request, a SIP PUBLISH request, a SIP MESSAGE request, a SIP SUBSCRIBE request, a SIP NOTIFY request, a SIP OPTIONS request, and a SIP INFO Request. The Media Feature Tag may be contained in an Accept-Contact Header that is itself contained within a Refer-To header.

The method may include receiving, in response, an indication of one of Successful IUT Transfer, or Unsuccessful IUT Transfer. The indication may include a SIP Response, a SIP UPDATE request, a SIP PRACK request, a SIP NOTIFY Request, a SIP PUBLISH Request, a SIP MESSAGE Request, a SIP OPTIONS request, or a SIP INFO Request. Alternatively, the indication may be one of a Media feature tag in a Contact header, within the body of a SIP request or SIP response, within a SIPfrag in a body of a SIP request or SIP response, or encoded in an XML format.

Alternatively, the method may provide for transferring IUT controller function from one point of attachment to another point of attachment. The point of attachment technology may include IEEE-802.11, IEEE-802.11a, IEEE-802.11b, IEEE-802.11g, IEEE-802.11n, 3GPP-GERAN, 3GPP-UTRAN-FDD, 3GPP-UTRAN-TDD, 3GPP-E-UTRAN-FDD, 3GPP-E-UTRAN-TDD, ADSL, ADSL2, ADSL2+, RADSL, SDSL, HDSL, HDSL2, G.SHDSL, VDSL, IDSL, 3GPP2-1X, 3GPP2-1X-HRPD, 3GPP2-UMB, DOCSIS, IEEE-802.3, IEEE-802.3a, IEEE-802.3e, IEEE-802.3i, IEEE-802.3j, IEEE-802.3u, IEEE-802.3ab, IEEE-802.3ae, IEEE-802.3ak, IEEE-802.3aq, IEEE-802.3an, IEEE-802.3y, IEEE-802.3z, IEEE-802.3y, 3GPP-GERAN, 3GPP-UTRAN, 3GPP-E-UTRAN, 3GPP-WLAN, 3GPP-GAN, or 3GPP-HSPA. In some cases, however, other access technologies, classes or types may be employed.

Another example method of transferring IUT controller function from one device to another includes receiving in a Session Initiation Protocol (SIP) message an indication of the transfer of the IUT:Controller function. The indication of the transfer of the IUT:Controller function may be indicated using a Media Feature Tag. The Media Feature Tag may be contained in an Accept-Contact Header. The Session Initiation Protocol (SIP) message may be one or more of a SIP INVITE request, a SIP Re-INVITE request, a SIP UPDATE request, a SIP PRACK request, a SIP REFER request, a SIP PUBLISH request, a SIP MESSAGE request, a SIP SUBSCRIBE request, a SIP NOTIFY request, a SIP OPTIONS request, or a SIP INFO Request. The Media Feature Tag may be contained in an Accept-Contact Header is itself contained within a Refer-To header. The method may include sending in response an indication of one of Successful IUT Transfer, and Unsuccessful IUT Transfer. The indication may be contained in one of a SIP Response, a SIP UPDATE request, a SIP PRACK request, a SIP NOTIFY Request, a SIP PUBLISH Request, a SIP MESSAGE Request, a SIP OPTIONS request, and a SIP INFO Request. The indication may be one of a Media feature tag in a Contact header, within the body of a SIP request or SIP response, within a SIPfrag in a body of a SIP request or SIP response, or encoded in XML format. The method may include performing the Active IUT Controller function for the collaborative session.

The present system may be further configured to direct a SIP REQUEST over a specific access application. An example method for identifying a registration flow over an access network includes providing in a P-Access-Network-Info header of a Session Initiation Protocol (SIP) REGISTER request an identifier that identifies the access type of the access network that SIP REGISTER request is transported over, and providing in the Contact header of a Session Initiation Protocol (SIP) REGISTER request a Media Feature Tag containing a value that uniquely identifies the registration flow over all other registrations by the same device. The Media Feature Tag may contain a value derived from the "reg-id" contact header parameter included in the SIP REGISTER request. The Media Feature Tag may contain a value that is a text string. The Media Feature Tag contains a value that is a text string input by the user. An example method of identifying a registration flow over an access network includes obtaining from a P-Access-Network-Info header of a Session Initiation Protocol (SIP) REGISTER request an identifier that identifies the access type or access class of the access network that SIP REGISTER request is transported over, obtaining from a Contact header of a Session Initiation Protocol (SIP) REGISTER request a Media Feature Tag containing a value that uniquely identifies the registration flow over all other registrations by the same device, and associating the access type or access class with the value from the Media Feature Tag. The contents of the Session Initiation Protocol (SIP) REGISTER request may be obtained using at least one of the body of a received third party REGISTER request, the P-Access-Network-Info header in a received third party REGISTER request, and the registration event package within the body of a SIP NOTIFY request. The method may include receiving a SIP request or generating a SIP request, determining that the SIP request is to be routed over a particular access leg identified by an access type or access class value, retrieving the Media Feature Tag value associated with access type or access class value, and including in the SIP request in an Accept-Contact header the retrieved Media Feature Tag value. The SIP request may be one of a SIP INVITE Request, a SIP Re-INVITE request, a SIP UPDATE request, a SIP PRACK request, a SIP REFER request, a SIP PUBLISH request, a SIP MESSAGE request, a SIP SUBSCRIBE request, a SIP OPTIONS request, and a SIP INFO Request.

An example method of identifying a registration flow over an access network that a request is to be sent over includes providing in an Accept-Contact header of a SIP Request a Media Feature Tag containing a value that uniquely identifies a registration flow of a device. The Media Feature Tag may contain a value that is a text string. The Media Feature Tag may contain a value that is a text string input by the user. The SIP request may be one of a SIP INVITE Request, a SIP RE-INVITE request, a SIP UPDATE request, a SIP PRACK request, a SIP REFER request, a SIP PUBLISH request, a SIP MESSAGE request, a SIP SUBSCRIBE request, a SIP OPTIONS request, and a SIP INFO Request. The Media Feature Tag may be contained in an Accept-Contact Header is itself contained within a Refer-To header.

Figure 14:
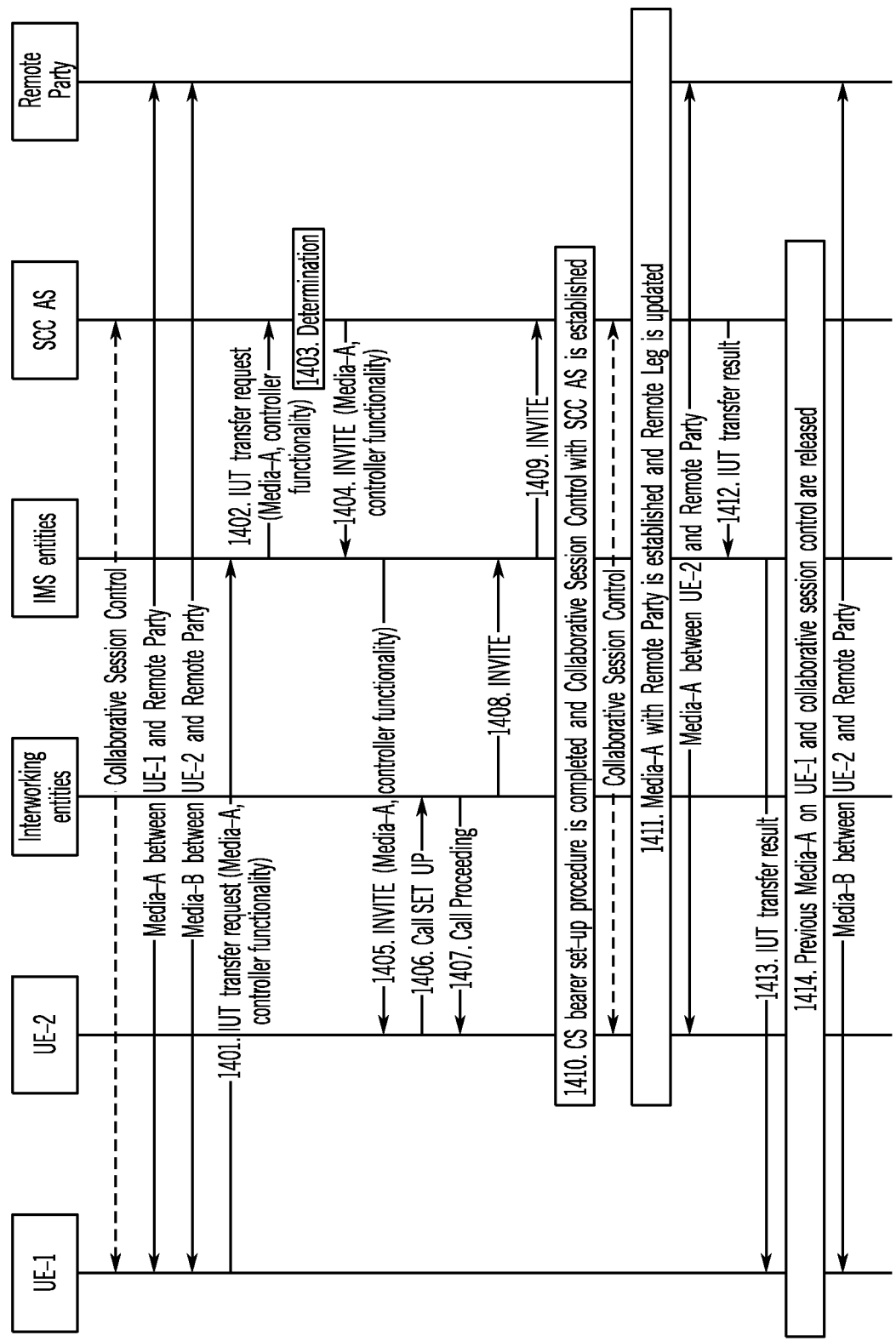
FIG. 14 is an illustration of an alternative message flow for media/controller functionality transfer to another UE within Collaborative Session using Gm reference point.

FIG. 14 is an illustration of an alternative message flow for media/controller functionality transfer to another UE within Collaborative Session using Gm reference point. The message flow illustrated in FIG. 14, shows an example method for transferring media and IUT Controller functionality from UE-1 to UE-2, where the incoming session is delivered over the Gm reference point and the media is established via CS network. In the example, it is assumed that UE-1 and UE-2 belong to the same subscriber (i.e. the same subscription set), Interworking entities correspond to MSC enhanced for ICS, and follows termination procedures with CS media using Gm reference point shown in TS 23.292. In this example, when the interworking entities correspond to MSC Server and MGCF the CS bearer setup procedures may follow the steps 11-17 in the FIG. 7.4.2.2.2-2 of the TS 23.292.

Referring to FIG. 14, in step 1401 UE 1 decides to transfer the Media-A and collaborative session control to UE 2 and sends IMS entities a transfer request indicating that the current collaborative session control and Media-A is to be transferred to UE 2. In step 1402 the IMS entities forward the transfer request to the SCC AS and in step 1403 the SCC AS identifies the transfer request, verifies that the UE-2 is allowed and capable to act as a controller, performs T-ADS based on the UE-2 capability, user preference and/or policy in the network and chooses the CS domain for setup of the Media-A. If UE-2 is not allowed to act as a controller or the transfer request can't be performed successfully the SCC AS rejects the request with the reason and stop following the steps below.

Still referring to FIG. 14, in step 1404 the SCC AS generates and sends IMS entities an INVITE request indicating that the Media-A and collaborative session control and that the UE-2 to initiate the CS bearer establishment procedure as shown in TS 23.292. In step 1405 the IMS entities forward the received INVITE request to the UE-2, and in step 1406 the UE-2 sends a CS call setup message to the Interworking entities. In step 1407 the Interworking entities respond with a call proceeding message and begins to set up the CS Bearer Control Signalling Path, and in steps 1408 and 1409 the Interworking entities send an INVITE towards the SCC AS via IMS entities. In step 1410 the UE-2, Interworking entities and SCC AS complete the setup of the CS Bearer Control Signalling Path. The Collaborative Session control between UE 2 and the SCC AS is established. UE 2 becomes the controller UE for the established Collaborative Session. In step 1411 media-A between UE 2 and remote party is established. The remote leg is updated accordingly. In step 1412, after the successful transfer of the Collaborative Session control and Media-A onto the UE 2, the SCC AS sends the IMS entities an IUT transfer result message, and in step 1413 the IMS entities forward the IUT transfer result message to the UE-1. Finally, in step 1414 the previous Media-A and Collaborative Session control is released. UE 1 becomes a controlee UE.

Figure 15:
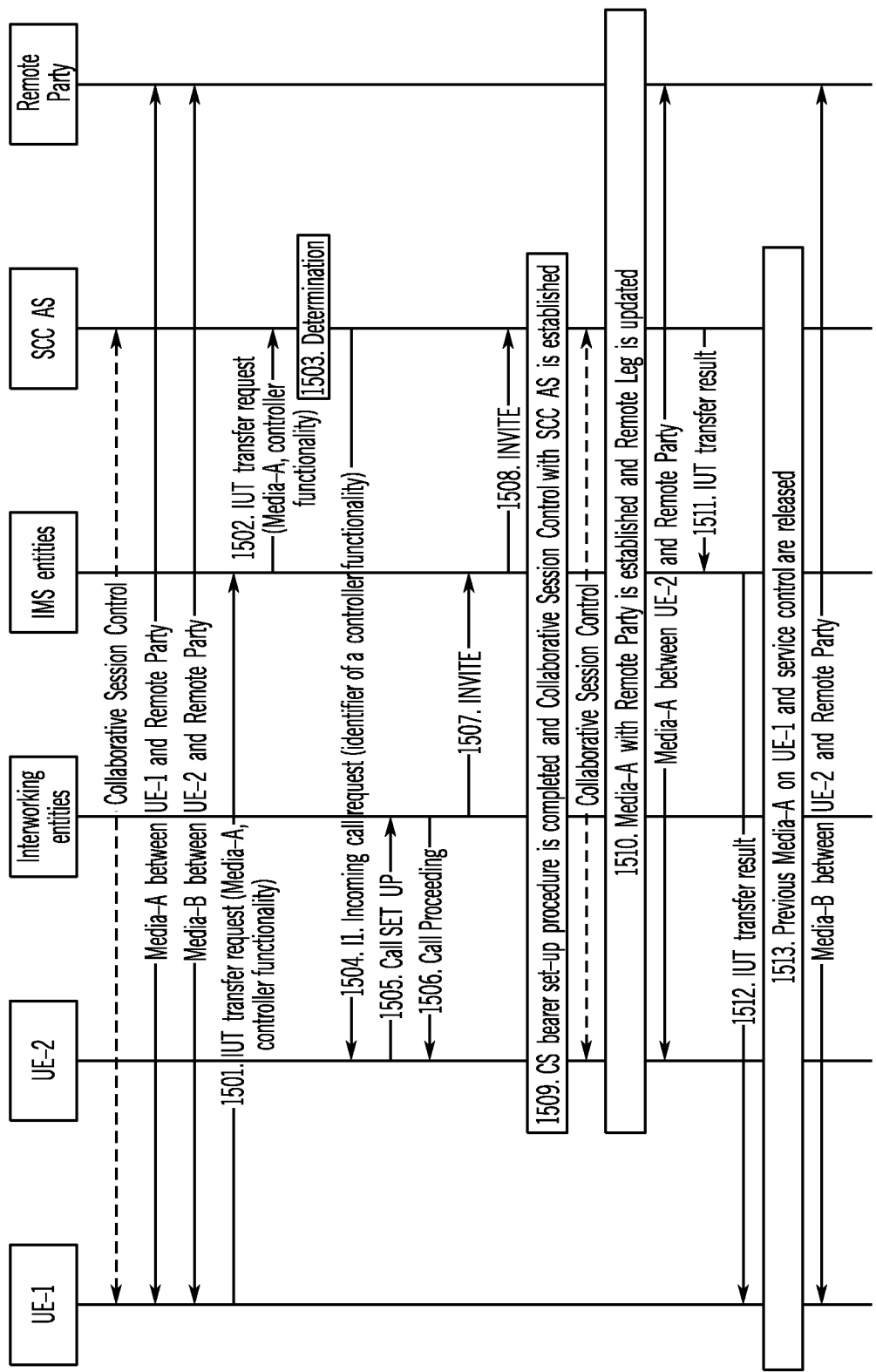
FIG. 15 is an illustration of an alternative message flow for media/controller functionality transfer to another UE within Collaborative Session using the I1 reference point.

FIG. 15 is an illustration of an alternative message flow for media/controller functionality transfer to another UE within Collaborative Session using the I1 reference point. The message flow illustrated in FIG. 15, shows an example method for transferring IUT Controller functionality from UE-1 to UE-2, where the incoming session is delivered over the I1 reference point and the media is established via CS network. In this example, it is assumed that UE-1 and UE-2 belong to the same subscriber (i.e. the same subscription set), Interworking entities correspond to MSC enhanced for ICS, and follows termination procedures with CS media using I1 reference point shown in TS 23.292. In this example, when the interworking entities correspond to MSC Server and MGCF the CS bearer setup procedures follow the steps 11-17 in the FIG. 7.4.2.2.2-2 of the TS 23.292.

Referring to FIG. 15, in step 1501, UE 1 decides to transfer the Media-A and collaborative session control to UE 2 and sends IMS entities a transfer request indicating that the current collaborative session control and Media-A is to be transferred to UE 2. In step 1502 the IMS entities forward the transfer request to the SCC AS and in step 1503 the SCC AS indentifies the transfer request, verifies that the UE-2 is allowed and capable to act as a controller, performs T-ADS based on the UE-2 capability, user preference and/or policy in the network and chooses the CS domain for setup of the Media-A. If UE-2 is not allowed to act as a controller or the transfer request can't be performed successfully the SCC AS rejects the request with the reason and stop following the steps below. In step 1504 the SCC AS generates and sends UE-2 an incoming call request via I1 reference point indicating that the UE-2 to initiate the CS bearer establishment procedure and that the collaborative session control and Media-A to be transferred to UE-2, as shown in TS 23.292.

Still referring to FIG. 15, in step 1505 the UE-2 sends a CS call setup message to the Interworking entities and in step 1506 the Interworking entities respond with a call proceeding message and begins to set up the CS Bearer Control Signalling Path. In steps 1507 and 1508 the Interworking entities send an INVITE towards the SCC AS via IMS entities, and in step 1509 the UE-2, Interworking entities and SCC AS complete the setup of the CS Bearer Control Signaling Path. The Collaborative Session control between UE 2 and the SCC AS is established. UE 2 becomes the controller UE for the established Collaborative Session. In step 1510 media-A between UE 2 and remote party is established. The remote leg is updated accordingly. In step 1511, after the successful transfer of the Collaborative Session control and Media-A onto the UE 2, the SCC AS sends the IMS entities an IUT transfer result message. In step 1512 the IMS entities forward the IUT transfer result message to the UE-1, and in step 1513 the previous Media-A and Collaborative Session control is released. UE 1 becomes a controlee UE.

Figure 16:
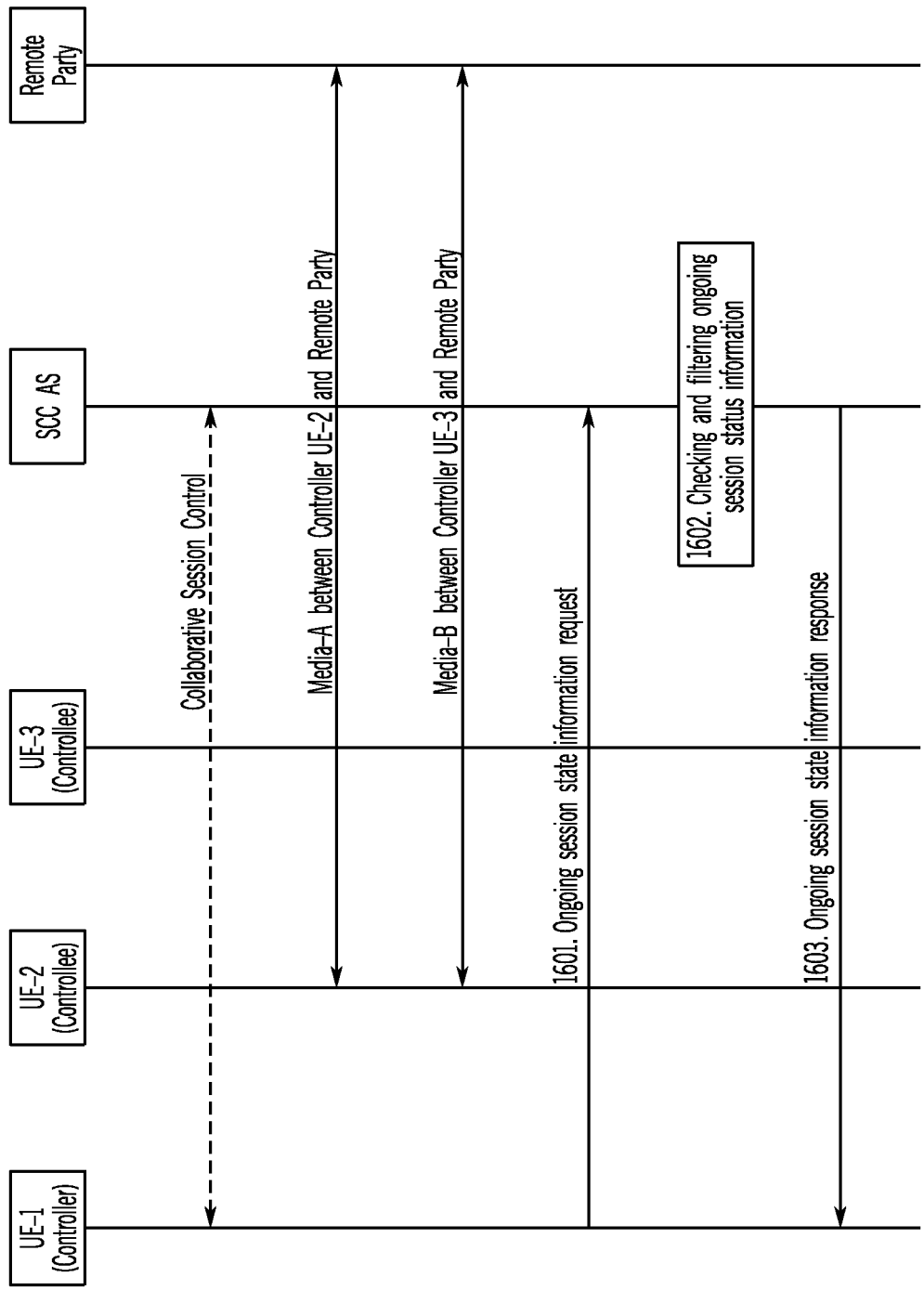
FIG. 16 is an illustration of an alternative message flow for Controller Initiated ongoing session information transfer.

FIG. 16 is an illustration of an alternative message flow for Controller Initiated ongoing session information transfer. In the example shown in FIG. 16, UE-1, UE-2 and UE-3 may be under the same user subscription. There is one session with Media—A between UE-2 and Remote Party and another session with Media—B between UE-3 and Remote Party. FIG. 16 presents an information flow of UE-1 requesting all ongoing session state information for the user's IUT UEs.

Referring to FIG. 16, in step 1601 UE-1 sends the SCC AS a request on ongoing session state information for the user's IUT UEs. The request may include what information is to be obtained in the response. The information may include the ongoing sessions for the user's IUT UEs, the media type per an ongoing session, and/or the source UE and the target UE per an ongoing session. In step 1602 the SCC AS checks all ongoing sessions for the user's IUT UEs and filters the requested information i.e. there is one session A with media type A between UE-2 and Remote Party and another session B with media type B between UE-3 and Remote Party. In step 1603 the SCC AS sends the UE-1 a response on all ongoing session state information on UE-2 and UE-3.

In implementations of the present system where the SCC AS serves a terminating ICS UE and receives an initial SIP INVITE request due to initial filter criteria and the T-ADS results in choosing to deliver media in the PS domain, the SCC AS can act as a B2BUA. If multiple contacts are registered in the PS domain and the T-ADS chooses to establish different media types using different IP-CANS, the SCC AS can, for each selected PS domain IP-CAN, create a SIP INVITE request in accordance with 3GPP TS24.229. The SIP INVITE request may include i) an Accept-Contact header containing the media feature tag g.3gpp.icsflow containing the value associated at registration with the access-type or access-class of the selected PS domain IP-CAN and the media feature tag g.3gpp.ics containing the value "principal" along with the parameters "require" and "explicit", and ii) if an existing leg for this session already exists or is in the process of being established between the SCC AS and the ICS UE using a different IP-CAN, a Target-Dialog header containing the dialog parameters for that existing dialog between the SCC AS and the ICS UE (the SCC AS SCC AS may include a Target-Dialog header in the SIP INVITE request so that the ICS UE can correlate different requests as part of the same session), and iii) an SDP for the media type(s) selected to be established using this IP-CAN.

If multiple contacts are registered in the PS domain and the T-ADS chooses to establish all the media types over the same IP-CAN, the SCC AS may create a SIP INVITE request in accordance with 3GPP TS24.229 and may include in the request i) an Accept-Contact header containing the media feature tag g.3gpp.icsflow containing the value associated at registration with the access-type or access-class of the selected PS domain IP-CAN and the media feature tag g.3gpp.ics containing the value "principal" along with the parameters "require" and "explicit", ii) if an existing leg for this session already exists or is in the process of being established between the SCC AS and the ICS UE using a different IP-CAN, a Target-Dialog header containing the dialog parameters for that existing dialog between the SCC AS and the ICS UE (the SCC AS SCC AS may include a Target-Dialog header in the SIP INVITE request so that the ICS UE can correlate different requests as part of the same session), and iii) an SDP for all the media types contained in the initial SIP INVITE request.

If only a single contact is registered in the PS domain, the SCC AS may create a SIP INVITE request in accordance with 3GPP TS24.229 and may include in the request i) an Accept-Contact header containing the media feature tag g.3gpp.ics containing the value "principal" along with the parameters "require" and "explicit", and ii) an SDP for all the media types contained in the initial SIP INVITE request.

Figure 17:
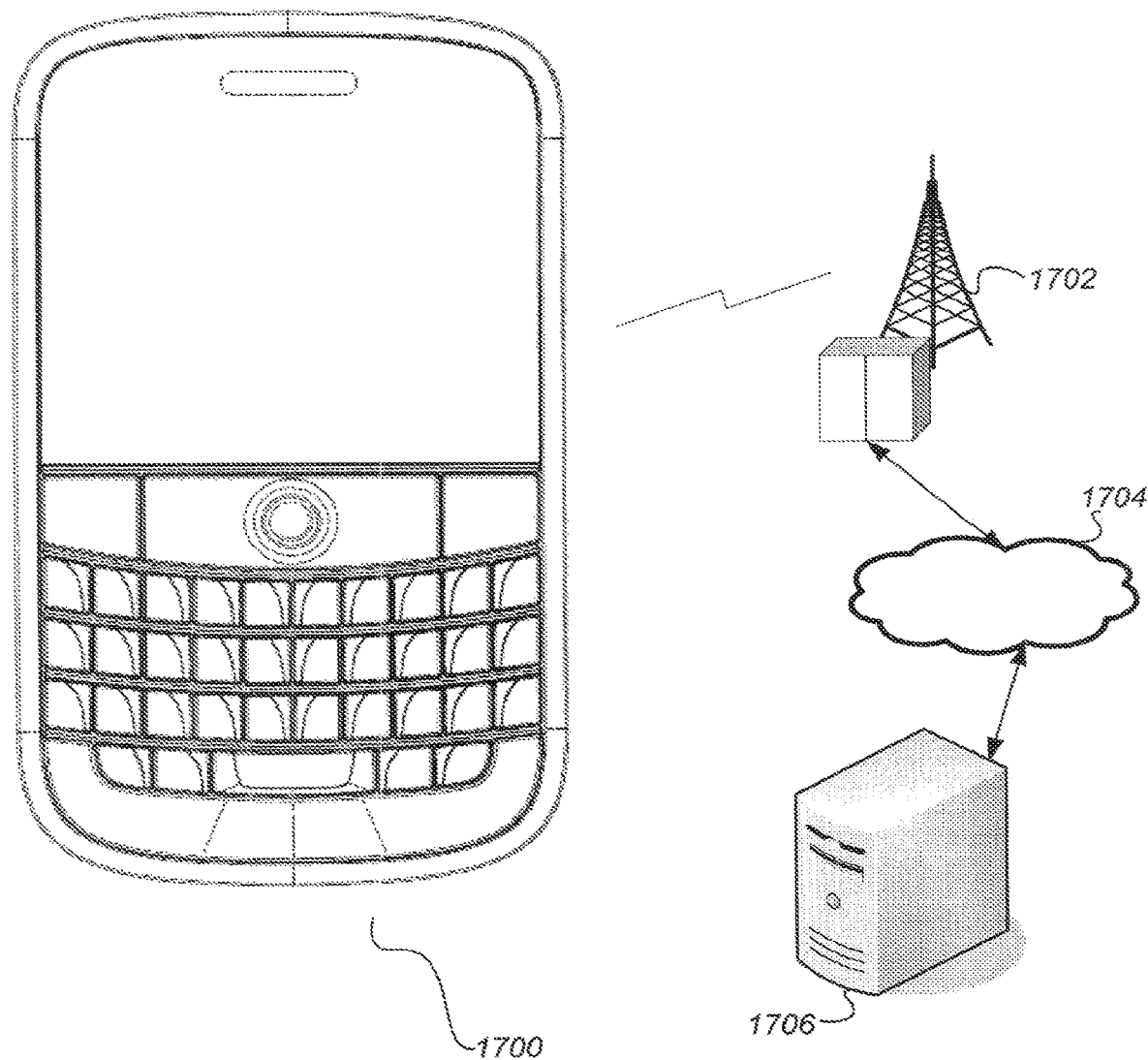
FIG. 17 illustrates a wireless communications system including an embodiment of the user agent.

Referring now to FIG. 17, a wireless communications system including an embodiment of an exemplary UE 1700 is illustrated. The UE is operable for implementing aspects of the disclosure, but the disclosure should not be limited to these implementations. Though illustrated as a mobile phone, the UE may take various forms including a wireless handset, a pager, a personal digital assistant (PDA), a portable computer, a tablet computer, a laptop computer, smartphones, printers, fax machines, televisions, set top boxes, and other video display devices, home audio equipment and other home entertainment systems, home monitoring and control systems (e.g., home monitoring, alarm systems and climate control systems), and enhanced home appliances such as computerized refrigerators. Many suitable devices combine some or all of these functions. In some embodiments of the disclosure, the UE 1700 is not a general purpose computing device like a portable, laptop or tablet computer, but rather is a special-purpose communications device such as a mobile phone, a wireless handset, a pager, a PDA, or a telecommunications device installed in a vehicle. The UE 1700 may also be a device, include a device, or be included in a device that has similar capabilities but that is not transportable, such as a desktop computer, a set-top box, or a network node. The UE 1700 may support specialized activities such as gaming, inventory control, job control, and/or task management functions, and so on.

The UE 1700 includes a display 702. The UE 1700 also includes a touch-sensitive surface, a keyboard or other input keys generally referred as 704 for input by a user. The keyboard may be a full or reduced alphanumeric keyboard such as QWERTY, Dvorak, AZERTY, and sequential types, or a traditional numeric keypad with alphabet letters associated with a telephone keypad. The input keys may include a trackwheel, an exit or escape key, a trackball, and other navigational or functional keys, which may be inwardly depressed to provide further input function. The UE 1700 may present options for the user to select, controls for the user to actuate, and/or cursors or other indicators for the user to direct.

The UE 1700 may further accept data entry from the user, including numbers to dial or various parameter values for configuring the operation of the UE 1700. The UE 1700 may further execute one or more software or firmware applications in response to user commands. These applications may configure the UE 1700 to perform various customized functions in response to user interaction. Additionally, the UE 1700 may be programmed and/or configured over-the-air, for example from a wireless base station, a wireless access point, or a peer UE 1700.

Among the various applications executable by the UE 1700 is a web browser, which enables the display 702 to show a web page. The web page may be obtained via wireless communications with a wireless network access node, a cell tower, a peer UE 1700, or any other wireless communication network or system 1702. The network 1702 is coupled to a wired network 1704, such as the Internet. Via the wireless link and the wired network, the UE 1700 has access to information on various servers, such as a server 1706. The server 1706 may provide content that may be shown on the display 702. Alternately, the UE 1700 may access the network 1702 through a peer UE 1700 acting as an intermediary, in a relay type or hop type of connection.

Figure 18:
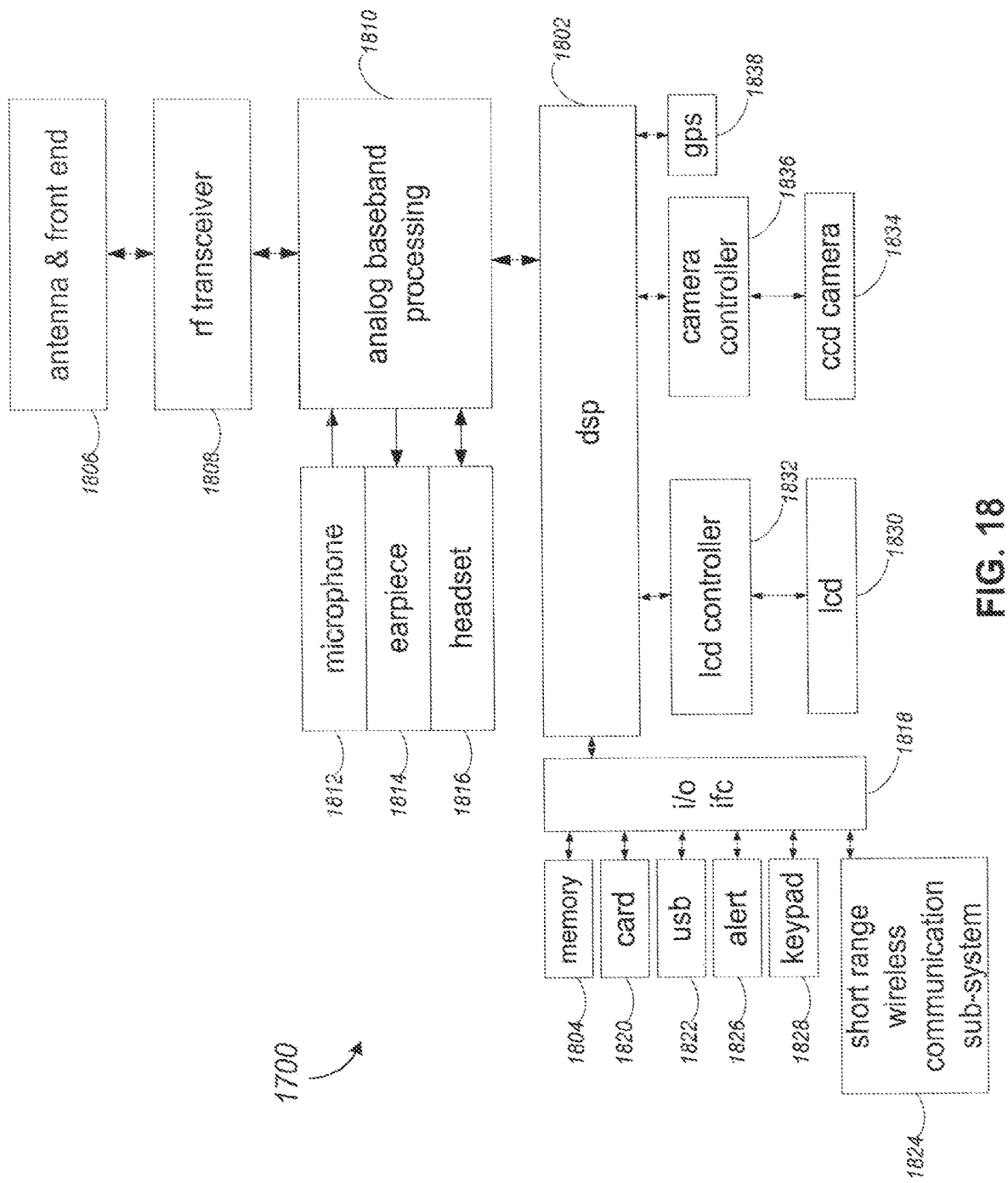
FIG. 18 shows a block diagram of the user agent including a digital signal processor (DSP) and a memory.

FIG. 18 shows a block diagram of the UE 1700. While a variety of known components of UAs 1700 are depicted, in an embodiment a subset of the listed components and/or additional components not listed may be included in the UE 1700. The UE 1700 includes a digital signal processor (DSP) 1802 and a memory 1804. As shown, the UE 1700 may further include an antenna and front end unit 1806, a radio frequency (RF) transceiver 1808, an analog baseband processing unit 1810, a microphone 1812, an earpiece speaker 1814, a headset port 1816, an input/output interface 1818, a removable memory card 1820, a universal serial bus (USB) port 1822, a short range wireless communication sub-system 1824, an alert 1826, a keypad 1828, a liquid crystal display (LCD), which may include a touch sensitive surface 1830, an LCD controller 1832, a charge-coupled device (CCD) camera 1834, a camera controller 1836, and a global positioning system (GPS) sensor 1838. In an embodiment, the UE 1700 may include another kind of display that does not provide a touch sensitive screen. In an embodiment, the DSP 1802 may communicate directly with the memory 1804 without passing through the input/output interface 1818.

The DSP 1802 or some other form of controller or central processing unit operates to control the various components of the UE 1700 in accordance with embedded software or firmware stored in memory 1804 or stored in memory contained within the DSP 1802 itself. In addition to the embedded software or firmware, the DSP 1802 may execute other applications stored in the memory 1804 or made available via information carrier media such as portable data storage media like the removable memory card 1820 or via wired or wireless network communications. The application software may comprise a compiled set of machine-readable instructions that configure the DSP 1802 to provide the desired functionality, or the application software may be high-level software instructions to be processed by an interpreter or compiler to indirectly configure the DSP 1802.

The antenna and front end unit 1806 may be provided to convert between wireless signals and electrical signals, enabling the UE 1700 to send and receive information from a cellular network or some other available wireless communications network or from a peer UE 1700. In an embodiment, the antenna and front end unit 1806 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 1806 may include antenna tuning and/or impedance matching components, RF power amplifiers, and/or low noise amplifiers.

The RF transceiver 1808 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 1810 and/or the DSP 1802 or other central processing unit. In some embodiments, the RF transceiver 1808, portions of the antenna and front end 1806, and the analog baseband processing unit 1810 may be combined in one or more processing units and/or application specific integrated circuits (ASICs).

The analog baseband processing unit 1810 may provide various analog processing of inputs and outputs, for example analog processing of inputs from the microphone 1812 and the headset 1816 and outputs to the earpiece 1814 and the headset 1816. To that end, the analog baseband processing unit 1810 may have ports for connecting to the built-in microphone 1812 and the earpiece speaker 1814 that enable the UE 1700 to be used as a cell phone. The analog baseband processing unit 1810 may further include a port for connecting to a headset or other hands-free microphone and speaker configuration. The analog baseband processing unit 1810 may provide digital-to-analog conversion in one signal direction and analog-to-digital conversion in the opposing signal direction. In some embodiments, at least some of the functionality of the analog baseband processing unit 1810 may be provided by digital processing components, for example by the DSP 1802 or by other central processing units.

The DSP 1802 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 1802 may perform modulation, coding, interleaving, and spreading, and for a receiver function the DSP 1802 may perform despreading, deinterleaving, decoding, and demodulation. In another embodiment, for example in an orthogonal frequency division multiplex access (OFDMA) technology application, for the transmitter function the DSP 1802 may perform modulation, coding, interleaving, inverse fast Fourier transforming, and cyclic prefix appending, and for a receiver function the DSP 1802 may perform cyclic prefix removal, fast Fourier transforming, deinterleaving, decoding, and demodulation. In other wireless technology applications, yet other signal processing functions and combinations of signal processing functions may be performed by the DSP 1802.

The DSP 1802 may communicate with a wireless network via the analog baseband processing unit 1810. In some embodiments, the communication may provide Internet connectivity, enabling a user to gain access to content on the Internet and to send and receive e-mail or text messages. The input/output interface 1818 interconnects the DSP 1802 and various memories and interfaces. The memory 1804 and the removable memory card 1820 may provide software and data to configure the operation of the DSP 1802. Among the interfaces may be the USB interface 1822 and the short range wireless communication sub-system 1824. The USB interface 1822 may be used to charge the UE 1700 and may also enable the UE 1700 to function as a peripheral device to exchange information with a personal computer or other computer system. The short range wireless communication sub-system 1824 may include an infrared port, a Bluetooth interface, an IEEE 802.11 compliant wireless interface, or any other short range wireless communication sub-system, which may enable the UE 1700 to communicate wirelessly with other nearby mobile devices and/or wireless base stations.

The input/output interface 1818 may further connect the DSP 1802 to the alert 1826 that, when triggered, causes the UE 1700 to provide a notice to the user, for example, by ringing, playing a melody, or vibrating. The alert 1826 may serve as a mechanism for alerting the user to any of various events such as an incoming call, a new text message, and an appointment reminder by silently vibrating, or by playing a specific pre-assigned melody for a particular caller.

The keypad 1828 couples to the DSP 1802 via the interface 1818 to provide one mechanism for the user to make selections, enter information, and otherwise provide input to the UE 1700. The keyboard 1828 may be a full or reduced alphanumeric keyboard such as QWERTY, Dvorak, AZERTY and sequential types, or a traditional numeric keypad with alphabet letters associated with a telephone keypad. The input keys may include a trackwheel, an exit or escape key, a trackball, and other navigational or functional keys, which may be inwardly depressed to provide further input function. Another input mechanism may be the LCD 1830, which may include touch screen capability and also display text and/or graphics to the user. The LCD controller 1832 couples the DSP 1802 to the LCD 1830.

The CCD camera 1834, if equipped, enables the UE 1700 to take digital pictures. The DSP 1802 communicates with the CCD camera 1834 via the camera controller 1836. In another embodiment, a camera operating according to a technology other than Charge Coupled Device cameras may be employed. The GPS sensor 1838 is coupled to the DSP 1802 to decode global positioning system signals, thereby enabling the UE 1700 to determine its position. Various other peripherals may also be included to provide additional functions, e.g., radio and television reception.

Figure 19:
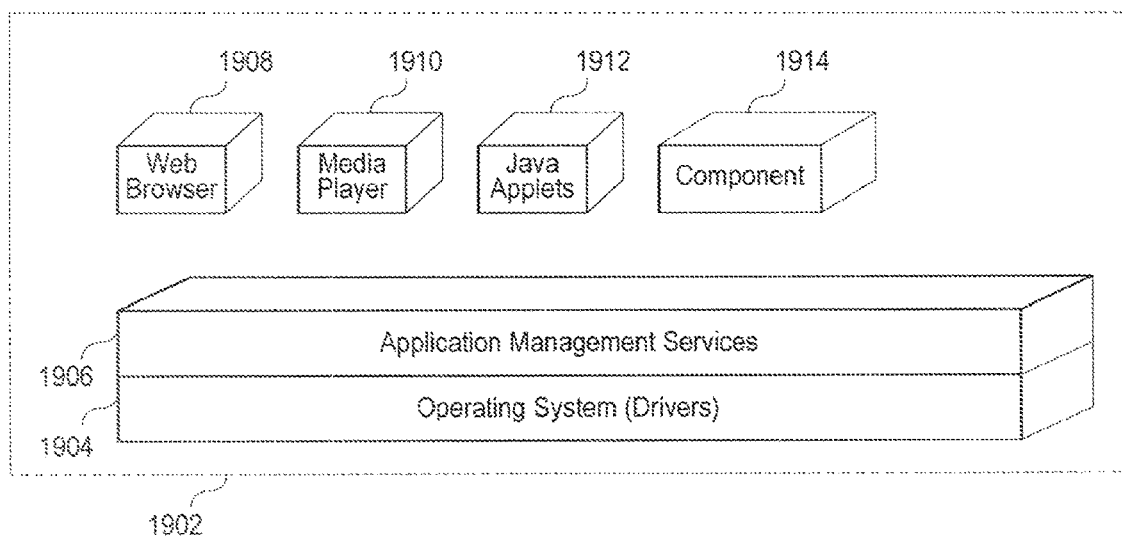
FIG. 19 illustrates a software environment that may be implemented by a processor of a user agent.

FIG. 19 illustrates a software environment 1902 that may be implemented by the DSP 1802. The DSP 1802 executes operating system drivers 1904 that provide a platform from which the rest of the software operates. The operating system drivers 1904 provide drivers for the UA hardware with standardized interfaces that are accessible to application software. The operating system drivers 1904 include application management services ("AMS") 1906 that transfer control between applications running on the UE 1700. Also shown in FIG. 19 are a web browser application 1908, a media player application 1910, and Java applets 1912. The web browser application 1908 configures the UE 1700 to operate as a web browser, allowing a user to enter information into forms and select links to retrieve and view web pages. The media player application 1910 configures the UE 1700 to retrieve and play audio or audiovisual media. The Java applets 1912 configure the UE 1700 to provide games, utilities, and other functionality. A component 1914 might provide functionality described herein.

Figure 20:
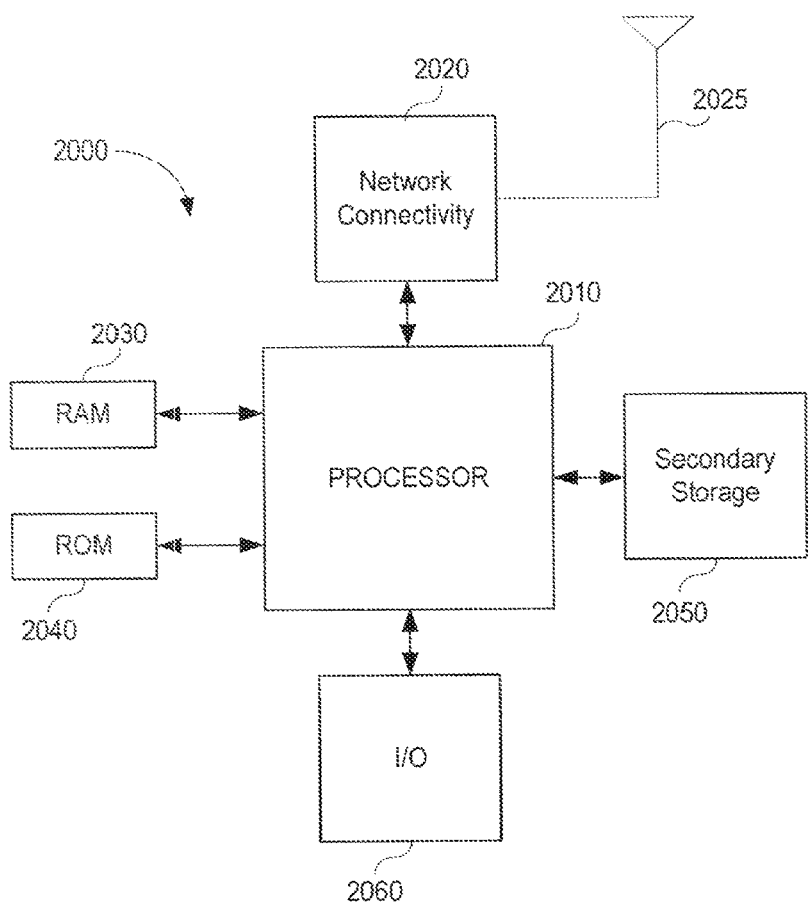
FIG. 20 illustrates an example of a system that includes a processing component suitable for implementing a method for providing continuity for sessions transitioning between networks.

The UE 1700, access device, and other components described above might include a processing component that is capable of executing instructions related to the actions described above. FIG. 20 illustrates an example of a system 2000 that includes a processing component 2010 suitable for implementing one or more embodiments disclosed herein. In addition to the processor 2010 (which may be referred to as a central processor unit (CPU or DSP), the system 2000 might include network connectivity devices 2020, random access memory (RAM) 2030, read only memory (ROM) 2040, secondary storage 2050, and input/output (I/O) devices 2060. In some embodiments, a program for implementing the determination of a minimum number of HARQ process IDs may be stored in ROM 2040. In some cases, some of these components may not be present or may be combined in various combinations with one another or with other components not shown. These components might be located in a single physical entity or in more than one physical entity. Any actions described herein as being taken by the processor 2010 might be taken by the processor 2010 alone or by the processor 2010 in conjunction with one or more components shown or not shown in the drawing.

The processor 2010 executes instructions, codes, computer programs, or scripts that it might access from the network connectivity devices 2020, RAM 2030, ROM 2040, or secondary storage 2050 (which might include various disk-based systems such as hard disk, floppy disk, or optical disk). While only one processor 2010 is shown, multiple processors may be present. Thus, while instructions may be discussed as being executed by a processor, the instructions may be executed simultaneously, serially, or otherwise by one or multiple processors. The processor 2010 may be implemented as one or more CPU chips.

The network connectivity devices 2020 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 2020 may enable the processor 2010 to communicate with the Internet or one or more telecommunications networks or other networks from which the processor 2010 might receive information or to which the processor 2010 might output information.

The network connectivity devices 2020 might also include one or more transceiver components 2025 capable of transmitting and/or receiving data wirelessly in the form of electromagnetic waves, such as radio frequency signals or microwave frequency signals. Alternatively, the data may propagate in or on the surface of electrical conductors, in coaxial cables, in waveguides, in optical media such as optical fiber, or in other media. The transceiver component 2025 might include separate receiving and transmitting units or a single transceiver. Information transmitted or received by the transceiver 2025 may include data that has been processed by the processor 2010 or instructions that are to be executed by processor 2010. Such information may be received from and outputted to a network in the form, for example, of a computer data baseband signal or signal embodied in a carrier wave. The data may be ordered according to different sequences as may be desirable for either processing or generating the data or transmitting or receiving the data. The baseband signal, the signal embedded in the carrier wave, or other types of signals currently used or hereafter developed may be referred to as the transmission medium and may be generated according to several methods well known to one skilled in the art.

The RAM 2030 might be used to store volatile data and perhaps to store instructions that are executed by the processor 2010. The ROM 2040 is a non-volatile memory device that typically has a smaller memory capacity than the memory capacity of the secondary storage 2050. ROM 2040 might be used to store instructions and perhaps data that are read during execution of the instructions. Access to both RAM 2030 and ROM 2040 is typically faster than to secondary storage 2050. The secondary storage 2050 is typically comprised of one or more disk drives or tape drives and might be used for non-volatile storage of data or as an over-flow data storage device if RAM 2030 is not large enough to hold all working data. Secondary storage 2050 may be used to store programs that are loaded into RAM 2030 when such programs are selected for execution.

The I/O devices 2060 may include liquid crystal displays (LCDs), touch screen displays, keyboards, keypads, switches, dials, mice, track balls, voice recognizers, card readers, paper tape readers, printers, video monitors, or other well-known input devices. Also, the transceiver 2025 might be considered to be a component of the I/O devices 2060 instead of or in addition to being a component of the network connectivity devices 2020. Some or all of the I/O devices 2060 may be substantially similar to various components depicted in the previously described drawing of the UE 1700, such as the display and the input.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of transfer control, comprising:
   obtaining a media feature tag sent to a network by a terminal in a Session Initiation Protocol (SIP) REGISTER request, the media feature tag containing information indicating an access network technology that the terminal used to register; and
   sending, over an access network selected according to the indicated access network technology, a SIP request for a transfer of control of a session between terminals, the SIP request including an Accept-Contact header field containing a media feature tag set to the information of the media feature tag that the terminal included in the SIP REGISTER request.

2. The method of claim 1, wherein the SIP request for the transfer of control is a SIP REFER message.

3. The method of claim 1, wherein the terminal comprises a first terminal, and the request for the transfer of control of the session is from the first terminal to a second terminal.

4. The method of claim 1, wherein the request for transfer of control of the session comprises a request for media transfer.

5. A network node comprising:
   at least one processor configured to:
      obtain a media feature tag sent to a network by a terminal in a Session Initiation Protocol (SIP) REGISTER request, the media feature tag containing information indicating an access network technology that the terminal used to register; and
      send, over an access network selected according to the indicated access network technology as indicated by the information contained in the media feature tag, a SIP request for a transfer of control of a session between terminals, the SIP request including an Accept-Contact header field containing a media feature tag set to the information of the media feature tag that the terminal included in the SIP REGISTER request.

6. The network node of claim 5, wherein the SIP request for the transfer of control is a SIP REFER message.

7. The network node of claim 5, wherein the request for the transfer of control comprises a request for media transfer.

8. The network node of claim 5, wherein the network node includes a service consistency and continuity application server (SCC AS).

9. The method of claim 3, wherein the obtaining and the sending are performed by a network node, and the request for the transfer of control is sent from the network node to the second terminal.

10. The method of claim 9, wherein the network node comprises a service consistency and continuity application server (SCC AS).

11. The method of claim 9, wherein the request for the transfer of control of the session is sent to the second terminal over the access network in response to a request received from the first terminal.

12. The method of claim 1, wherein the indicated access network technology is a wireless local area network (WLAN) technology.

13. The method of claim 1, wherein the indicated access network technology is a cellular access network technology.

14. The method of claim 1, wherein the request for the transfer of control of the session is to split a media flow.

15. The network node of claim 5, wherein the terminal is a first terminal, and the at least one processor is configured to send the request for the transfer of control of the session to a second terminal over the access network in response to a request received from the first terminal.

16. The network node of claim 5, wherein the indicated access network technology is a wireless local area network (WLAN) technology.

17. The network node of claim 5, wherein the indicated access network technology is a cellular access network technology.

18. A non-transitory storage medium storing instructions that upon execution cause a network node to:
   obtain a media feature tag sent to a network by a terminal in a Session Initiation Protocol (SIP) REGISTER request, the media feature tag containing information indicating an access network technology that the terminal used to register; and
   send, over an access network selected according to the indicated access network technology as indicated by the information contained in the media feature tag, a SIP request for a transfer of control of a session between terminals, the SIP request including an Accept-Contact header field containing a media feature tag set to the information of the media feature tag that the terminal included in the SIP REGISTER request.

* * * * *